United States Patent
Misra et al.

(10) Patent No.: US 12,034,922 B2
(45) Date of Patent: Jul. 9, 2024

(54) SYSTEMS AND METHODS FOR REDUCING A RECONSTRUCTION ERROR IN VIDEO CODING BASED ON A CROSS-COMPONENT CORRELATION

(71) Applicant: Sharp Kabushiki Kaisha, Sakai (JP)

(72) Inventors: Kiran Mukesh Misra, Vancouver, WA (US); Frank Bossen, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 204 days.

(21) Appl. No.: 17/621,860

(22) PCT Filed: Jun. 23, 2020

(86) PCT No.: PCT/JP2020/024645
§ 371 (c)(1),
(2) Date: Dec. 22, 2021

(87) PCT Pub. No.: WO2020/262396
PCT Pub. Date: Dec. 30, 2020

(65) Prior Publication Data
US 2022/0248007 A1    Aug. 4, 2022

Related U.S. Application Data

(60) Provisional application No. 62/886,891, filed on Aug. 14, 2019, provisional application No. 62/870,752, (Continued)

(51) Int. Cl.
*H04N 19/117*    (2014.01)
*H04N 19/132*    (2014.01)
(Continued)

(52) U.S. Cl.
CPC ......... *H04N 19/117* (2014.11); *H04N 19/132* (2014.11); *H04N 19/186* (2014.11); *H04N 19/70* (2014.11); *H04N 19/82* (2014.11)

(58) Field of Classification Search
CPC ...... H04N 19/82; H04N 19/70; H04N 19/186; H04N 19/132; H04N 19/117
See application file for complete search history.

(56) References Cited

U.S. PATENT DOCUMENTS 10,419,757 B2    9/2019    Chen et al.

FOREIGN PATENT DOCUMENTS

WO    2018/070914 A1    4/2018

OTHER PUBLICATIONS

Official Communication issued in International Patent Application No. PCT/JP2020/024645, dated Sep. 24, 2020.
(Continued)

*Primary Examiner* — On S Mung
(74) *Attorney, Agent, or Firm* — Keating & Bennett, LLP

(57) ABSTRACT

A method of filtering reconstructed video data is disclosed. The method comprising: inputting reconstructed luma component sample values; deriving a filtered sample value by using cross component filter coefficients and the reconstructed luma component sample values prior to an adaptive loop filtering process; deriving a refinement value for chroma components by using the filtered sample value; and deriving a refined chroma sample value by using a sum of a sample value of chroma components and the refinement value for chroma components.

5 Claims, 31 Drawing Sheets

Related U.S. Application Data filed on Jul. 4, 2019, provisional application No. 62/865,933, filed on Jun. 24, 2019.

(51) Int. Cl.
*H04N 19/186* (2014.01)
*H04N 19/70* (2014.01)
*H04N 19/82* (2014.01)

(56) References Cited

OTHER PUBLICATIONS

Bross et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.

Bross et al., "Versatile Video Coding (Draft 5)", Joint Video Experts Team (JVET) of ITU-T SG 16 WP 3 and ISO/IEC JTC 1/SC 29/WG 11, JVET-N1001-v8, Mar. 19-27, 2019, 400 pages.

Bross, "Versatile Video Coding (Draft 1)", Joint Video Experts Team (JVET) of ITU-T SG 16 WP 3 and ISO/IEC JTC 1/SC 29/WG 11, JVET-J1001-v2, Apr. 10-20, 2018, 43 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.

International Telecommunication Union, "Series H: Audiovisual and Multimedia Systems Infrastructure of audiovisual services—Coding of moving video, High efficiency video coding", ITU-T H.265, Dec. 2016, 662 pages.

International Telecommunication Union, "Series H: Audiovisual and Multimedia Systems Infrastructure of audiovisual services—Coding of moving video, Advanced video coding for generic audiovisual services", ITU-T H.264, Apr. 2017, 810 pages.

Misra et al., "Cross-Component Adaptive Loop Filter for chroma", Joint Video Experts Team (JVET) of ITU-T SG 16 WP 3 and ISO/IEC JTC 1/SC 29/WG 11, JVET-O0636 r1, Jul. 3-12, 2019, 10 pages.

Dong et al., "SCE4: Results of test 4.2.4 on chroma enhancement for inter layer predication", Joint Collaborative Team on Video Coding (JCT-VC) of ITU-T SG 16 WP 3 and ISO/IEC JTC 1/SC 29/WG 11, JCTVC-M0183 r2, Apr. 18-26, 2013, 20 pages.

Misra et al., "On Cross Component Adaptive Loop Filter for Video Compression", Picture Coding Symposium (PCS), Nov. 12-15, 2019, 5 pages.

Misra et al., "Cross-Componenet Adaptive Loop Filter for chroma", Joint Video Experts Team (JVET) of ITU-T SG 16 WP 3 and ISO/IEC JTC 1/SC 29/WG 11, JVET-O0636, Jul. 3-12, 2019, 8 pages.

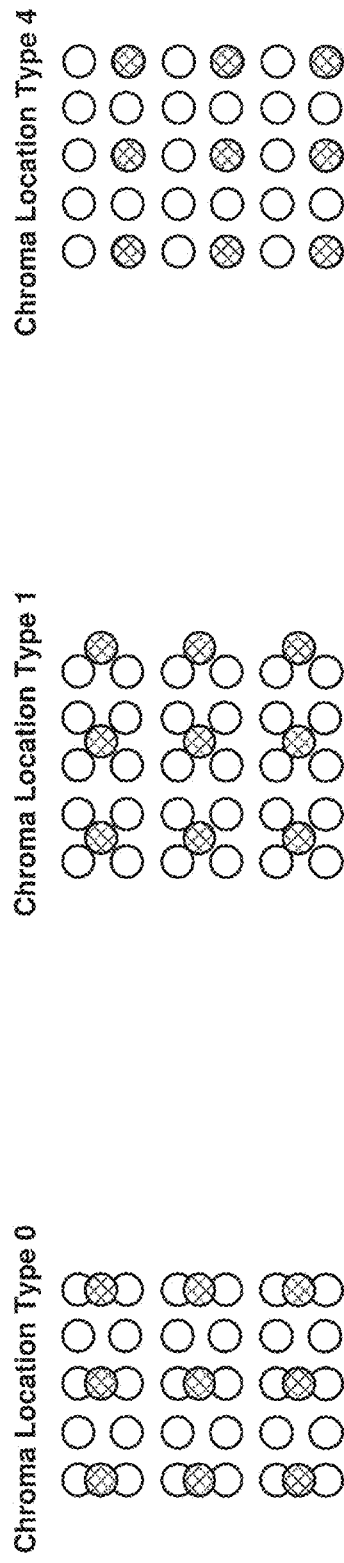
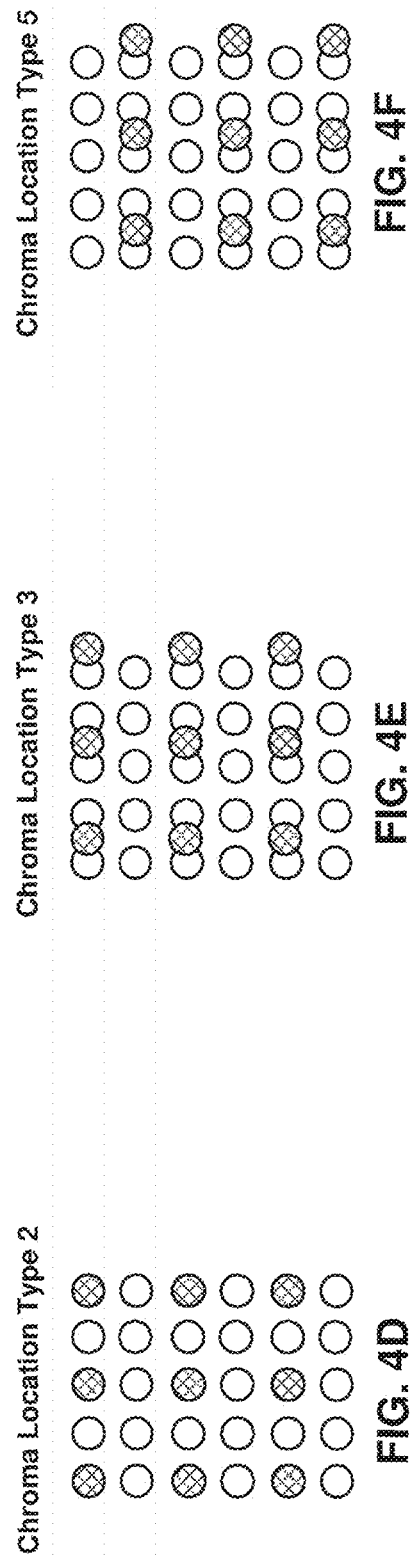
FIG. 4A FIG. 4B FIG. 4C FIG. 4D FIG. 4E FIG. 4F

[Fig. 9]
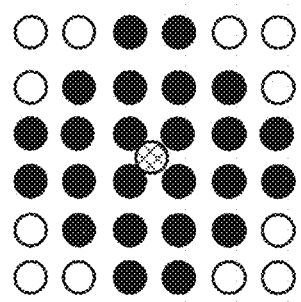
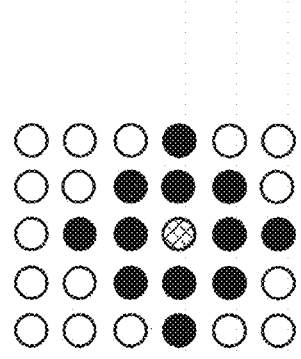
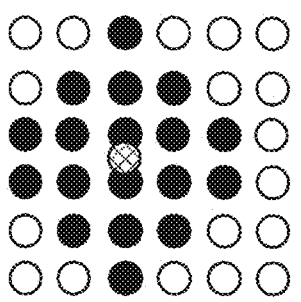
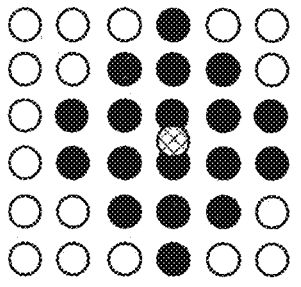
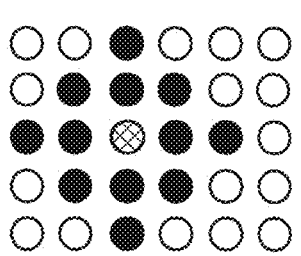

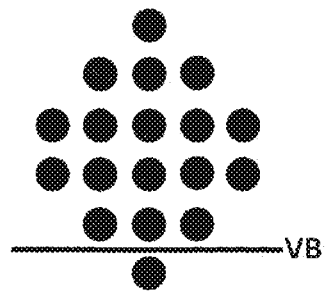
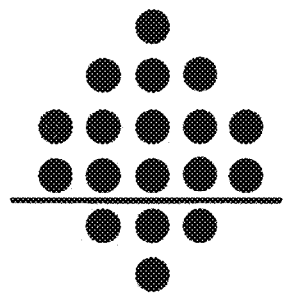
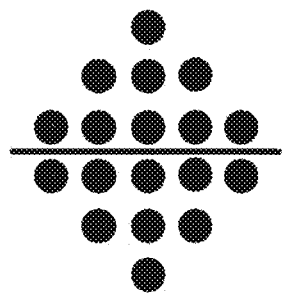
Pre-determined
sample above line
boundary
FIG. 16A

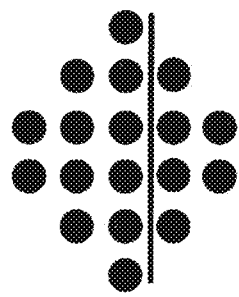
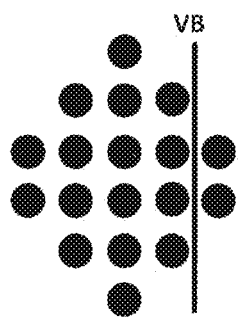
Pre-determined sample to the left of line boundary
FIG. 16C Pre-determined sample to the right of line boundary

SYSTEMS AND METHODS FOR REDUCING A RECONSTRUCTION ERROR IN VIDEO CODING BASED ON A CROSS-COMPONENT CORRELATION

TECHNICAL FIELD

This disclosure relates to video coding and more particularly to techniques for reducing a reconstruction error.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, CA From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva, C H, document JVET-N1001-v8, which is incorporated by reference herein, and referred to as JVET-N1001, represents an iteration of the draft text of a video coding specification corresponding to the VVC project. "Versatile Video Coding (Draft 6)," 15th Meeting of ISO/IEC JTC1/SC29/WG11 3-12 Jul. 2019, Gothenburg, S E, document JVET-O2001-vE, which is incorporated by reference herein, and referred to as JVET-O2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of filtering reconstructed video data, the method comprising: inputting reconstructed luma component sample values; deriving a filtered sample value by using cross component filter coefficients and the reconstructed luma component sample values prior to an adaptive loop filtering process; deriving a refinement value for chroma components by using the filtered sample value; and deriving a refined chroma sample value by using a sum of a sample value of chroma components and the refinement value for chroma components.

In one example, a decoder of decoding coded data, the decoder comprising: a processor, and a memory associated with the processor; wherein the processor is configured to perform the following steps: inputting reconstructed luma component sample values; deriving a filtered sample value by using cross component filter coefficients and the reconstructed luma component sample values prior to an adaptive loop filtering process; deriving a refinement value for chroma components by using the filtered sample value; and deriving a refined chroma sample value by using a sum of a sample value of chroma components and the refinement value for chroma components.

In one example, an encoder of encoding video data, the encoder comprising: a processor, and a memory associated with the processor; wherein the processor is configured to perform the following steps: inputting reconstructed luma component sample values; deriving a filtered sample value by using cross component filter coefficients and the reconstructed luma component sample values prior to an adaptive loop filtering process; deriving a refinement value for chroma components by using the filtered sample value; and deriving a refined chroma sample value by using a sum of a sample value of chroma components and the refinement value for chroma components.

BRIEF DESCRIPTION OF DRAWINGS

FIG. 4A is a conceptual diagram illustrating example of location types for a video component sampling format that may be utilized in accordance with one or more techniques of this disclosure.

FIG. 4B is a conceptual diagram illustrating example of location types for a video component sampling format that may be utilized in accordance with one or more techniques of this disclosure.

FIG. 4C is a conceptual diagram illustrating example of location types for a video component sampling format that may be utilized in accordance with one or more techniques of this disclosure.

FIG. 4D is a conceptual diagram illustrating example of location types for a video component sampling format that may be utilized in accordance with one or more techniques of this disclosure.

FIG. 4E is a conceptual diagram illustrating example of location types for a video component sampling format that may be utilized in accordance with one or more techniques of this disclosure.

FIG. 4F is a conceptual diagram illustrating example of location types for a video component sampling format that may be utilized in accordance with one or more techniques of this disclosure.

FIG. 8 is a conceptual diagram illustrating examples of reconstruction errors for multiple components of video data in accordance with one or more techniques of this disclosure.

FIG. 9A is a conceptual diagram illustrating example of support samples which may be used for cross component filtering in accordance with one or more techniques of this disclosure.

FIG. 9B is a conceptual diagram illustrating example of support samples which may be used for cross component filtering in accordance with one or more techniques of this disclosure.

FIG. 9C is a conceptual diagram illustrating example of support samples which may be used for cross component filtering in accordance with one or more techniques of this disclosure.

FIG. 9D is a conceptual diagram illustrating example of support samples which may be used for cross component filtering in accordance with one or more techniques of this disclosure.

FIG. 9E is a conceptual diagram illustrating example of support samples which may be used for cross component filtering in accordance with one or more techniques of this disclosure.

FIG. 9F is a conceptual diagram illustrating example of support samples which may be used for cross component filtering in accordance with one or more techniques of this disclosure.

FIG. 10 is conceptual diagram illustrating an example of reducing a reconstruction error using cross component filtering accordance with one or more techniques of this disclosure.

FIG. 14A is a conceptual diagram illustrating example of filter coefficient locations which may be used for cross component filtering in accordance with one or more techniques of this disclosure.

FIG. 14B is a conceptual diagram illustrating example of filter coefficient locations which may be used for cross component filtering in accordance with one or more techniques of this disclosure.

FIG. 14C is a conceptual diagram illustrating example of filter coefficient locations which may be used for cross component filtering in accordance with one or more techniques of this disclosure.

FIG. 14D is a conceptual diagram illustrating example of filter coefficient locations which may be used for cross component filtering in accordance with one or more techniques of this disclosure.

FIG. 14E is a conceptual diagram illustrating example of filter coefficient locations which may be used for cross component filtering in accordance with one or more techniques of this disclosure.

FIG. 14F is a conceptual diagram illustrating example of filter coefficient locations which may be used for cross component filtering in accordance with one or more techniques of this disclosure.

FIG. 15A is a conceptual diagram illustrating example of filter coefficient locations which may be used for cross component filtering in accordance with one or more techniques of this disclosure.

FIG. 15B is a conceptual diagram illustrating example of filter coefficient locations which may be used for cross component filtering in accordance with one or more techniques of this disclosure.

FIG. 15C is a conceptual diagram illustrating example of filter coefficient locations which may be used for cross component filtering in accordance with one or more techniques of this disclosure.

FIG. 15D is a conceptual diagram illustrating example of filter coefficient locations which may be used for cross component filtering in accordance with one or more techniques of this disclosure.

FIG. 16A is a conceptual diagram illustrating example of virtual line buffers which may be used for cross component filtering in accordance with one or more techniques of this disclosure.

FIG. 16A is a conceptual diagram illustrating example of virtual line buffers which may be used for cross component filtering in accordance with one or more techniques of this disclosure.

FIG. 16C is a conceptual diagram illustrating example of virtual line buffers which may be used for cross component filtering in accordance with one or more techniques of this disclosure.

DESCRIPTION OF EMBODIMENTS

Figure 1:
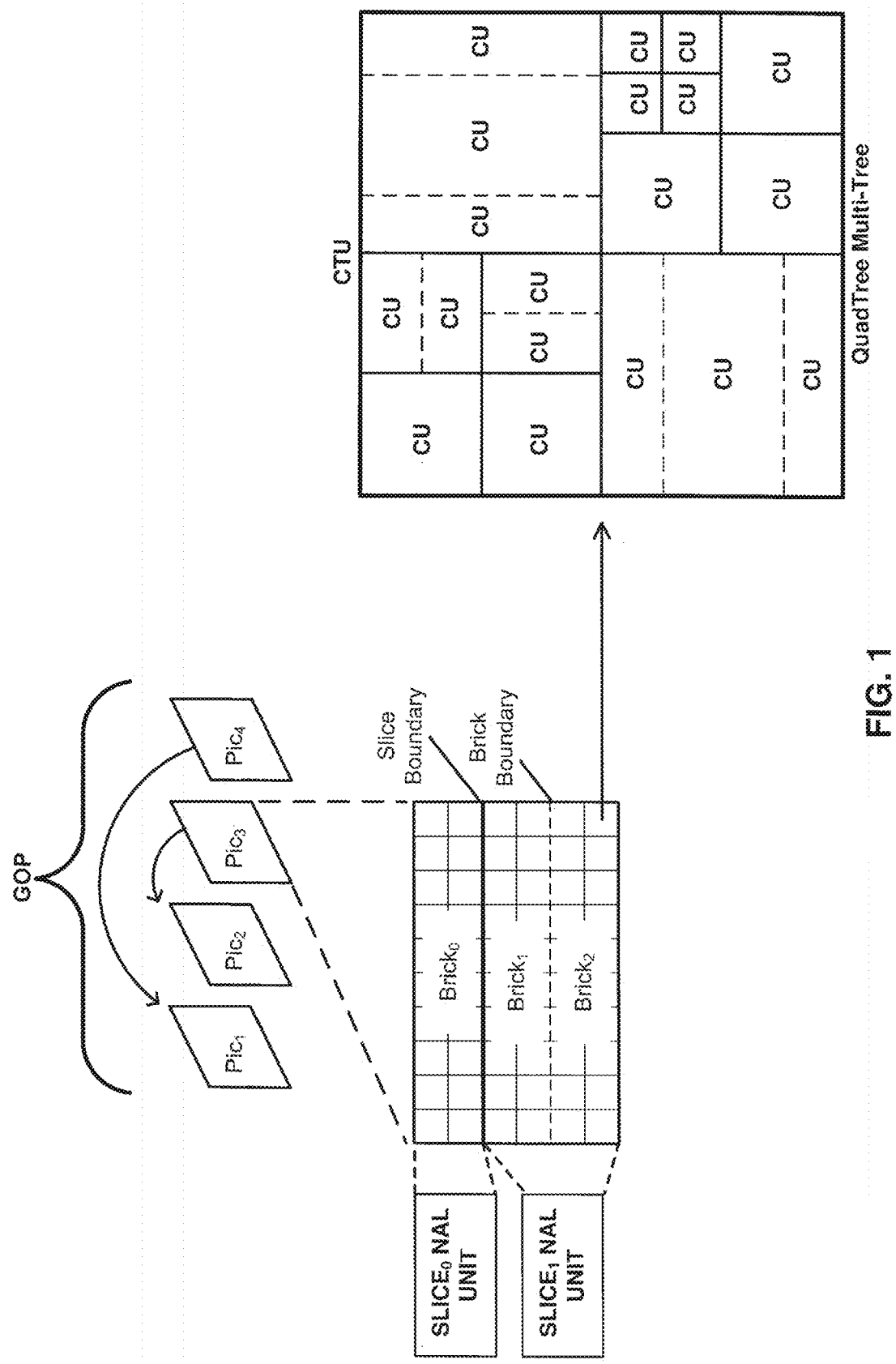
FIG. 1 is a conceptual diagram illustrating an example of a group of pictures coded according to a quad tree multi-tree partitioning in accordance with one or more techniques of this disclosure.

In general, this disclosure describes various techniques for coding video data. In particular, this disclosure describes techniques for reducing a reconstruction error. It should be noted that although techniques of this disclosure are described with respect to ITU-T H.264, ITU-T H.265, JEM, JVET-N1001, and JVET-O2001 the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, JVET-N1001, and JVET-O2001. Thus, reference to ITU-T H.264, ITU-T H.265, JEM, JVET-N1001, and/or JVET-O2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method comprises receiving reconstructed sample data for a current component of video data, receiving reconstructed sample data for one or more additional components of video data, deriving a cross component filter based on data associated with one or more additional components of video data, and applying a filter to the reconstructed sample data for a current component of video data based on the derived cross component filter and the reconstructed sample data for one or more additional components of video data.

In one example, a device comprises one or more processors configured to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

In one example, a non-transitory computer-readable storage medium comprises instructions stored thereon that, when executed, cause one or more processors of a device to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

In one example, an apparatus comprises means for receiving reconstructed sample data for one or more additional components of video data, means for deriving a cross component filter based on data associated with one or more additional components of video data, and means for applying a filter to the reconstructed sample data for a current component of video data based on the derived cross component filter and the reconstructed sample data for one or more additional components of video data.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr)). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001 and JVET-O2001, CTUs are partitioned according a quadtree plus multi-type tree (QTMT or QT+MTT) structure. The QTMT in JVET-N1001 and JVET-O2001 is similar to the QTBT in JEM. However, in JVET-N1001 and JVET-O2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-N1001 and JVET-O2001, slices are required to consist of an integer number of bricks instead of only being required to consist of an integer number of CTUs. In JVET-N1001 and JVET-O2001, a brick is a rectangular region of CTU rows within a particular tile in a picture. Further, in JVET-N1001 and JVET-O2001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 1 is a conceptual diagram illustrating an example of a group of pictures including slices. In the example illustrated in FIG. 1, $Pic_3$ is illustrated as including two slices (i.e., $Slice_0$ and $Slice_1$). In the example illustrated in FIG. 1, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 1, $Pic_3$ is illustrated as referencing $Pic_2$. Similarly, $Pic_4$ is illustrated as referencing $Pic_1$. With respect to FIG. 1, assuming the picture number corresponds to the decoding order, the DPB would be populated as follows: after decoding $Pic_1$, the DPB would include {$Pic_1$}; at the onset of decoding $Pic_2$, the DPB would include {$Pic_1$}; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-N1001 and JVET-O2001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein, each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and/or previously coded syntax elements. For example, values of syntax elements associated with neighboring video blocks may be used to determine a context for a current bin.

Figure 2A:
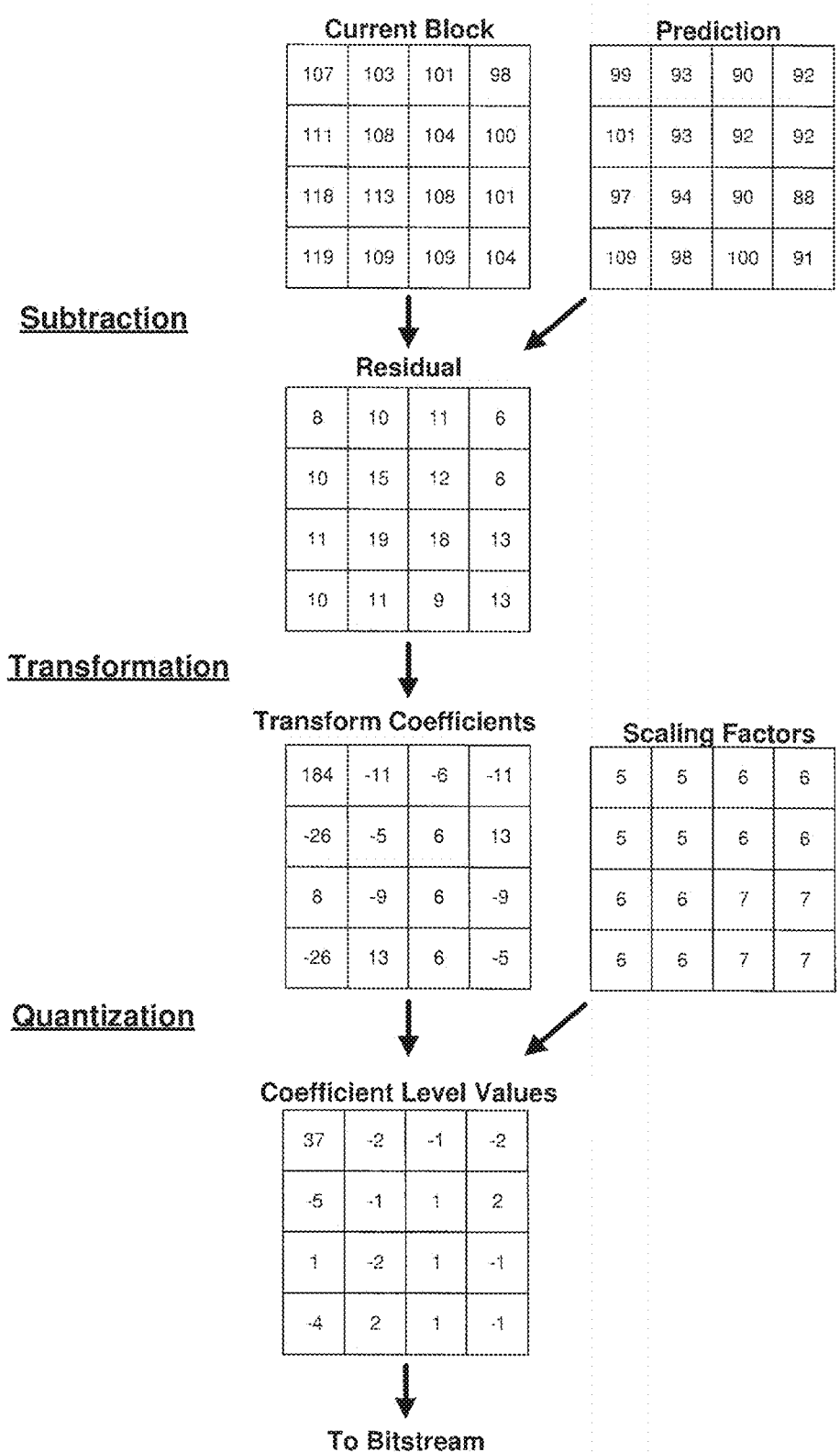
FIG. 2A is a conceptual diagram illustrating example of coding a block of video data in accordance with one or more techniques of this disclosure.
Figure 2B:
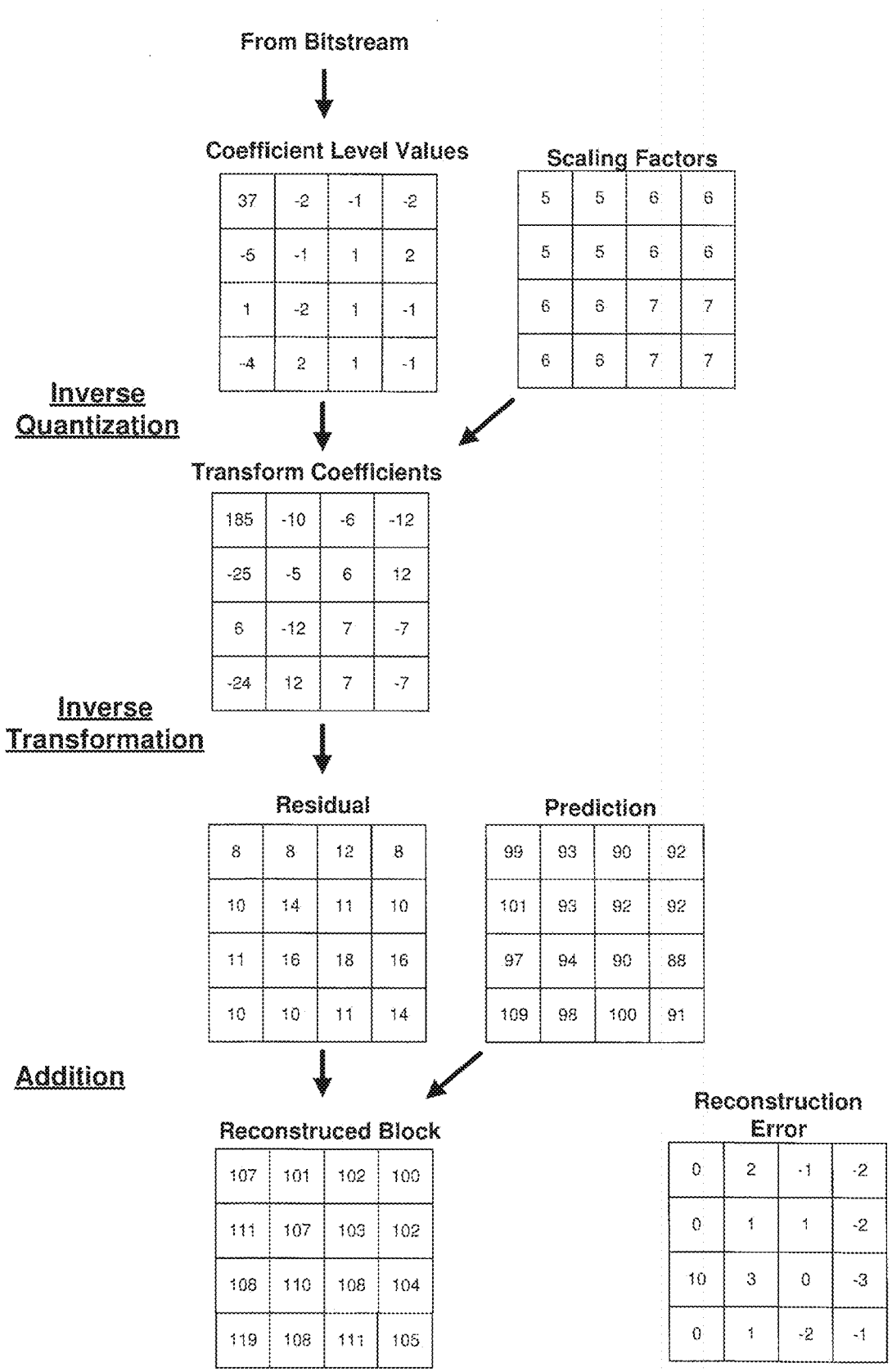
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In particular, FIG. 2B illustrates a Reconstruction Error which is the difference between Current Block and Reconstructed Block. In this manner, coding may be said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. In ITU-T H.265, a scaling matrix is selected based in part on a prediction mode and a color component, where scaling matrices of the following sizes are defined: 4×4, 8×8, 16×16, and 32×32. It should be noted that in some examples, a scaling matrix may provide the same value for each entry (i.e., all coefficients are scaled according to a single value). In ITU-T H.265, the value of a quantization scaling factor, may be determined by a quantization parameter, QP. In ITU-T H.265, for a bit-depth of 8-bits, the QP can take 52 values from 0 to 51 and a change of 1 for QP generally corresponds to a change in the value of the quantization scaling factor by ap-proximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a respective quantization parameter may be derived for each of the luma and chroma channels.

As described above, with respect to the examples illustrated in FIGS. 2A-2B, the sample values of a reconstructed block may differ from the sample values of the current video block that is encoded. Further, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize the difference between the sample values of the current video block that is encoded and the reconstructed block and/or minimize artifacts introduced by the video coding process. Such modifications may general be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at video encoder and subsequent decoding at a video decoder). For a post-loop filtering process the resulting sample values of a filtering process are merely output as part of the decoding process (e.g., not used for subsequent coding). For example, in the case of a video decoder, for an in-loop filtering process, the sample values resulting from filtering the reconstructed block would be used for subsequent decoding (e.g., stored to a reference buffer) and would be output (e.g., to a display). For a post-loop filtering process, the reconstructed block would be used for subsequent decoding and the sample values resulting from filtering the reconstructed block would be output.

Deblocking (or de-blocking), deblock filtering, or applying a deblocking filter refers to the process of smoothing the boundaries of neighboring reconstructed video blocks (i.e., making boundaries less perceptible to a viewer). Smoothing the boundaries of neighboring reconstructed video blocks may include modifying sample values included in rows or columns adjacent to a boundary. ITU-T H.265 provides where a deblocking filter is applied to reconstructed sample values as part of an in-loop filtering process. ITU-T H.265 includes two types deblocking filters that may be used for modifying luma samples: a Strong Filter which modifies sample values in the three adjacent rows or columns to a boundary and a Weak Filter which modifies sample values in the immediately adjacent row or column to a boundary and conditionally modifies sample values in the second row or column from the boundary. Further, ITU-T H.265 includes one type of filter that may be used for modifying chroma samples: Normal Filter.

In addition to applying a deblocking filter as part of an in-loop filtering process, ITU-T H.265 provides where Sample Adaptive Offset (SAO) filtering may be applied in the in-loop filtering process. In ITU-T H.265, SAO is a process that modifies the deblocked sample values in a region by conditionally adding an offset value. ITU-T H.265 provides two types of SAO filters that may be applied to a CTB: band offset or edge offset. For each of band offset and edge offset, four offset values are included in a bitstream. For band offset, the offset which is applied depends on the amplitude of a sample value (e.g., amplitudes are mapped to bands which are mapped to the four signaled offsets). For edge offset, the offset which is applied depends on a CTB having one of a horizontal, vertical, first diagonal, or second diagonal edge classification (e.g., classifications are mapped to the four signaled offsets).

Another type of filtering process includes the so-called adaptive loop filter (ALF). An ALF with block-based adaption is specified in JEM. In JEM, the ALF is applied after the SAO filter. It should be noted that an ALF may be applied to reconstructed samples independently of other filtering techniques. The process for applying the ALF specified in JEM at a video encoder may be summarized as follows: (1) each 2×2 block of the luma component for a reconstructed picture is classified according to a classification index; (2) sets of filter coefficients are derived for each classification index; (3) filtering decisions are determined for the luma component; (4) a filtering decision is determined for the chroma components; and (5) filter parameters (e.g., coefficients and decisions) are signaled.

According to the ALF specified in JEM, each 2×2 block is categorized according to a classification index C, where C is an integer in the inclusive range of 0 to 24. C is derived based on its directionality D and a quantized value of activity Â, according to the following equation:

$$C = 5D + A$$

where D and Â, gradients of the horizontal, vertical and two diagonal direction are calculated using a 1-D Laplacian as follows:

$$g_v = \sum_{k=i-2}^{i+3} \sum_{l=j-2}^{j+3} V_{k,l}, \; V_{k,l} = |2R(k,l) - R(k, l-1) - R(k, l+1)|,$$

$$g_h = \sum_{k=i-2}^{i+3} \sum_{l=j-2}^{j+3} H_{k,l}, \; H_{k,l} = |2R(k,l) - R(k-1, l) - R(k+1, l)|,$$

$$g_{d1} = \sum_{k=i-2}^{i+3} \sum_{l=j-3}^{j+3} D1_{k,l}, \; D1_{k,l} = |2R(k,l) - R(k-1, l-1) - R(k+1, l+1)|$$

$$g_{d2} = \sum_{k=i-2}^{i+3} \sum_{j=j-2}^{j+3} D2_{k,l}, \; D2_{k,l} = |2R(k,l) - R(k-1, l+1) - R(k+1, l-1)|$$

where, indices i and j refer to the coordinates of the upper left sample in the 2×2 block and R (i,j) indicates a reconstructed sample at coordinate (i,j).

Maximum and minimum values of the gradients of horizontal and vertical directions may be set as:

$$g_{h,v}^{max} = \max(g_h, g_v);$$

$$g_{h,v}^{min} = \min(g_h, g_v).$$

and the maximum and minimum values of the gradient of two diagonal directions may be set as:

$$g_{d0,d1}^{max} = \max(g_{d0}, g_{d1});$$

$$g_{d0,d1}^{min} = \min(g_{d0}, g_{d1}).$$

In JEM, to derive the value of the directionality D, the maximum and minimum values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

In JEM, the activity value A is calculated as:

$$A = \sum_{k=i-2}^{i+3} \sum_{l=j-2}^{j+3} (V_{k,l} + H_{k,l}).$$

where, A is further quantized to the range of 0 to 4, inclusively, and the quantized value is denoted as Â.

As described above, applying the ALF specified in JEM at a video encoder includes deriving sets of filter coefficients for each classification index and determining filtering decisions. It should be noted that the derivation of sets of filter coefficients and determination of filtering decisions may be an iterative process. That is, sets of filter coefficients may be updated based on filtering decisions and filtering decisions may be updated based on updated sets of filter coefficients and this may be repeated multiple times. Further, a video encoder may implement various proprietary algorithms to determine sets of filter coefficients and/or to determine filtering decisions. The techniques described herein are generally applicable regardless of how sets of filter coefficients are derived for each classification index and how filtering decisions are determined.

According to one example, sets of filter coefficients are derived by initially deriving a set of optimal filter coefficients for each classification index. Optimal filter coefficients are derived by comparing desired sample values (i.e., sample values in the source video) to reconstructed sample values subsequent to applying the filtering and by minimizing the sum of squared errors (SSE) between the desired sample values and the reconstructed sample values subsequent to performing the filtering. The derived optimal coefficients for each group may then be used to perform a basis filtering over the reconstructed samples in order to analyze the effectiveness of the ALF. That is, desired sample values, reconstructed sample values prior to applying the ALF, and reconstructed sample values subsequent to performing the ALF can be compared to determine the effectiveness of applying the ALF using the optimal coefficients.

According to the specified ALF in JEM, each reconstructed sample R(i,j) is filtered by determining the resulting in sample value R'(i,j) according to the following equation, wherein in the following equation below, L denotes filter length, and f(k,l) denotes the decoded filter coefficients.

$$R'(i, j) = \sum_{k=-L/2}^{L/2} \sum_{l=-L/2}^{L/2} f(k, l) \times R(i + k, j + l)$$

It should be noted that JEM defines three filter shapes (a 5×5 diamond, a 7×7 diamond, and a 9×9 diamond). It should be noted that in JEM, geometric transformations are applied to filter coefficients f(k,l) depending on gradient values: $g_v$, $g_h$, $g_{d_1}$, $g_{d_2}$, as provided in Table 1.

TABLE 1

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation | where the Diagonal, Vertical flip, and Rotation are defined as follows:

Diagonal: $f_D(k, l) = f(l, k)$,

Vertical flip: $f_V(k, l) = f(k, K - l - 1)$

Rotation: $f_R(k, l) = f(K - l - 1, k)$ where K is the size of the filter and $0 \leq k, l \leq K-1$ are coefficients coordinates, such that location (0,0) is at the upper left corner and location (K−1,K−1) is at the lower right corner.

JEM provides where up to 25 sets of luma filter coefficients can be signaled (i.e., one for each possible classification index). Thus, the optimal coefficients could be signaled for each classification index occurring in a corresponding picture region. However, in order to optimize the amount of data required to signal sets of luma filter coefficients versus the effectiveness of the filter, rate distortion (RD) optimizations may be performed. For example, JEM provides where sets of filter coefficients of neighboring classification groups may be merged and signaled using an array mapping a set of filter coefficients to each classification index. Further, JEM provides where temporal coefficient prediction may be used to signal coefficients. That is, JEM provides where sets of filter coefficients for a current picture may be predicted based on sets of filter coefficients of a reference picture by inheriting the set of filter coefficients used for a reference picture. JEM further provides where for intra prediction pictures, a set of 16 fixed filters may be available for predicting sets of filter coefficients. As described above, the derivation of sets of filter coefficients and determination of filtering decisions may be an iterative process. That is, for example, the shape of the ALF may be determined based on how many sets of filter coefficients are signaled and similarly, whether the ALF is applied to a region of a picture may be based on the sets of filter coefficients that are signaled and/or the shape of the filter. It should be noted that for the ALF filter each component uses a set of sample values from the respective component as input and derives output sample values. That is, an ALF filter is applied to each component independent of data in another component. Further, it should be noted that JVET-N1001 and JVET-O2001 specify deblocking, SAO, and ALF filters which can be described as being generally based on the deblocking, SAO, and ALF filters provided in ITU-T H.265 and JEM.

Figure 3:
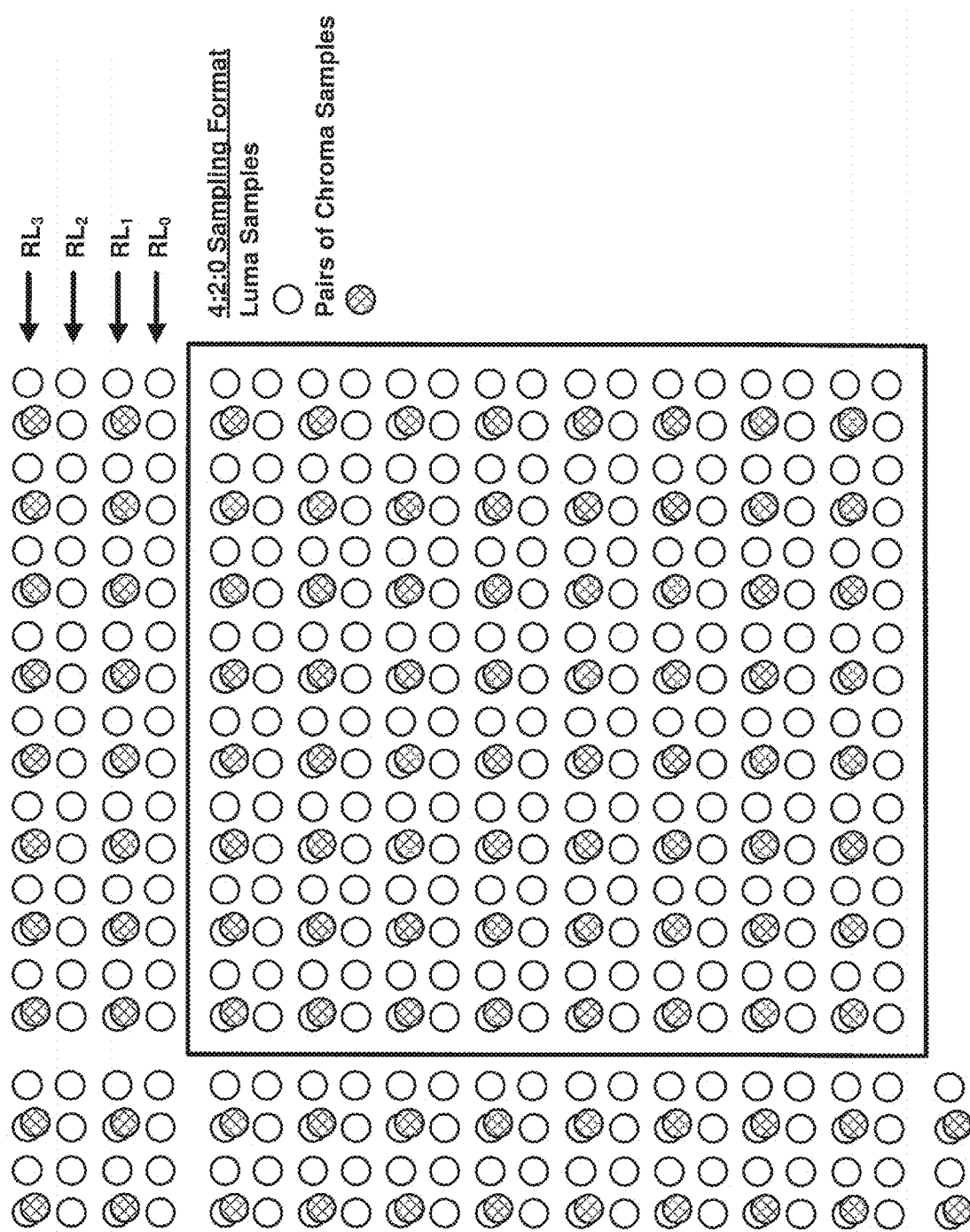
FIG. 3 is a conceptual diagram illustrating an example of a video component sampling format that may be utilized in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 3 is a conceptual diagram illustrating an example of a coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, in the example illustrated in FIG. 3, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component. Referring to FIG. 3, for luma samples, the line of samples immediately adjacent above the video block may be referred to as reference line 0 ($RL_0$) and the subsequent above lines of samples may to respectively referred to as reference line 1 ($RL_1$), reference line 2 ($RL_2$), and reference line 3 ($RL_3$). Similarly, columns of samples left of the current video block may be classified as references lines in a similar manner (i.e., the line of samples immediately adjacent left the video block may be referred to as reference line 0 ($RL_0$)).

It should be noted that for a sampling format, e.g., a 4:2:0 sample format, a chroma location type may be specified. That is, for example for the 4:2:0 sample format, horizontal and vertical offset values which indicate relative spatial positioning may be specified for chroma samples with respect to luma samples. Table 2 provides a definition of HorizontalOffsetC and VerticalOffsetC for the 5 chroma location types provided in JVET-N1001 and JVET-O2001. Further, FIGS. 4A-4F illustrate the chroma location types specified in JVET-N1001 and JVET-O2001 for the 4:2:0 sample format.

TABLE 2

| ChromaLocType | HorizontalOffsetC | VerticalOffsetC |
| --- | --- | --- |
| 0 | 0 | 0.5 |
| 1 | 0.5 | 0.5 |
| 2 | 0 | 0 |
| 3 | 0.5 | 0 |
| 4 | 0 | 1 |
| 5 | 0.5 | 1 |

With respect to the equations used herein, the following arithmetic operators may be used:

+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.
x % y Modulus. Remainder of x divided by y, defined only for integers x and y with x>=0 and y>0.
Further, the following logical operators may be used:
x && y Boolean logical "and" of x and y
x∥y Boolean logical "or" of x and y
! Boolean logical "not"
x?y:z If x is TRUE or not equal to 0, evaluates to the value of y; otherwise, evaluates to the value of z.
Further, the following relational operators may be used:
> Greater than
>= Greater than or equal to
< Less than
<= Less than or equal to
== Equal to
!= Not equal to
Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ A Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Further, the following assignment operators may be used:
= Assignment operator
++ Increment, i.e., x++ is equivalent to x=x+1; when used in an array index, evaluates to the value of the variable prior to the increment operation.
— Decrement, i.e., x— is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Further, the following defined mathematical functions may be used:

$$Abs(x) = \begin{cases} x; & x >= 0 \\ -x; & x < 0 \end{cases}$$

Floor(x) the largest integer less than or equal to x.
Log 2(x) the base-2 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

$$Clip3(x, y, z) = \begin{cases} x; & z < x \\ y; & z > y \\ z; & \text{otherwise} \end{cases}$$

Figure 5:
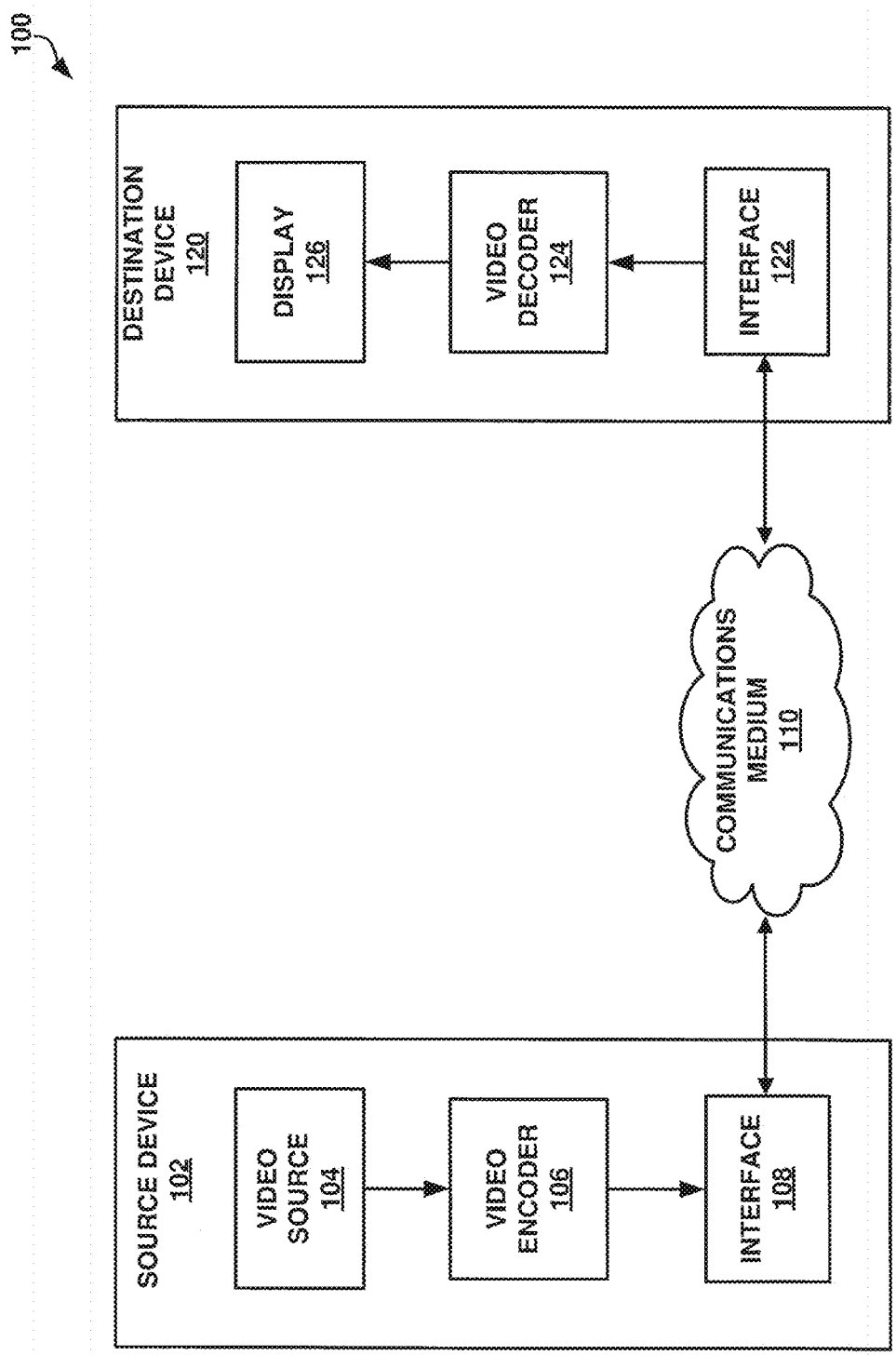
FIG. 5 is a block diagram illustrating an example of a system that may be configured to encode and decode video data according to one or more techniques of this disclosure.

FIG. 5 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 5, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
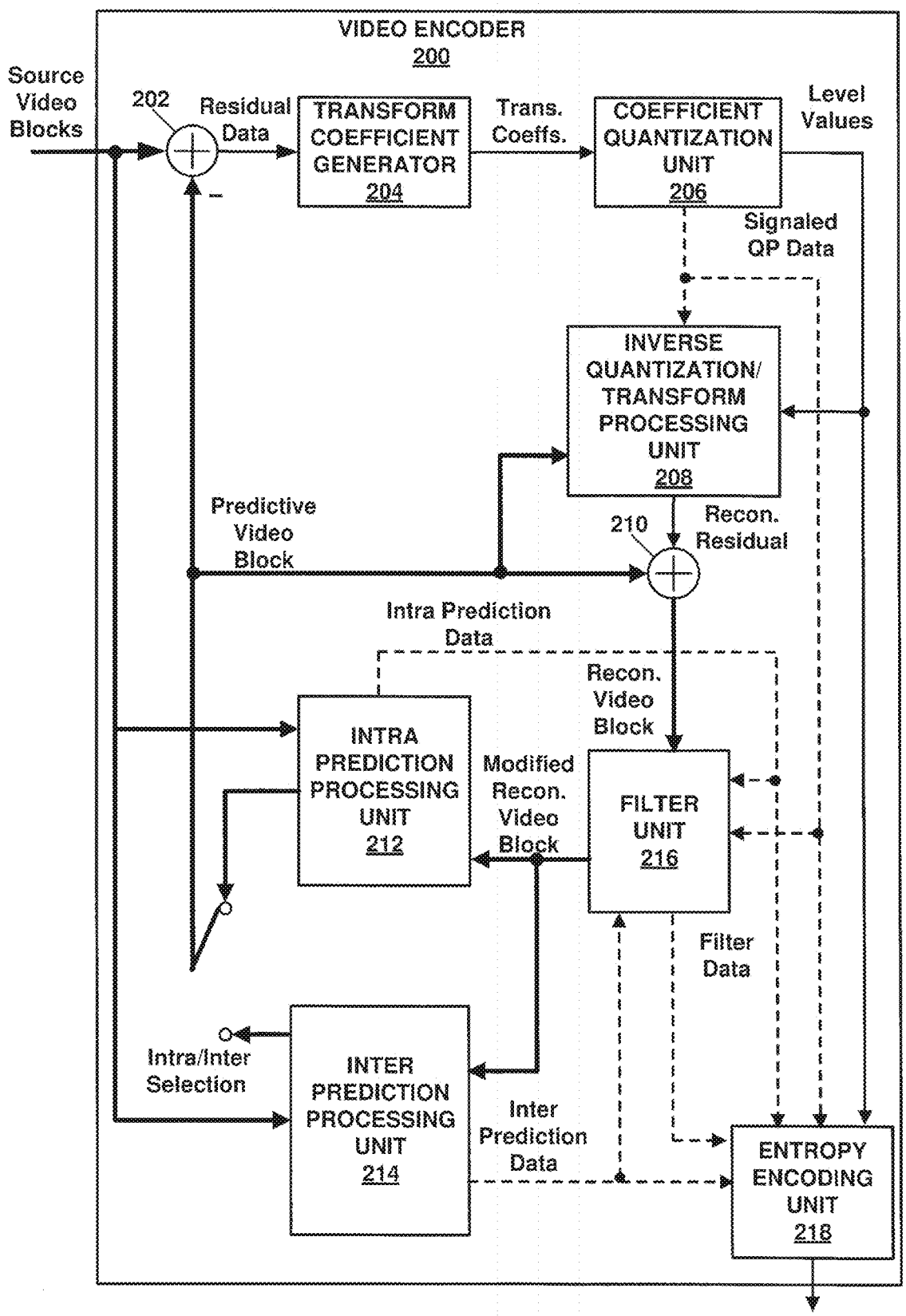
FIG. 6 is a block diagram illustrating an example of a video encoder that may be configured to encode video data according to one or more techniques of this disclosure.

FIG. 6 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

Referring again to FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 6, inter prediction processing unit 214 may receive reconstructed video block via filter unit 216. Entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 8:
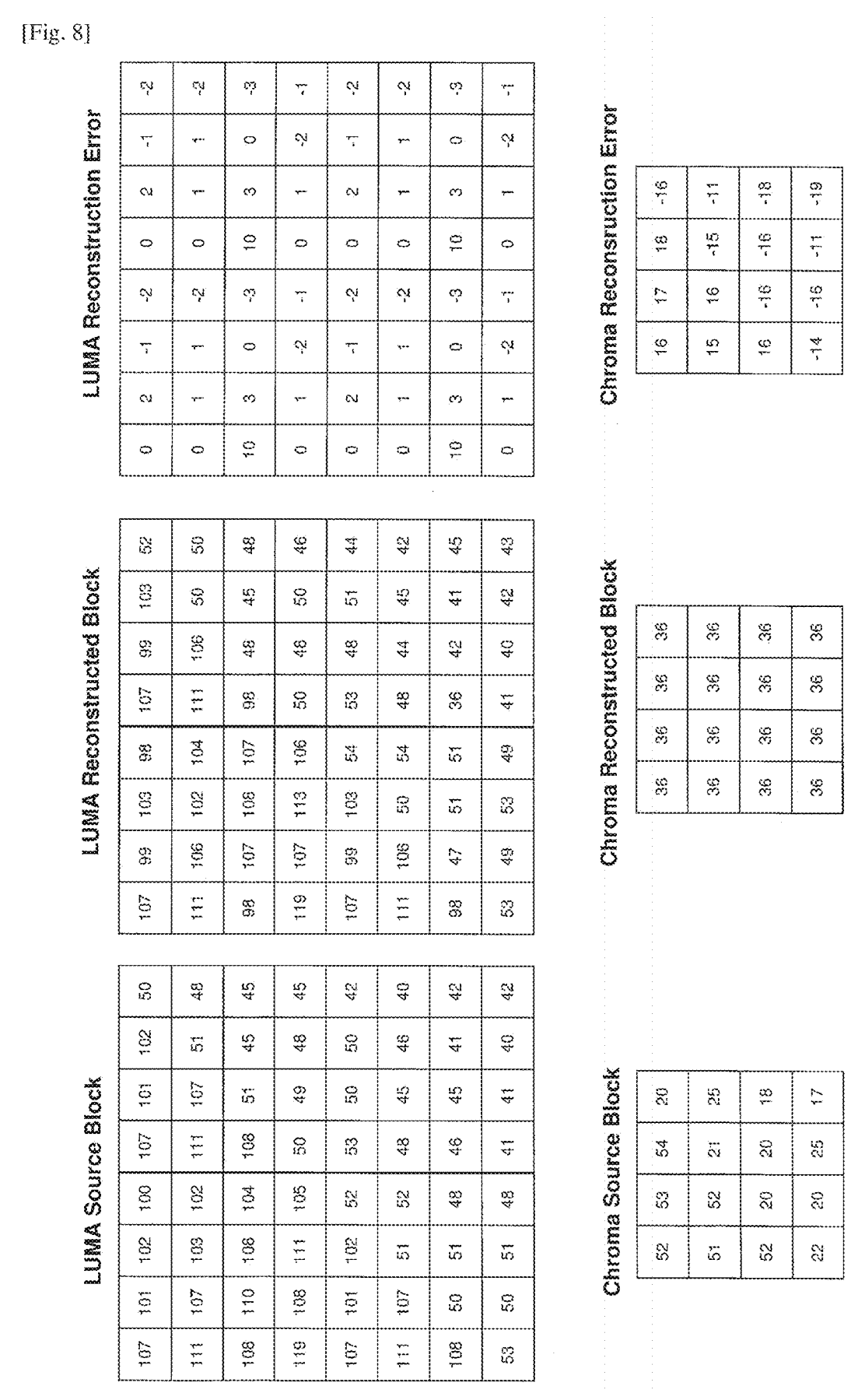

Referring again to FIG. 6, filter unit 216 may be configured to perform deblocking, Sample Adaptive Offset (SAO) filtering and/or ALF filtering as described above. Further, filter unit 216 may be configured to perform one or more the techniques described herein for reducing a reconstruction error according to cross-component cor-relation. As described above, for the ALF filter in JEM, each component uses a set of sample values from the respective component as input and derives output sample values in a manner that is independent of the other components. Filtering independently on a component-by-component basis may be less than ideal, as there may be correlations between components and/or channels of video data that may be useful for minimizing a reconstruction error. For example, referring to FIG. 8, FIG. 8 illustrates an example of an 8×8 luma source block and a corresponding 4×4 chroma source block (i.e., according to a 4:2:0 sampling format) and corresponding reconstructed blocks and reconstruction errors. As illustrated in FIG. 8, both of the source blocks include an edge about the diagonal, which would be typical in a case of a texture, a shape edge, or the like. However, for the reconstructed chroma component the fidelity is lost (e.g., due to a high level of quantization, etc.) compared to the luma component and the edge is not recovered.

Figure 7:
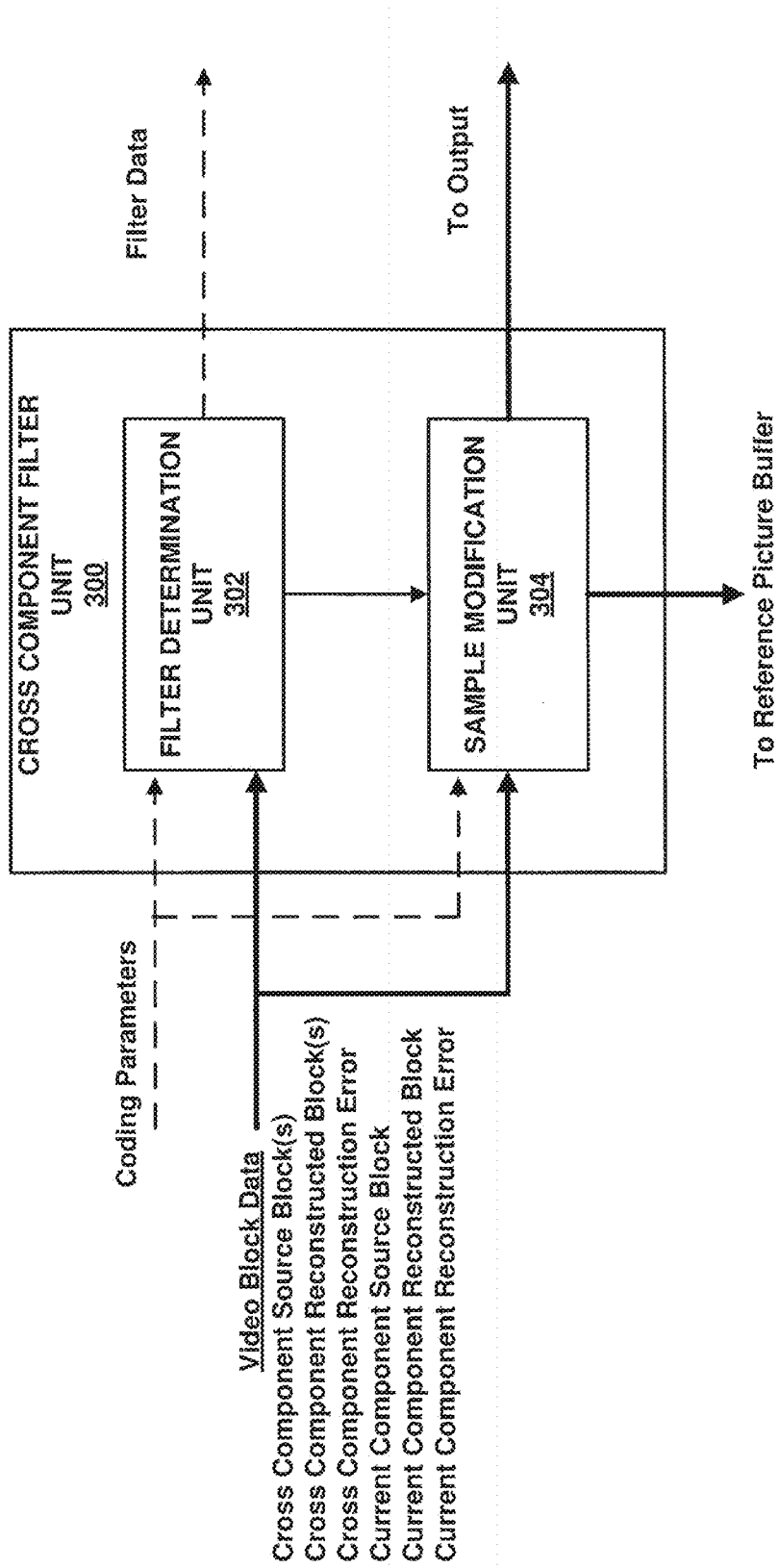
FIG. 7 is a block diagram illustrating an example of cross component filter unit that may be configured to encode video data according to one or more techniques of this disclosure.
Figure 11A:
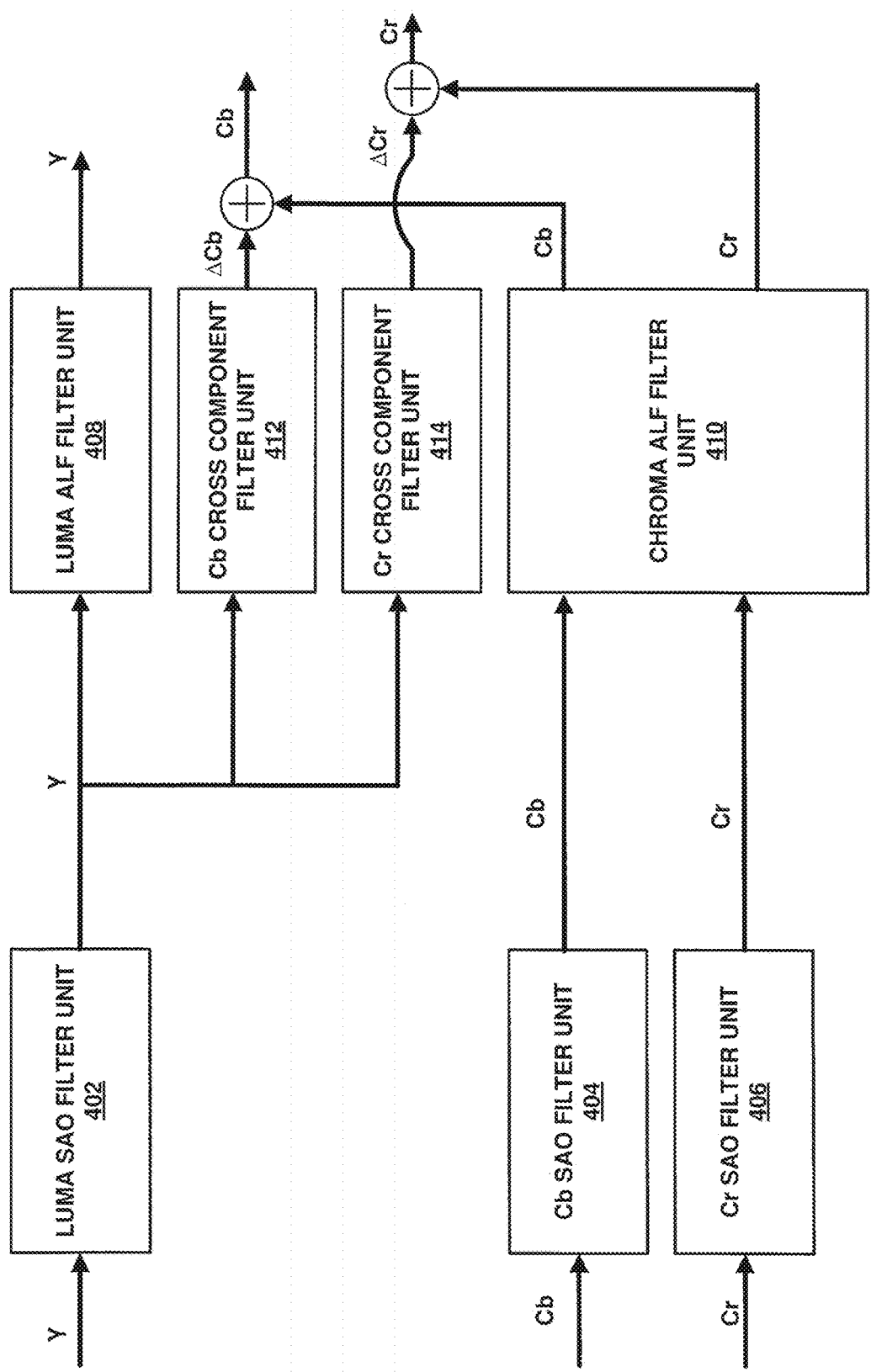
FIG. 11A is a block diagram illustrating example of cross component filter units that may be configured to reduce a reconstruction error according to one or more techniques of this disclosure.
Figure 11B:
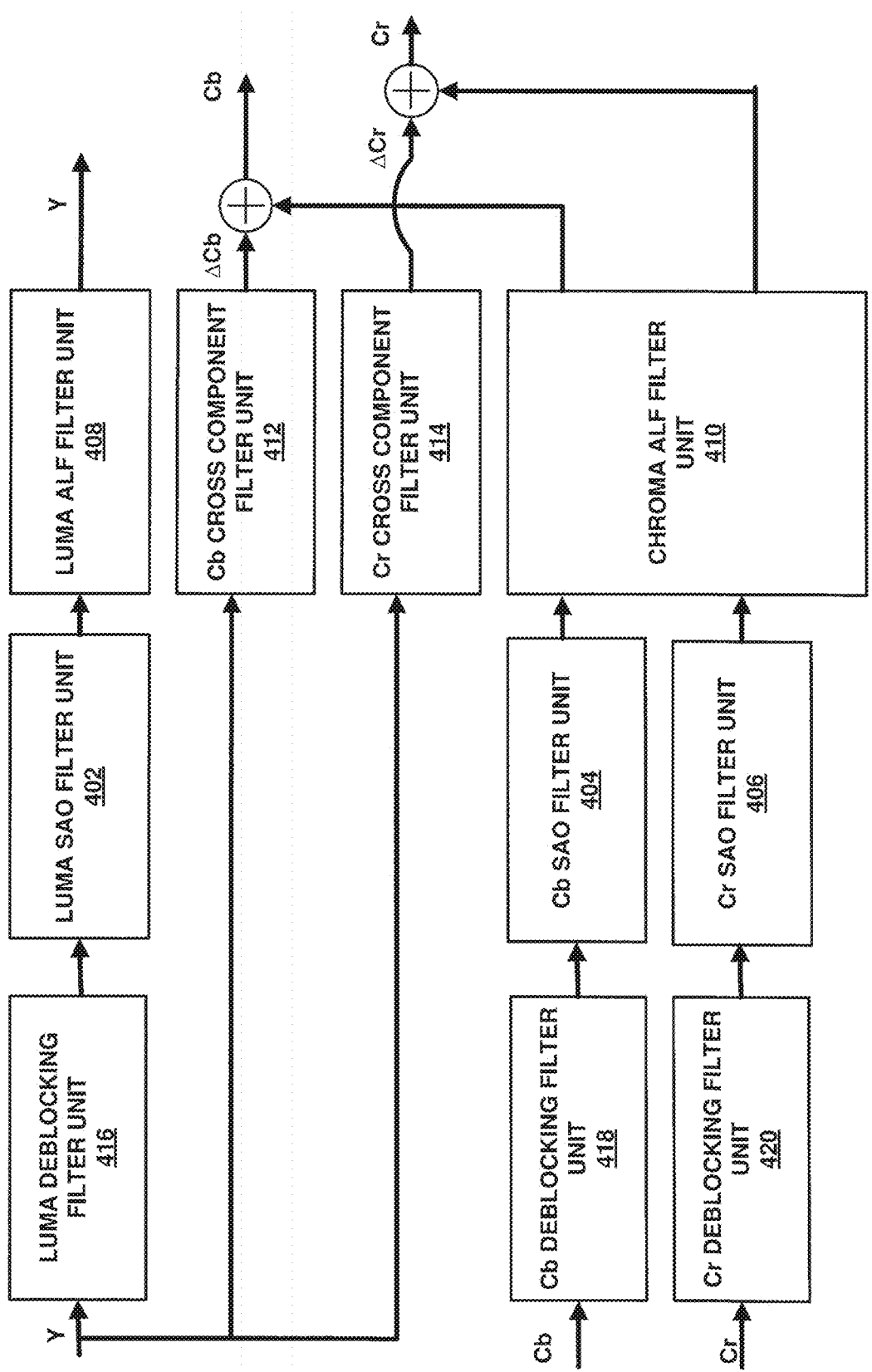
FIG. 11B is a block diagram illustrating example of cross component filter units that may be configured to reduce a reconstruction error according to one or more techniques of this disclosure.
Figure 11C:
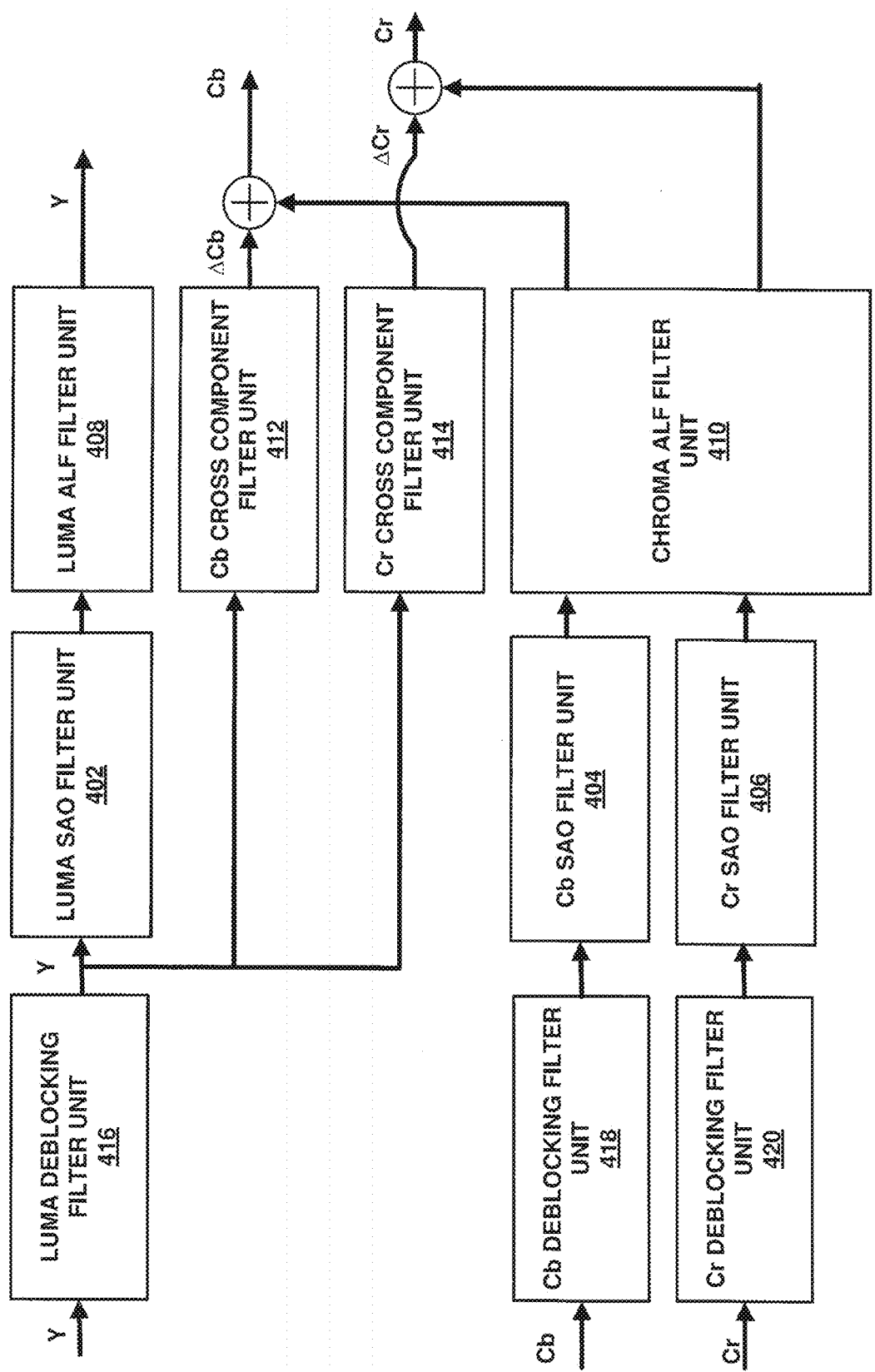
FIG. 11C is a block diagram illustrating example of cross component filter units that may be configured to reduce a reconstruction error according to one or more techniques of this disclosure.
Figure 11D:
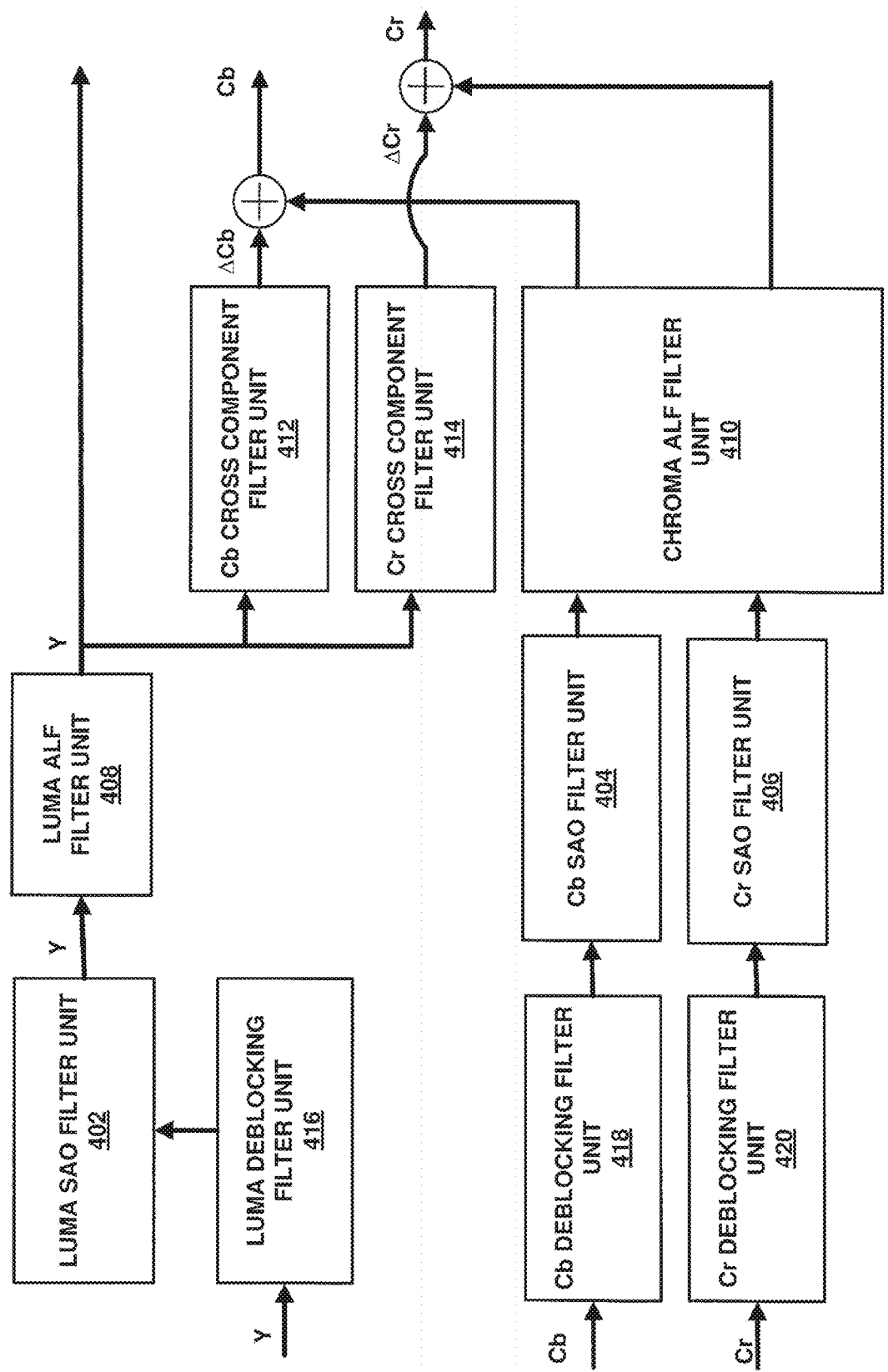
FIG. 11D is a block diagram illustrating example of cross component filter units that may be configured to reduce a reconstruction error according to one or more techniques of this disclosure.

According to the techniques herein, a filter unit may be configured to predict and/or refine information in a first color channel and/or component from information in a second color channel and/or component, which may provide improved coding efficiency of the first color channel and/or component, as the fidelity of the color channel and/or component is increased with a small number of bits. FIG. 7 illustrates an example of a cross component filter unit that may be configured to encode video data according to one or more techniques of this disclosure. As illustrated in FIG. 7, cross component filter unit 300 includes filter determination unit 302 and sample modification unit 304. It should be noted that cross component filter unit 300 illustrates an example of a cross component filter unit that may be present in a video encoder. Examples of corresponding cross component filter units that may be present in a video decoder are described in further detail below. As illustrated in FIG. 7, filter determination unit 302 and sample modification unit 304 may receive coding parameter information (e.g., an intra prediction mode) available at the time a current block is encoded/decoded and video block data which, as illustrated in FIG. 7, at a video encoder, may include: Cross Component Source Block(s); Cross Component Reconstructed Block(s); Cross Component Reconstruction Error; Current Component Source Block; Current Component Reconstructed Block; and Current Component Reconstruction Error. That is, referring to the example illustrated in FIG. 8, when the chroma reconstructed block is to be filtered, all of the information in FIG. 8 may be available at cross component filter unit 300. As such, filter determination unit 302 may derive a filter to be used on the chroma reconstructed block based on the video data and sample modification unit 304 may perform filtering according to the derived filter. As illustrated in FIG. 7, sample modification unit 304 may output the modified reconstructed block to the reference picture buffer (i.e., as an in-loop filter) and output the modified reconstructed block to an output (e.g., a display). Further, as illustrated in FIG. 7, filter determination unit 302 may output filter data. That is, filter data specifying a derived filter may be signaled to a video decoder. Examples of such signaling are described in further detail below. It should be noted that with respect to FIG. 8, that there may be several ways of reducing a reconstruction error at a video encoder, e.g., reducing quantization and/or performing an improved prediction technique. Further, in some cases, it may be possible for a video encoder to signal the reconstruction error directly. However, cross component filtering according to the techniques herein provides a way to reduce a reconstruction error while signaling a relatively small amount of information. That is, for example, the cross component filtering techniques described herein may provide a way to reduce a reconstruction error at a video decoder while being more efficient that other techniques for reducing a reconstruction error. For example, it may take fewer bits to signal filter data than to signal higher fidelity residual information for a component.

Thus, cross component filter unit 300 may operate by taking a first color component and one or more second color components as input and provide an enhanced, first color component as output. It should be noted that although the examples herein are described with respect to luma, Cb and Cr components, the techniques described herein are generally applicable to other video formats (e.g., RGB) and other types of video information such as infra-red, depth, disparity or other characteristics.

The following equation provides an example of model of a filter that takes as input sample values from multiple components and outputs a filtered sample value $f_i(x,y)$ and thus, in one example, cross component filter unit 300 may implement a filter process based on the equation.

$$f_i(x, y) = \sum_{(x_0,y_0) \in S_{i,0}} I_0(g(x, y, i, 0) + x_0, h(x, y, i, 0) + y_0) c_0(x_0, y_0) +$$
$$\sum_{(x_1,y_1) \in S_{i,1}} I_1(g(x, y, i, 1) + x_1, h(x, y, i, 1) + y_1) c_1(x_1, y_1) +$$
$$\sum_{(x_2,y_2) \in S_{i,2}} I_2(g(x, y, i, 2) + x_2, h(x, y, i, 2) + y_2) c_2(x_2, y_2) + I_i(x, y)$$

Where,
$f_i(x,y)$:
is an output of component i at sample location (x,y);
$S_{i,0}$; $S_{i,1}$; and $S_{i,2}$: Defines a set of sample value locations relative to an origin in the respective components 0, 1, 2;
g(x,y,i,0) and h(x,y,i,0), g(x,y,i,1) and h(x,y,i,1), and g(x,y,i,2) and h(x,y,i,2): Determine the origin of support based on x, y, i and input component. The function g( ), h( ) may further depend on chroma format, chroma location type, color gamut, filter shape;
$c_0(x_0,y_0)$ $(x_0,y_0)$, and $c_2(x_0, y_0)$: Are filter coefficient values for support region for each component;
$I_0$, $I_1$, and $I_2$: Are Input sample values from each component; and
$I_i(x,y)$: is a Sample value of component i at sample location (x,y) prior to filtering.

Thus, according to the techniques herein, cross component filter unit 300 may be configured to reduce a reconstruction error of a current component by adding a refinement to a reconstructed sample value of the current component based on a derived filtering function having reconstructed sample values of other components as input. In one example, the reconstructed sample values of other components used as input may be referred to as filter support. FIGS. 9A-9F are conceptual diagrams illustrating examples of support samples that may be used for cross component filtering in accordance with one or more techniques of this disclosure. In the example illustrated in FIGS. 9A-9F, for each of the 4:2:0 sample format chroma location types provided in JVET-N1001 and JVET-O2001, luma support samples are illustrated for a chroma sample to be filtered. That is, 5×5, 5×6, 6×5, and/or 6×6 support samples may be used. It should be noted, in the examples in FIGS. 9A-9F, the luma support is defined to be symmetric around a chroma sample value. It should be noted that in other examples, luma support may undergo a phase shift depending on a chroma location type before being input to a filtering stage that does not depend on chroma location type. As described in further detail below, for each support sample, a filter coefficient may be determined and signaled. In one example, according to the techniques herein, for chroma samples included in a video block, the relative position of the support for each sample may be based on the sample format. For example, in one example, according to the techniques herein, for the 4:2:0 sample format, when a chroma sample in a video block at chroma location $(x_C, y_C)$ corresponds to support with an origin at luma location $(x_L,y_L)$, the origin of the support for a chroma sample in the video block at chroma location $(x_C+m, y_C+n)$ may be at luma location $(x_C+2m, y_C+2n)$; for the 4:2:2 sample format, when a chroma sample in a video block at chroma location $(x_C, y_C)$ corresponds to support with an origin at luma location $(x_L,y_L)$, the origin of the support for a chroma sample in the video block at chroma location $(x_C+m, y_C+n)$ may be at luma location $(x_C+2m, y_C+n)$; and for the 4:4:4 sample format, when a chroma sample in a video block at chroma location $(x_C, y_C)$ corresponds to support with an origin at luma location $(x_L,y_L)$, the origin of the support for a chroma sample in the video block at chroma location $(x_C+m, y_C+n)$ may be at luma location $(x_C+m, y_C+n)$. It should be noted that in this example, a shift of a chroma sample location corresponds to a shift in luma location of the origin of the support, where the ratio between the two shifts is based on chroma format.

In one example, according to the techniques herein, the application of cross component filtering may be based on the properties of samples included in a filter support region. For example, in one example, the luma sample values in a support region may be analyzed and whether cross component filtering is applied may be based on the analysis. For example, in one example, variance and/or deviation of samples in a support region may be computed and if the variance and/or deviation has certain characteristics, e.g., the region is smooth (i.e., the variance is less than a threshold), then no cross component filtering may be applied for the region. In one example, the cross component filter selection (including whether a filter is applied and when a filter is applied, which filter is applied) may be based on a luma classification filter index of a luma sample corresponding to the chroma sample being evaluated. In one example, the classification filter index for a luma sample may be derived as described in JVET-O2001. In one example, no cross component filtering may be applied for when a luma classification filter index is determined to be in a subset of luma classification filer indices. As described in further detail below, values of local region control flags and/or syntax elements may be used to indicate/determine whether cross-component filtering is applied for a region and if cross-component filtering is applied for a region, which cross-component filter is applied. In one example, the application of cross component filtering may be based on properties of samples included in a filter support region and/or values of local region control flags and/or syntax elements. That is, for example, how luma support samples are analyzed may be based on a local region control flag and/or syntax elements (e.g., if flag==0, compute/evaluate variance, otherwise, compute/evaluate luma classification filter index). Further, in one example, filter selection be based on values of syntax elements and properties of luma support samples. For example, a value of 0 for a syntax element may indicate cross component filtering is not applied for a region, a value of 1 for the syntax element and the variance of luma support being greater than a threshold may indicate a filter having a first filter coefficient set is applied, a value of 1 for the syntax element and the variance of luma support not being greater than a threshold may indicate a filter having a second filter coefficient set is applied, a value of 2 for the syntax element and the variance of luma support being greater than a threshold may indicate a filter having a third filter coefficient set is applied, a value of 2 for the syntax element and the variance of luma support not being greater than a threshold may indicate a filter having a fourth filter coefficient set is applied, etc.

The Appendix attached hereto provides an example of data sets corresponding to an implementation of cross component filter described herein. That is, in the Appendix, data set orgBlock represents sample values of an original 32×32 U component block; data set preFilteringBlock represents sample values of the reconstructed 32×32 U component block; data set orgError represents the reconstruction error between the original 32×32 U component block and the reconstructed 32×32 U component block; data set bestSupportY represents sample values of a 67×68 Y component block which provides filter support for filtering the reconstructed 32×32 U component block; data set bestSupportU represents sample values of a 36×36 U component block which provides support for filtering the reconstructed 32×32 U component block; data set bestSupportV represents sample values of a 36×36 V component block which provides support for filtering the reconstructed 32×32 U component block; data set coeffY represents filter coefficients in a 5×6 filter for sample values of the 67×68 Y component support block; data set coeffU represents filter coefficients in a 5×5 filter for sample values of the 36×36 U component support block; data set coeffV represents filter coefficients in a 5×5 filter for sample values of the 36×36 V component support block; data set bestOutput represents the samples values of the filtered reconstructed 32×32 U component block; data set bestError represents the represents the error between the original 32×32 U component block and the filtered reconstructed 32×32 U component block; data set signedimprovement is equal to is Abs(orgError)-Abs(bestError) and represents the change in the reconstruction error resulting from the filtering; and data set positive improve represents reconstructed sample values where the reconstruction error was reduce as a result of the filtering. Thus, according to the techniques herein, a reconstruction error may be reduced for one or more or a majority of samples by applying a cross component filter. It should be noted for particular types of video content, the amount a reconstruction error is improved according to a mathematical relationship may have varying results on how the perceived visual quality of video is improved. That is, for example, relatively small values of signedimprovement may result in relatively significant improvements is visual quality.

Figure 10:
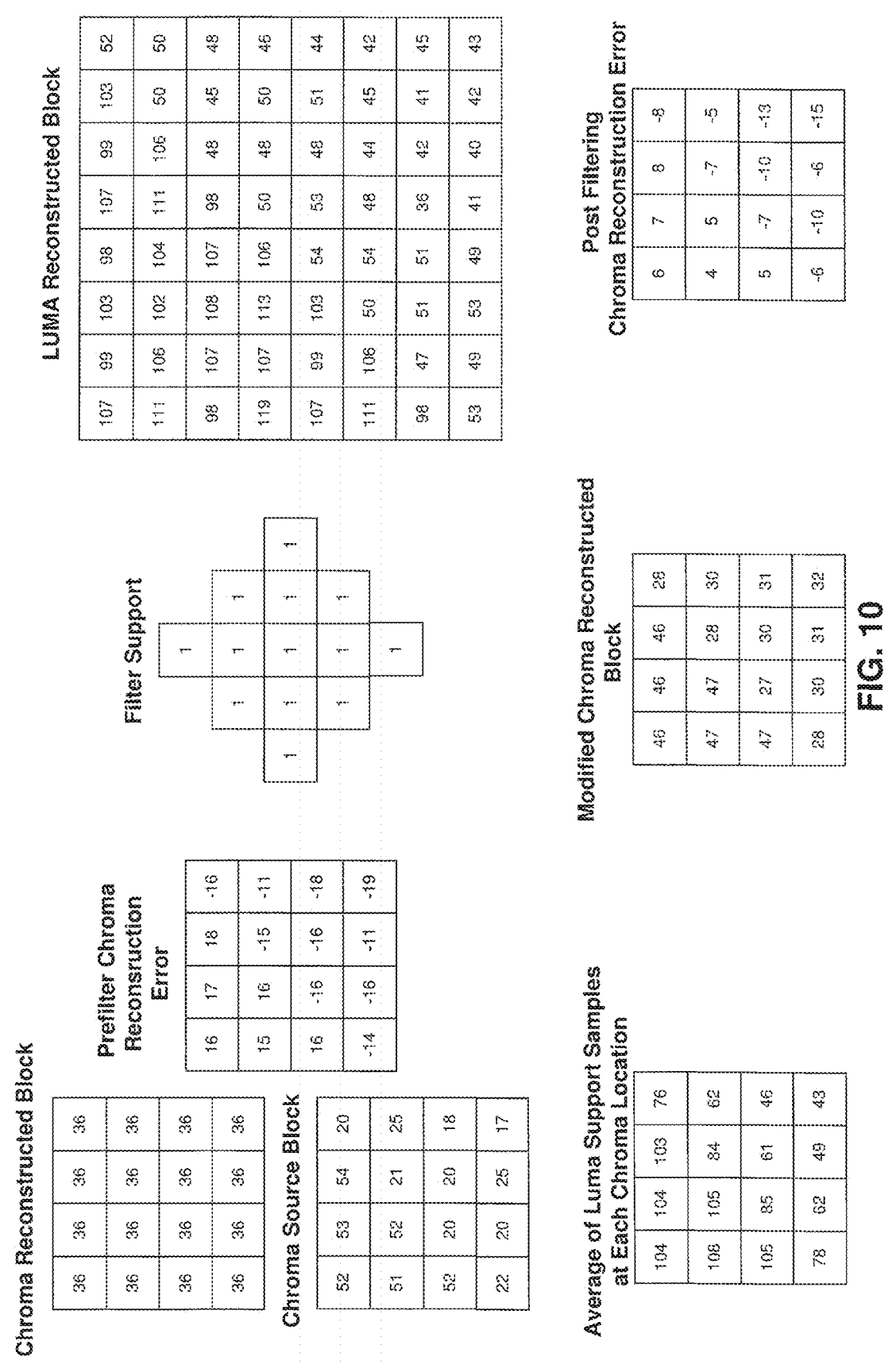

As described above, cross component filter unit 300 may generally operate by taking a first and one or more second color components as input and provide an enhanced first color component as output. That is, a filtering process performed by cross component filter unit 300 may take as input luma sample values which may be used to predict the difference between original respective chroma sample value and output refined chroma sample values based on the prediction. Referring again to the example illustrated in FIG. 8, FIG. 10 is conceptual diagram illustrating an example of reducing a reconstruction error using cross component filtering accordance with one or more techniques of this disclosure. FIG. 10 provides an example where a reconstruction error is reduced by taking the average of support samples and if the average is greater than 90, the average divided by 10 is added to the reconstructed sample; and if the average is not greater than 90, the average divided by 10 is subtracted from the reconstructed sample. That is, in the example, the prediction filter is generally described as: if support average is greater than threshold1, add weight1 multiplied by support average; else add weight2 multiplied by support average. As illustrated in the example illustrated in FIG. 10, the post filtering chroma reconstruction error provides reconstruction error reduction. Thus, according to the techniques herein, cross component filtering may reduce a reconstruction error according to a cross component filter defined according to logical functions, thresholds, weights, and the like.

As described above, JVET-N1001 and JVET-O2001 include deblocking, SAO, and ALF filters, cross component filter techniques described herein may be performed as various point in a filter chain. That is, for example, at various stages of in-loop filtering. FIGS. 11A-11D are block diagrams illustrating examples of cross component filter units that may be configured to reduce a reconstruction error according to one or more techniques of this disclosure. In FIGS. 11A-11D, luma SAO filter unit 402 represent a filtering unit configured to perform SAO filtering on luma sample values, Y, for example, SAO filtering as provided in JVET-N1001 or JVET-O2001; Cb SAO filter unit 404 represent a filtering unit configured to perform SAO filtering on chroma Cb sample values, for example, SAO filtering as provided in JVET-N1001 or JVET-O2001; Cb SAO filter unit 406 represent a filtering unit configured to perform SAO filtering on Cb sample values, for example, SAO filtering as provided in JVET-N1001 or JVET-O2001; luma ALF filter unit 408 represent a filtering unit configured to perform ALF filtering on luma sample values, Y, for example, ALF filtering as provided in JVET-N1001 or JVET-O2001; chroma ALF filter unit 410 represent a filtering unit configured to perform ALF filtering on chroma sample values, for example, ALF filtering as provided in JVET-N1001 or JVET-O2001; luma deblocking filter unit 416 represents a filtering unit configured to perform deblocking filtering on luma sample values, Y, for example, deblocking filtering as provided in JVET-N1001 or JVET-O2001; Cb deblocking filter unit 418 represents a filtering unit configured to perform deblocking filtering on Cb sample values, for example, deblocking filtering as provided in JVET-N1001 or JVET-O2001; and Cr deblocking filter unit 420 is represents a filtering unit configured to perform deblocking filtering on Cr sample values, for example, deblocking filtering as provided in JVET-N1001 or JVET-O2001. Further, in FIGS. 11A-11D, Cb cross component filter unit 412 represents an example of a cross component filter configured to generate a Cb refinement, ΔCb, according to one or more of the techniques described herein; and Cr cross component filter unit 414 represents an example of a cross component filter configured to generate a Cr refinement, ΔCr, according to one or more of the techniques described herein. Thus, as illustrated FIGS. 11A-11D cross component filtering according to the techniques herein may be applied as various points in a filtering chain. That is, cross component filtering input may be received at various points in a filtering chain and cross component filtering refinements may be output at various points in a filtering chain. It should be noted that in the example illustrated in FIG. 11B, the input of luma de-blocking is used as input to filtering which may have the advantage of reducing line buffer requirements. It should be noted that in the example illustrated in FIG. 11C, the output of luma deblocking is used as input to filtering which may have the advantage of reducing line buffer requirements with slightly improved coding efficiency. It should be noted that in the example illustrated in FIG. 11D, the output of ALF luma is used as input to filtering which may have the advantage of improved coding efficiency.

Figure 12A:
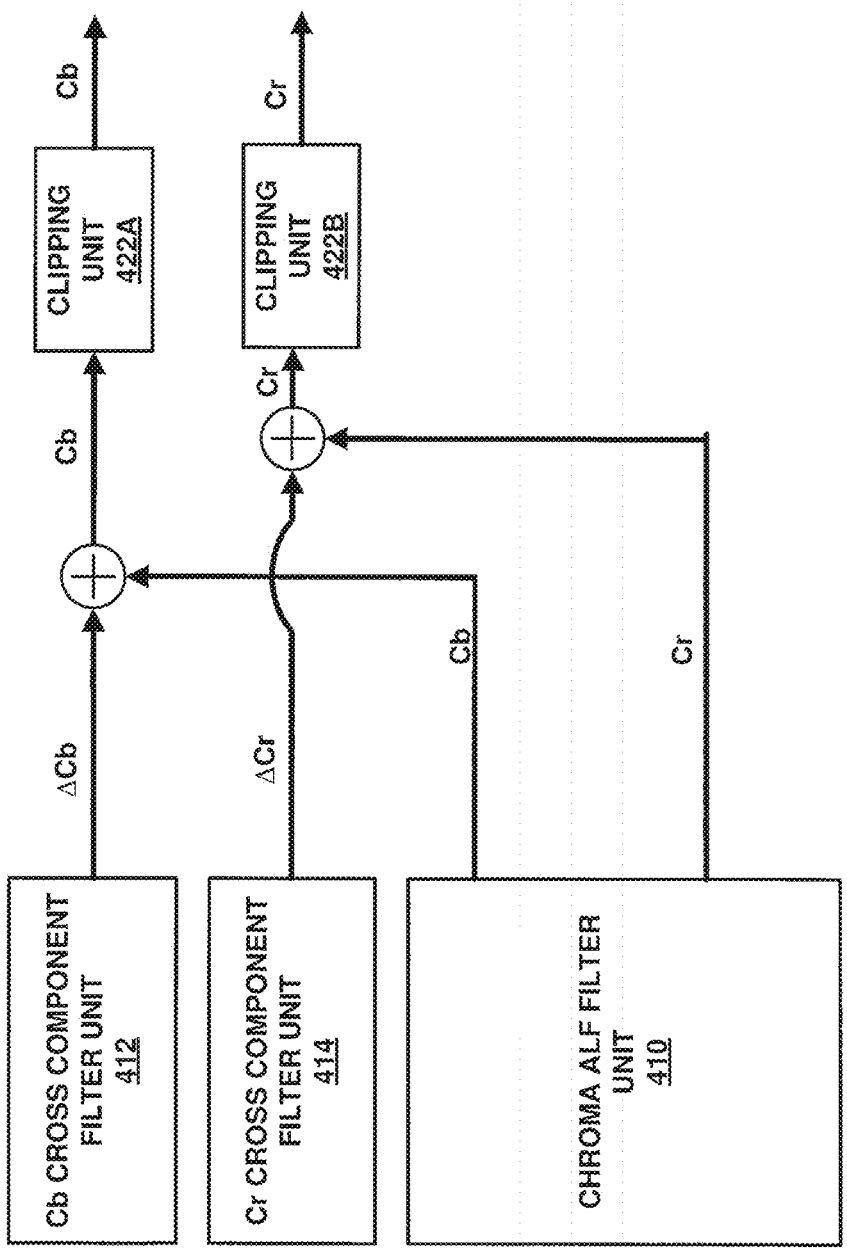
FIG. 12A is a block diagram illustrating example of cross component filter units that may be configured to reduce a reconstruction error according to one or more techniques of this disclosure.
Figure 12B:
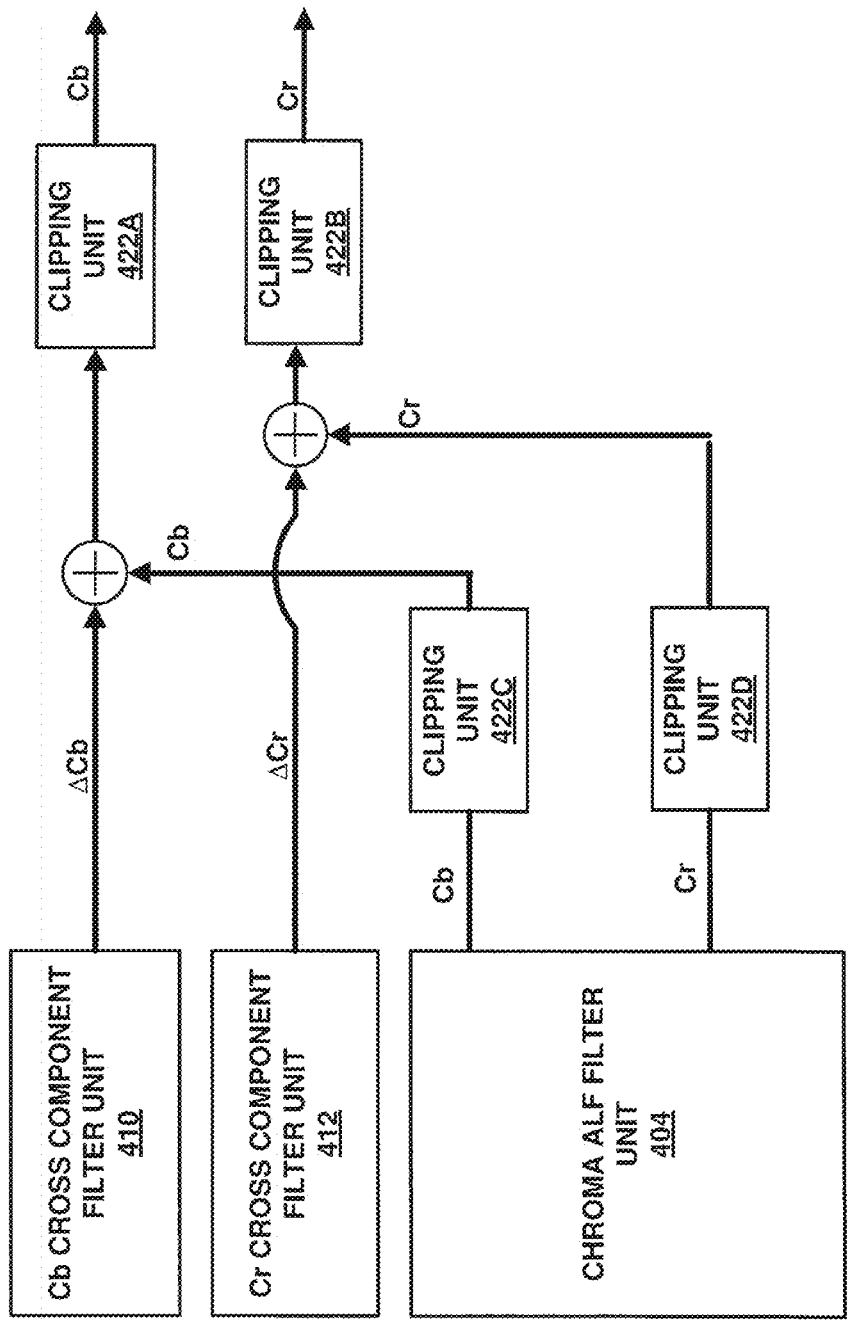
FIG. 12B is a block diagram illustrating example of cross component filter units that may be configured to reduce a reconstruction error according to one or more techniques of this disclosure.

Further, cross component filter techniques described herein may further include performing clipping operations at various points in a filter chain. That is, for example, at various stages of in-loop filter. FIGS. 12A-12B are block diagrams illustrating examples of cross component filter units that may be configured to reduce a reconstruction error according to one or more techniques of this disclosure. In FIGS. 12A-12B, commonly numbered elements are described above with respect to FIGS. 11A-11D and clipping units 422A-422D may be configured to perform a clipping function based on an output bit depth of respective component e.g., Clip3(0, $2^{BitDepthC}-1$, *). It should be noted that clipping units 422A-422D may be selectively enabled based on whether particular types of filtering are performed.

Figure 13A:
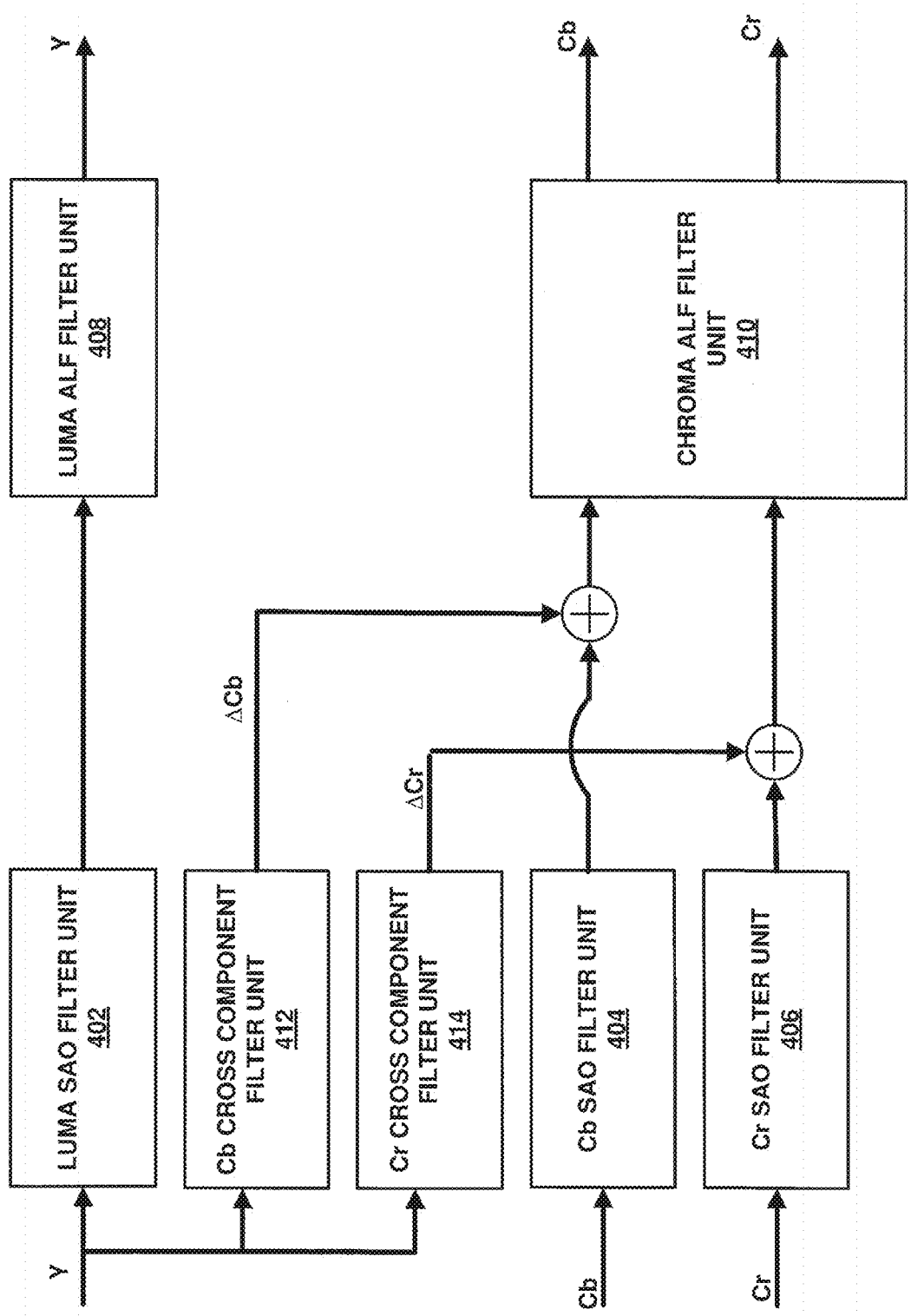
FIG. 13A is a block diagram illustrating example of cross component filter units that may be configured to reduce a reconstruction error according to one or more techniques of this disclosure.
Figure 13B:
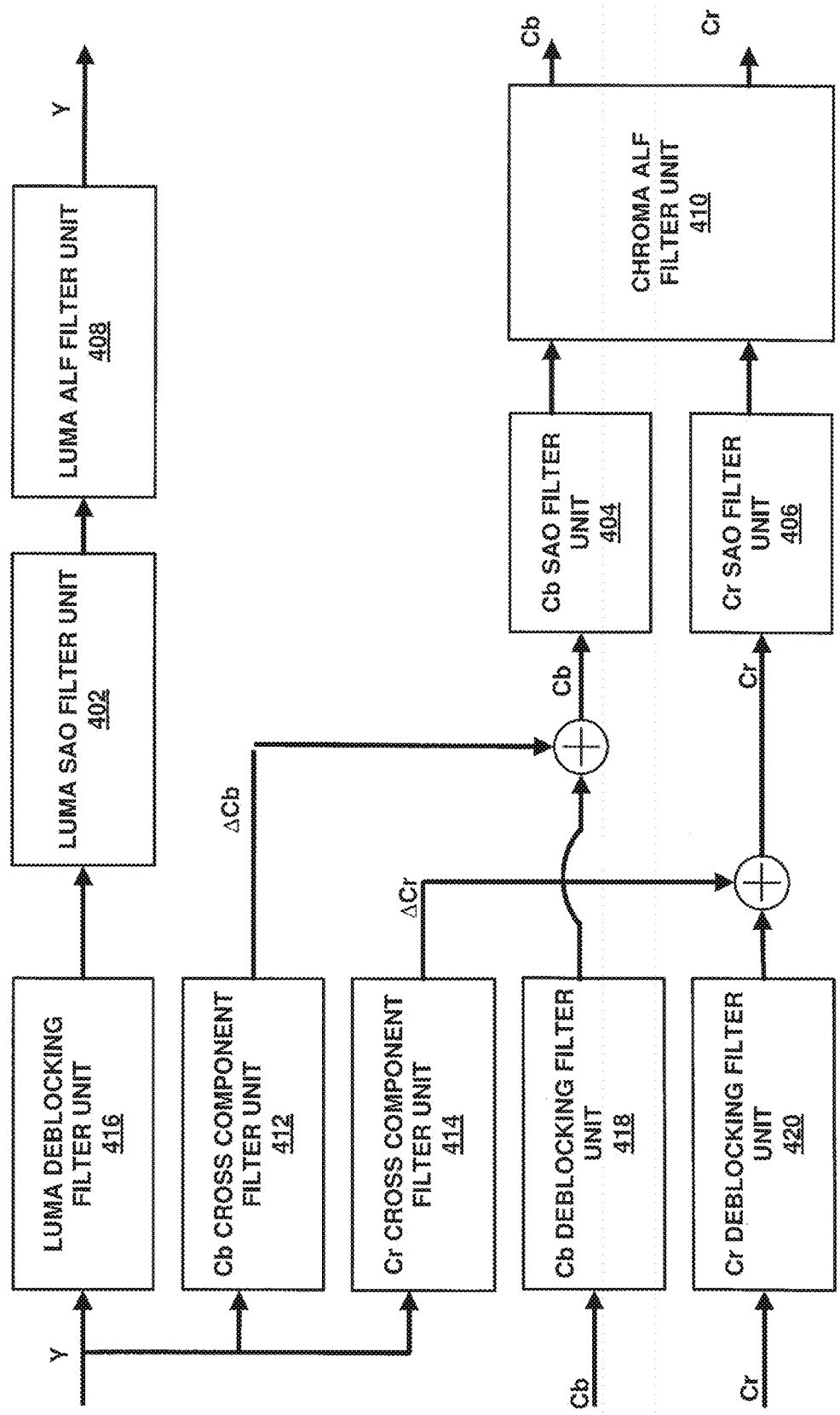
FIG. 13B is a block diagram illustrating example of cross component filter units that may be configured to reduce a reconstruction error according to one or more techniques of this disclosure.
Figure 13C:
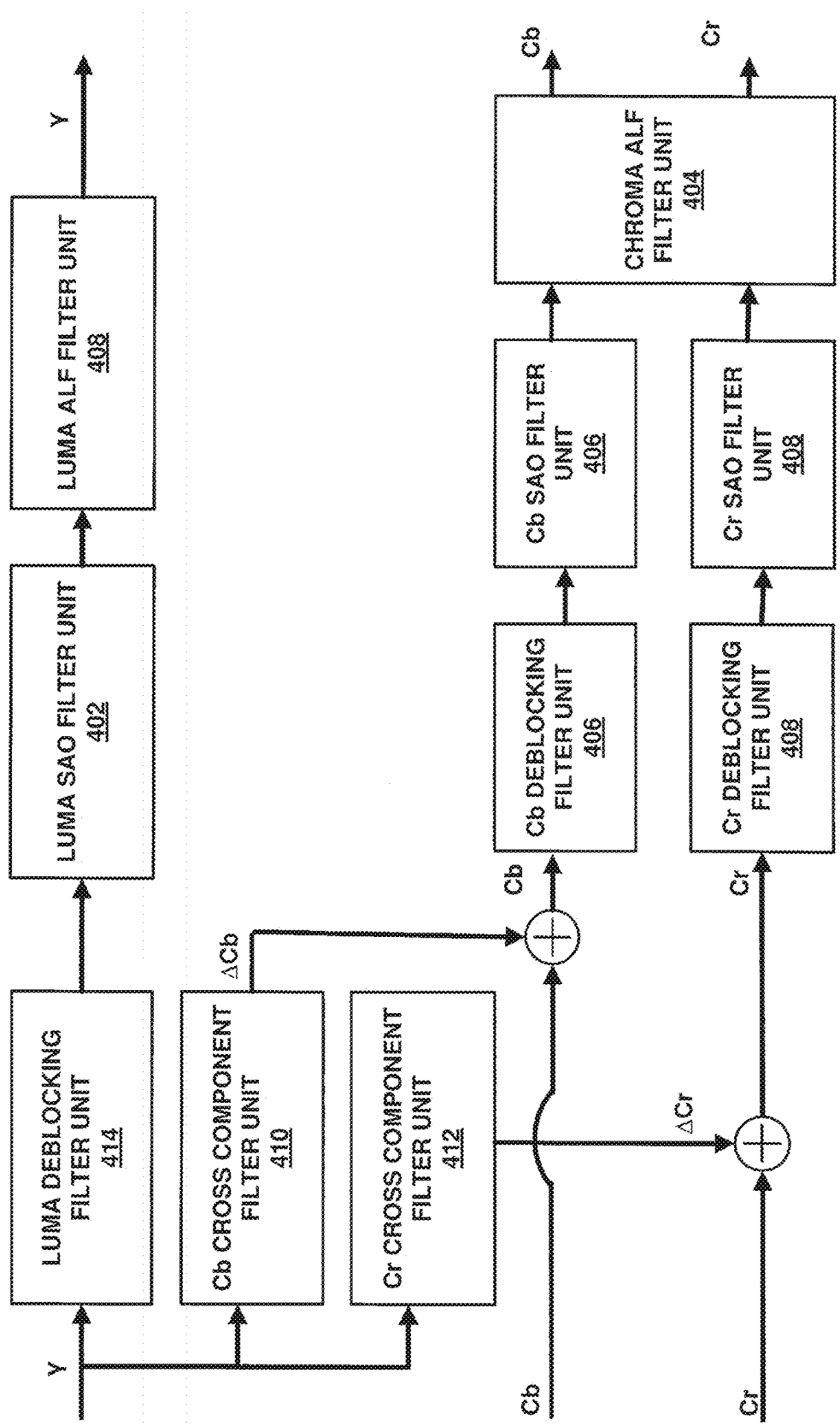
FIG. 13C is a block diagram illustrating example of cross component filter units that may be configured to reduce a reconstruction error according to one or more techniques of this disclosure.

FIGS. 13A-13B are block diagrams illustrating examples of cross component filter units that may be configured to reduce a reconstruction error according to one or more techniques of this disclosure. FIGS. 13A-13B further illustrate that cross component filtering according to the techniques herein may be applied as various points in a filtering chain. In FIGS. 13A-13C, commonly numbered elements are described above.

Further, it should be noted that in some cases, there may be more that 3 components of video data, e.g., YUV+depth. Cross component filtering techniques described herein may be generally applicable to these cases. In some cases, pre-processing of the input sample values from each component may be performed prior to the filtering operation. For example, the input sample values may be clipped. Further, in one example, the clipping range may vary for each coefficient and may be signaled in the bitstream. It should be noted that in some examples, the following equation provides an option for pre-processing of the input sample values:

$$I_j(g(x, y, i, j) + x_j, h(x, y, i, j) + y_j) =$$

$$\min(a, \max(b, I'_j(g(x, y, i, j) + x_j, h(x, y, i, j) + y_j) - derivedValue))$$

Further, another option for pre-processing of the input sample values may be as follows:

$$I_j(g(x, y, i, j) + x_j, h(x, y, i, j) + y_j) = derivedValue +$$

$$\min(a, \max(b, I'_j(g(x, y, i, j) + x_j, h(x, y, i, j) + y_j) - derivedValue))$$

Where, $I'_j(u,v)$: sample value at location (u,v) prior to processing derivedValue: is a value derived from a subset of values in $I'_j(*,*)$, e.g. (a) $I_j(g(x,y,i,j)+0, h(x,y,i,j)+0$, at origin $$\frac{\left(\begin{array}{c} I_j(g(x, y, i, j) + 0, h(x, y, i, j) + 0) + \\ I_j(g(x, y, i, j) + 1, h(x, y, i, j) + 1) \end{array}\right)}{2}, \quad (b)$$

around origin a: is a value that be received in bitstream/inferred from data received in bitstream/derived from a subset of values in $I'_j(*,*)$; and b: is a value that be received in bitstream/inferred from data received in bitstream/derived from a subset of values in $I'_j(*,*)$ In an example, b may be derived from a (e.g., b=−a), to reduce the amount of signaling needed.

Further, in one example, a generalization of input used in a cross component filter operation may be as follows:

$$f_i(x, y) =$$

$$\sum_{\substack{(x_0, y_0) \in S_{i,0,0} \\ (x_1, y_1) \in S_{i,1,0} \\ (x_2, y_2) \in S_{i,2,0} \\ (x_{c0}, y_{c0}) \in S_{c0}}} G_0(I_0(g(x, y, i, 0) + x_0, h(x, y, i, 0) + y_0), I_1(g(x, y, i, 1) + x_1,$$

$$h(x, y, i, 1) + y_1), I_2(g(x, y, i, 2) + x_2, h(x, y, i, 1) + y_2))c_0(x_{c0}, y_{c0}) +$$

$$\sum_{\substack{(x_0, y_0) \in S_{i,0,1} \\ (x_1, y_1) \in S_{i,1,1} \\ (x_2, y_2) \in S_{i,2,1} \\ (x_{c1}, y_{c1}) \in S_{c1}}} G_1(I_0(g(x, y, i, 0) + x_0, h(x, y, i, 0) + y_0), I_1(g(x, y, i, 1) + x_1,$$

$$h(x, y, i, 1) + y_1), I_2(g(x, y, i, 2) + x_2, h(x, y, i, 1) + y_2))c_1(x_{c1}, y_{c1}) \ldots +$$

$$\sum_{\substack{(x_0, y_0) \in S_{i,0,n} \\ (x_1, y_1) \in S_{i,1,n} \\ (x_2, y_2) \in S_{i,2,n} \\ (x_{cn}, y_{cn}) \in S_{cn}}} G_n(I_0(g(x, y, i, 0) + x_0, h(x, y, i, 0) + y_0),$$

$$I_1(g(x, y, i, 1) + x_1, h(x, y, i, 1) + y_1),$$

$$I_2(g(x, y, i, 2) + x_2, h(x, y, i, 1) + y_2))c_n(x_{cn}, y_{cn}) + I_i(x, y)$$

Where, $G_n()$ is a function used to combine the sample values from components and obtain a derived value corresponding to each coefficient value with index $(x_{cj}, y_{cj})$. The function $G_i()$ may depend on chroma format, chroma location type, color gamut, filter shape In one example, cross component filtering may be performed according to the following: Define a support region for luma; For 4:2:0, Upsample by 2× chroma component to be used as input; Subtract a derived value (e.g. 512 for 10-bit chroma, or local average) from the support used for the corresponding chroma component; Then take sample-wise product of luma sample value and chroma sample value corresponding to the defined support region; and Use the product as one of the inputs to the filtering operation.

Further, it should be noted that in some examples, the cross component filtering techniques described herein may be performed on a prediction or a residual. In one example, if field coding is used instead of progressive, then for luma support samples: in one example, sample values from one of the corresponding luma fields may be used and in another example, the sample values from both the luma fields may be used.

Figure 14A:
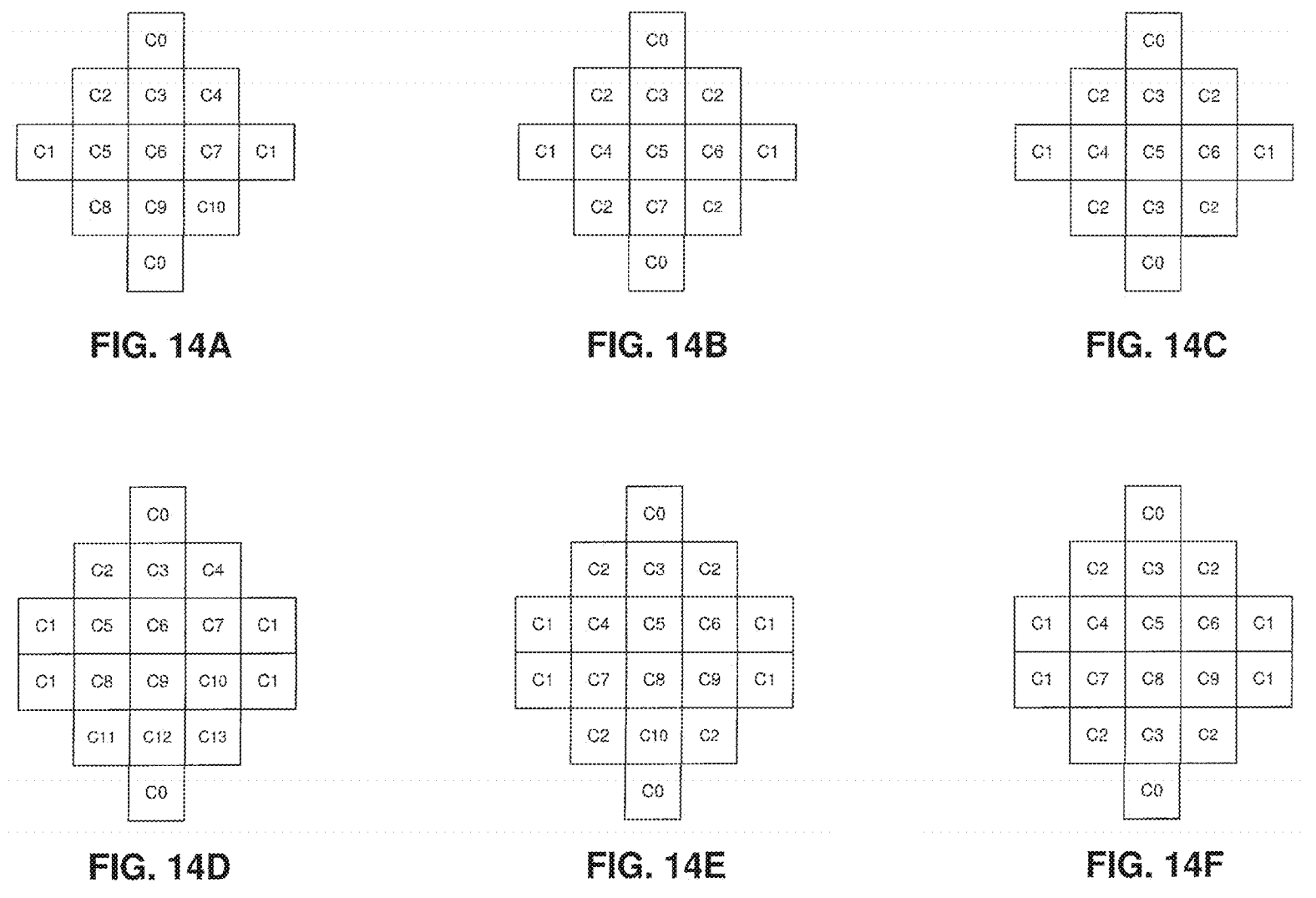
Figures 15A, 15B, 15C, 15D:
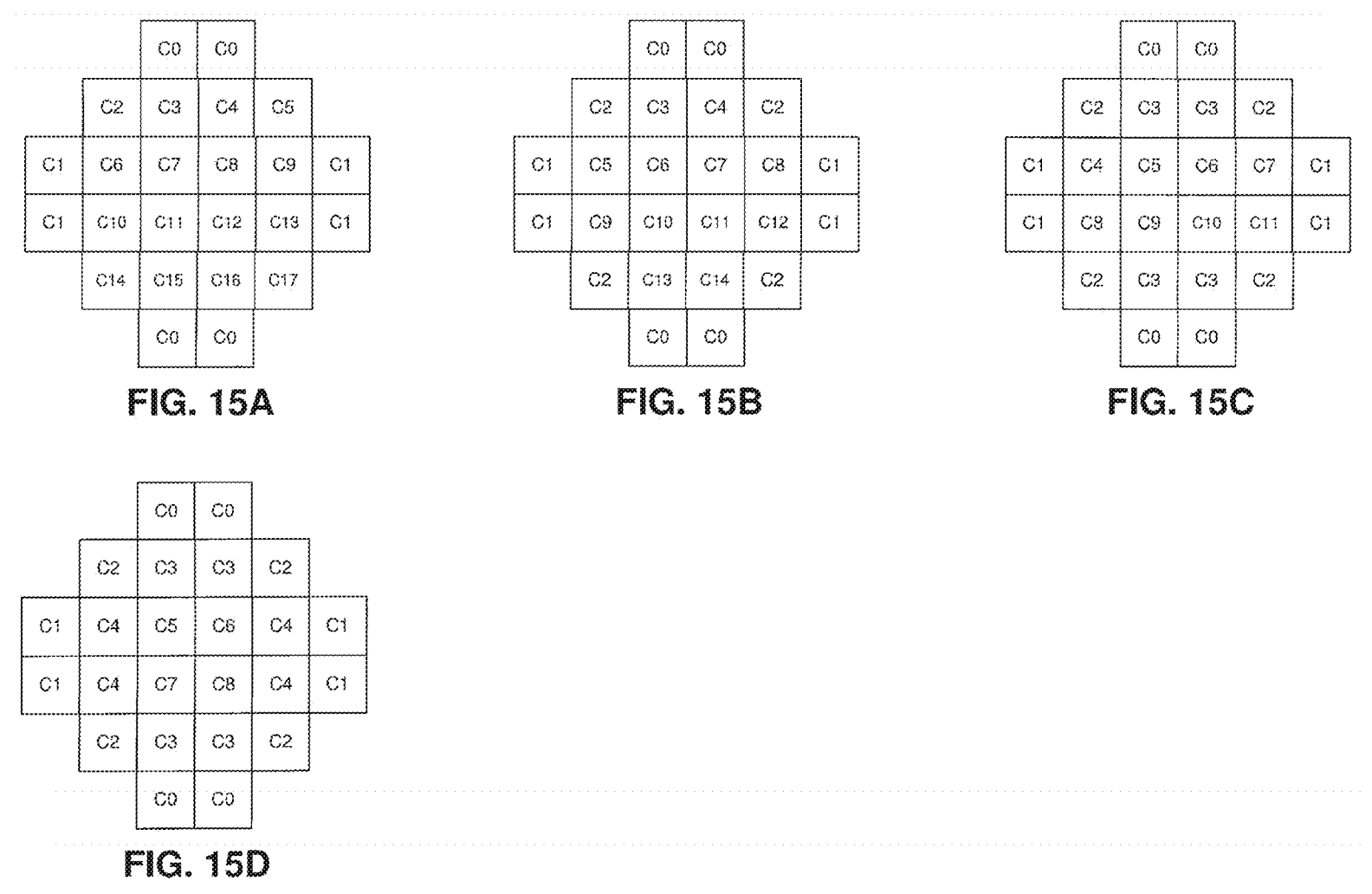

As described above, for each support sample a filter coefficient may be determined and signaled. That is, for example, for 5×5, 5×6, 6×6, and/or 6×6 filter coefficients may be signaled. FIGS. 14A-14C illustrate examples of signaling filter coefficients for 5×5 filters. FIGS. 14D-14F illustrate examples of signaling filter coefficients for 5×6 (and similarly, 6×5) filters. FIGS. 15A-15D illustrate examples of signaling filter coefficients for 6×6. In each of FIGS. 14A-15D, respective filter coefficients for a filter are indicated by $C_N$. Thus, in cases, where the same $C_N$ value is provided multiple locations of the same filter, the filter coefficients are that same, i.e., shared. In this manner, the number of filter coefficients that is signaled for a filter is reduced. For example, in FIG. 14D, 14 filter coefficients are signaled for the 18 support locations.

Figure 16B:
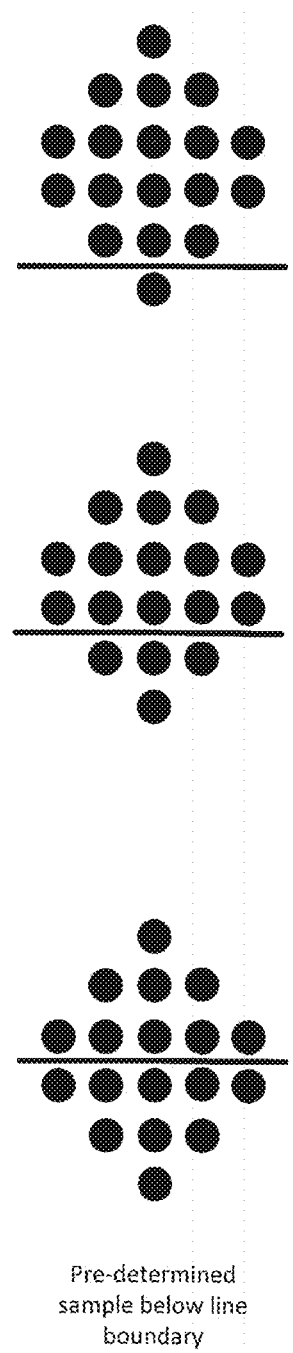
FIG. 16B is a conceptual diagram illustrating example of virtual line buffers which may be used for cross component filtering in accordance with one or more techniques of this disclosure.
Figure 16D:
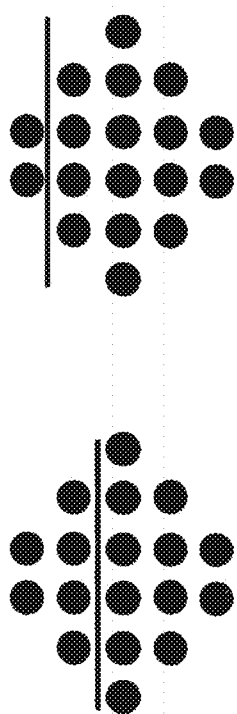
FIG. 16D is a conceptual diagram illustrating example of virtual line buffers which may be used for cross component filtering in accordance with one or more techniques of this disclosure.

In one example, it may be desirable to limit the number of line buffers within an architecture where samples are processed CTU-by-CTU. That is, for example, a virtual line boundary provides where for each CTU, samples above the horizontal VB can be processed before the lower CTU comes, but samples below the horizontal VB cannot process until the lower CTU becomes available. JVET-N1001 and JVET-O2001 define a horizontal virtual line boundary (VB) for luma ALF and luma SAO. According to the techniques herein this VB may be reused for the luma-input-chroma-output filter defined herein. Further, a vertical VB may be reused for the luma-input-chroma-output filter defined herein, and/or subsets of VBs may be reused for luma-input-chroma-output filter defined herein. Further, there are two cases defined, for which the support samples in the luma component may be derived/modified: when a pre-determined luma sample (corresponding to chroma sample being decoded for e.g. based on chroma location type) is above the VB and the support spans across the VB; and when a pre-determined luma sample (corresponding to chroma sample being decoded e.g., based on chroma location type) is below the VB and the support spans across the VB. In an example, the pre-determined sample is the sample at the position corresponding to coefficient C6 for 5×6 luma support illustrated in FIG. 14D. FIGS. 16A-16D are conceptual diagrams illustrating examples of virtual line buffers which may be used for cross component filtering in accordance with one or more techniques of this disclosure. In FIG. 16A, samples below a horizontal VB are obtained by copying samples above and closest to virtual line boundary and in same column. In FIG. 16B, samples below a horizontal VB are obtained by copying samples below and closest to virtual line boundary and in same column. In one example, a luma VB is four samples from the horizontal CTU boundary. In one example, each CTU, SAO and ALF can process samples to left of the vertical VB before the right CTU comes, but cannot process samples to right of the vertical VB until the right CTU becomes available. Example modifications when support spans across vertical virtual boundary (VB) is shown in FIGS. 16C-16D. In FIG. 16C, samples to right of vertical VB are obtained by copying samples to left and closest to virtual line boundary and in same row. In FIG. 16D, samples to left of vertical VB are obtained by copying samples right and closest to virtual line boundary and in same row. In an example, a luma VB is four samples from the vertical CTU boundary. In one example, according to the techniques herein, with respect to a generating sample for a horizontal VB, one may consider a vertical and a horizontal axis passing through the center of the support region. The samples being copied may be obtained by copying samples in a column that are at the same distance from the vertical axis, but on the opposite side of the vertical axis. In one example, the sample being copied may be copied from a row that is at the same distance from the horizontal axis but on the opposite side. In one example, according to the techniques herein, with respect to a generating sample for a vertical VB, one may consider a vertical and a horizontal axis passing through the center of the support region. The samples being copied may be obtained by copying samples in a row that are at the same distance from the vertical axis, but on the opposite side of the horizontal axis. In one example, the sample being copied may be copied from a column that is at the same distance from the vertical axis, but on the opposite side. In one example, according to the techniques herein, with respect to a generating samples for a VB, samples may be obtained by symmetric padding. That is, with respect to a horizontal VB samples may be copied from the same column and at the same sample distance from the VB and with respect to a vertical VB, samples may be copied from the same row and at the same sample distance from the VB. That is, sample values are mirrored about the VB. It should be noted that section 8.8.5.2 Coding tree block filtering process for luma samples of JVET-O2001 provides a padding scheme for luma samples across a virtual boundary for use with respect to an ALF process. In one example, according to the techniques herein, for cross-component filtering, a similar padding scheme may be used.

In one example, according to the techniques herein, cross component filtering includes scaling of output of cross-component filtering prior to adding the output to corresponding chroma ALF output. That is, a scaling operation may be used to convert filter coefficients to an integer number, for example as follows:

```
for( int i = 0; i < numCoeff; i++ )
{
    int sign = filterCoeff[i] > 0 ? 1 : −1;
    filterCoeffQuant[i] = int( filterCoeff[i] * sign * factor + 0.5 ) * sign;
}
``` where, in one example, factor=$2^{BitDepthC}$, in another example factor=$2^{(BitDepthC-1)}$), in another example factor=$2^{(8-1)}$ In one example, the scaling factor may be used to adjust the output of the cross-component filtering as follows:

$$f'_i(x, y) = \sum_{(x_0,y_0) \in S_{i,o}} I_0(g(x, y, i, 0) +$$

$$x_0, h(x, y, i, 0) + y_0) filterCoeffQuant[MapToI(x_0, y_0)] f_i(x, y) =$$

$$f'_i(x, y) \div factor + I_i(x, y)$$

It should be noted that, if factor=$2^x$, this corresponds to a right shift integer rounding ($f_i(x,y)+2^{(x-1)}$)>>x As described above, filter data specifying a derived filter may be signaled to a video decoder. In one example, there may be three main aspects of signaling filter data: turning the filter on/off; local control of the tool e.g., enabling the tool in some spatial regions but not others; and signaling of specific filters. In one example, a parameter set, for example, a Sequence Parameter Set may conditionally include a flag that enables/disables the filter. In one example, the flag may indicate whether one of more filters are enabled e.g., ALF and cross component filters.

In one example, slice level signaling of filter coefficients may be used. Tables 3-5 illustrates an example of syntax than may be included in a slice header for signaling of filter coefficients. It should be noted that in Table 3, for syntax elements
slice_cross_component_alf_cb_log 2_control_size_minus4 and
slice_cross_component_alf_cr_log 2_control_size_minus4, in one example, truncated unary coding may be used instead of ue(v), where the maximum value of truncated unary is based on the valid range.

TABLE 3

|  | Descriptor |
|---|---|
| slice_header( ) { | |
| ... | |
|   if( sps_cross_component_alf_enabled_flag ) { | |
|     slice_cross_component_alf_cb_enabled_flag | u(1) |
|     if( slice_cross_component_alf_cb_enabled_flag ) { | |
|       slice_cross_component_cb_coeff_data( ) | |
|     slice_cross_component_alf_cb_log2_control_size_minus4 | ue(v) |
|     } | |
|     slice_cross_component_alf_cr_enabled_flag | u(1) |
|     if( slice_cross_component_alf_cr_enabled_flag ) { | |
|       slice_cross_component_cr_coeff_data( ) | |
|     slice_cross_component_alf_cr_log2_control_size_minus4 | ue(v) |
|     } | |
|   } | |
| ... | |
| } | |

TABLE 4

|  | Descriptor |
|---|---|
| slice_cross_component_alf_cb_coeff_data( ) { | |
|   alf_cross_component_cb_min_eg_order_minus1 | ue(v) |
|   for( i = 0; i < 3; i++ ) | |
|     alf_cross_coinponent_cb_eg_order_increase_flag[ i ] | u(1) |
|   for ( j = 0; j < 14; j++ ) { | |
|     alf_cross_component_cb_coeff_delta_abs[ j ] | uek(v) |
|     if( alf_cross_component_cb_coeff_delta_abs[ j ] ) | |
|     alf_cross_component_cb_coeff_delta_sign[ j ] | u(1) |
|   } | |
| } | |

TABLE 5

|  | Descriptor |
|---|---|
| slice_cross_component_alf_cr_coeff_data( ) { | |
|   alf_cross_component_cr_min_eg_order_minus1 | ue(v) |
|   for( i = 0; i < 3; i++ ) | |
|     alf_cross_component_cr_eg_order_increase_flag[ i ] | u(1) |
|   for ( j = 0; j < 14; j++ ) { | |
|     alf_cross_component_cr_coeff_delta_abs[ j ] | uek(v) |
|     if( alf_cross_component_cr_coeff_delta_abs[ j ] ) | |
|     alf_cross_component_cr_coeff_delta_sign[ j ] | u(1) |
|   } | |
| } | |

With respect to Tables 3-5, in one example, the semantics may be based on the following:

slice_cross_component_alf_cb_enabled_flag equal to 0 specifies that the cross-component adaptive loop filter is not applied to Cb colour component. slice_cross_component_alf_cb_enabled_flag equal to 1 indicates that the cross-component adaptive loop filter is applied to the Cb colour component.

slice_cross_component_alf_cr_enabled_flag equal to 0 specifies that the cross-component adaptive loop filter is not applied to Cr colour component. slice_cross_component_alf_cr_enabled_flag equal to 1 indicates that the cross-component adaptive loop filter is applied to the Cr colour component.

slice_cross_component_alf_cb_log 2_control_size_minus4 specifies the value of the square block sizes in number of samples as follows:

$$AlfCCSamplesCbW = AlfCCSamplesCbH = 2^{(slice\_cross\_component\_alf\_cb\_log2\_control\_size\_minus4+4)}$$

slice_cross_component_alf_cb_log 2_control_sizeminus4 shall be in the range 0 to 3, inclusive.

slice_cross_component_alf cr_log 2_control_size_minus4 specifies the value of the square block sizes in number of samples as follows:

$$AlfCCSamplesCrW = AlfCCSamplesCrH = 2^{(slice\_cross\_component\_alf\_cr\_log2\_control\_size\_minus4+4)}$$

slice_cross_component_alf_cr_log 2_control_sizeminus4 shall be in the range 0 to 3, inclusive.

It should be noted, that in one example, the range of slice_cross_component_alf_cb_log 2_control_sizeminus4 and/or slice_cross_component_alf_cr_log 2_control_size_minus4 may be defined in parameter set e.g. SPS. In an example, the minusX coding depends on the minimum defined for the valid range. e.g., if valid range is 2 to 5, then X=2.

In one example, the slice_cross_component_alf_cb_log 2_control_sizeminus4 and/or slice_cross_component_alf_cr_log 2_control_size_minus4 may be signalled in an SPS or derived from CTU size (e.g. same as CTU size in chroma samples).

alf_cross_component_cb_filter_signal_flag equal to 1 specifies that a cross-component Cb filter set is signalled. alf_cross_component_cb_filter_signal_flag equal to 0 specifies that a cross-component Cb filter set is not signalled.

alf_cross_component_cb_min_eg_order_minus1 plus 1 specifies the minimum order of the exp-Golomb code for cross-component Cb filter coefficient signalling. The value of alf_cross_component_cbmineg_order_minus1 shall be in the range of 0 to 9, inclusive. It should be noted, that in some examples, this range may be changed.

alf_cross_component_cb_eg_order_increase_flag[i] equal to 1 specifies that the minimum order of the exp-Golomb code for cross-component Cb filter coefficient signalling is incremented by 1. alf_cross_component_cb_eg_order_increase_flag[i] equal to 0 specifies that the minimum order of the exp-Golomb code for cross-component Cb filter coefficient signalling is not incremented by 1.

The order expGoOrderCb[i] of the exp-Golomb code used to decode the values of alf_cross_component_cb_coeff_delta_abs[j] is derived as follows:

expGoOrder*Cb*[*i*]=
(*i*==0?*alf*_cross_component_*cb*_min_*eg*_order_minus1+
1: expGoOrder*Cb*[*i*−1])+*alf*_cross_component_*cb*_*eg*_order_increase_flag[*i*]

alf_cross_component_cb_coeff delta_abs[j] specifies the absolute value of the j-th coefficient delta of the signalled cross-component Cb filter. When alf_luma_cross_component_cb_coeff_delta_abs[j] is not present, it is inferred to be equal 0.

The order k of the exp-Golomb binarization uek(v) is derived as follows:
golombOrderIdxCb[ ]={0,2,2,2,1,2,2,2,2,2,2,1,2,1}
k=expGoOrderCb[golombOrderIdxCb[j]]

alf_cross_component_cb_coeff sign[j] specifies the sign of the j-th cross-component Cb filter coefficient as follows:
If alf_cross_component_cb_coeff sign[j] is equal to 0, the corresponding chroma filter coefficient has a positive value.
Otherwise (alf_cross_component_cb_coeff sign[j] is equal to 1), the corresponding chroma filter coefficient has a negative value.

When alf_cross_component_cb_coeff sign[j] is not present, it is inferred to be equal to 0.

The cross-component Cb filter coefficients AlfCCCoeff$_{Cb}$ with elements AlfCCCoeff$_{Cb}$[j], with j=0 . . . 13 are derived as follows:

*AlfCC* Coeff$_{Cb}$[*j*]=*alf*_cross_component_*cb*_coeff abs[*j*]*(1−2*alf*_cross_component_*cb*_coeff sign[*j*])

It is a requirement of bitstream conformance that the values of AlfCCCoeff$_{Cb}$[j] with j=0 . . . 13 shall be in the range of $-2^{10}-1$ to $2^{10}-1$, inclusive. It should be noted, that in some examples, this range may depend on bit depth of luma/chroma or subset thereof.

alf_cross_component_cr_filter_signal_flag equal to 1 specifies that a cross-component Cr filter set is signalled. alf_cross_component_cb_filter_signal_flag equal to 0 specifies that a cross-component Cr filter set is not signalled.

alf_cross_component_cr_min_eg_order_minus1 plus 1 specifies the minimum order of the exp-Golomb code for cross-component Cr filter coefficient signalling. The value of alf_cross_component_cb_min_eg_order_minus1 shall be in the range of 0 to 9, inclusive. It should be noted, that in some examples, this range may be changed.

alf_cross_component_cr_eg_order_increase_flag[i] equal to 1 specifies that the minimum order of the exp-Golomb code for cross-component Cr filter coefficient signalling is incremented by 1. alf_cross_component_creg_order_increase_flag[i] equal to 0 specifies that the minimum order of the exp-Golomb code for cross-component Cr filter coefficient signalling is not incremented by 1. The order expGoOrderCr[i] of the exp-Golomb code used to decode the values of alf_cross_component_cb_coeff_delta_abs[j] is derived as follows:

expGoOrder*Cr*[*i*]=
(*i*==0?*alf*_cross_component_*cr*_min_*eg*_order_minus1+1:
expGoOrder*Cr*[*i*−1])+*alf*_cross_component_*cr*_*eg*_order_increase_flag[*i*]

alf_cross_component_cr_coeff_delta_abs[j] specifies the absolute value of the j-th coefficient delta of the signalled cross-component Cr filter. When alf_luma_cross_component_cr_coeff_delta_abs[j] is not present, it is inferred to be equal 0. The order k of the exp-Golomb binarization uek(v) is derived as follows:
golombOrderIdxCr[ ]={0,1,2,1,0,1,2,2,2,2,2,1,2,1}
k=expGoOrderCr[golombOrderIdxCr[j] ]

alf_cross_component_cr_coeff_sign[j] specifies the sign of the j-th cross-component Cr filter coefficient as follows:
If alf_cross_component_cr_coeff_sign[j] is equal to 0, the corresponding chroma filter coefficient has a positive value.
Otherwise (alf_cross_component_crcoeff_sign[j] is equal to 1), the corresponding chroma filter coefficient has a negative value.

When alf_cross_component_cr_coeff_sign[j] is not present, it is inferred to be equal to 0. The cross-component Cr filter coefficients AlfCCCoeff$_{Cr}$ with elements AlfCCCoeff$_{Cr}$[j], with j=0 . . . 13 are derived as follows:

*AlfCC* Coeff$_{Cr}$[*j*]=*alf*_cross_component_*cr*_coeff_abs[*j*]*(1−2*alf*_cross_component_*cr*_coeff_sign[*j*])

It is a requirement of bitstream conformance that the values of AlfCCCoeff$_{Cr}$[j] with j=0 . . . 13 shall be in the range of $-2^{10}-1$ to $2^{10}-1$, inclusive. It should be noted, that in some examples, this range may depend on bit depth of luma/chroma or subset thereof.

In another example, pointer(s) to an APS containing the corresponding filter coefficients data may be sent in slice header. Tables 6-7 illustrate an example of syntax than may be included in a slice header for signaling of filter coefficients according to this example.

TABLE 6

|  | Descriptor |
|---|---|
| slice header( ) { | |
| ... | |
| if( sps_cross_component_alf_enabled_flag ) { | |
|   slice_cross_component_alf_cb_enabled flag | u(1) |
|   if( slice_cross_component_alf_cb_enabled_flag ) { | |
|     slice_cross_component_alf_cb_aps_id | u(5) |
|   slice_cross_component_alf_cb_log2_control_size_minus4 | ue(v) |
|   } | |
|   slice_cross_component_alf_cr_enabled_flag | u(1) |
|   if( slice_cross_component_alf_cr_enabled_flag ) { | |
|     slice_cross_component_alf_cr_aps_id | u(5) |
|   slice_cross_component_alf_cr_log2_control_size_minus4 | ue(v) |
|   } | |
| } | |
| ... | |
| } | |

TABLE 7

| | Descriptor |
|---|---|
| alf_data( adaptation_parameter_set_id ) { | |
|   if (sps_alf_enabled_flag) { | |
|     alf_luma_filter_signal_flag | u(1) |
|     if ( chroma_format_idc != 0 ) // monochrome | |
|       alf_chroma_filter_signal_flag | u(1) |
|   } | |
|   if (sps_cross_component_alf_enabled_flag) { | |
|     alf_cross_component_cb_filter_signal_flag | u(1) |
|     alf_cross_component_cr_filter_signal_flag | u(1) |
|   } | |
|   if( alf_luma_filter_signal_flag ) { | |
|     ... | |
|   } | |
|   if( alf_chroma_filter_signal_flag ) { | |
|     ... | |
|   } | |
|   if( alf_cross_component_cb_filter_signal_flag ) { | |
|     alf_cross_component_cb_min_eg_order_minus1 | ue(v) |
|     for( i = 0; i < 3; i++ ) | |
|       alf_cross_component_cb_eg_order_increase_flag[ i ] | u(1) |
|     for ( j = 0; j < 14; j++ ) { | |
|       alf_cross_component_cb_coeff_delta_abs[ j ] | uek(v) |
|       if( alf_cross_component_cb_coeff_delta_abs[ j ] ) | |
|         alf_cross_component_cb_coeff_delta_sign[ j ] | u(1) |
|     } | |
|   } | |
|   if( alf_cross_component_cr_filter_signal_flag ) { | |
|     alf_cross_component_cr_min_eg_order_minus1 | ue(v) |
|     for( i = 0; i < 3; i++ ) | |
|       alf_cross_component_cr_eg_order_increase_flag[ i ] | u(1) |
|     for ( j = 0; j < 14; j++ ) { | |
|       alf_cross_component_cr_coeff_delta_abs[ j ] | uek(v) |
|       if( alf_cross_component_cr_coeff_delta_abs[ j ] ) | |
|         alf_cross_component_cr_coeff_delta_sign[ j ] | u(1) |
|     } | |
|   } | |
| } | |

With respect to Tables 6-7, in one example, the semantics may be based on the following:

slice_cross_component_alf_cb_enabled_flag equal to 0 specifies that the cross-component Cb filter is not applied to Cb colour component. slice_cross_component_alf_cb_enabled_flag equal to 1 indicates that the cross-component adaptive loop filter is applied to the Cb colour component.

slice_cross_component_alf_cr_enabled_flag equal to 0 specifies that the cross-component Cr filter is not applied to Cr colour component. slice_cross_component_alf_cb_enabled_flag equal to 1 indicates that the cross-component adaptive loop filter is applied to the Cr colour component.

slice_cross_component_alf_cb_aps_id specifies the adaptation_parameter_set_id that the Cb colour component of the slice refers to. When slice_cross_component_alf_cb_aps_id is not present, it is inferred to be equal to slice_alf_aps_id_luma[0]. The TemporalId of the ALF APS NAL unit having adaptation_parameter_set_id equal to slice_cross_component_alf_cb_aps_id shall be less than or equal to the TemporalId of the coded slice NAL unit.

slice_cross_component_alf_cr_aps_id specifies the adaptation_parameter_set_id that the Cr colour component of the slice refers to. When slice_cross_component_alf_cr_aps_id is not present, it is inferred to be equal to slice_alf_aps_id_luma[0]. The TemporalId of the ALF APS NAL unit having adaptation_parameterset_id equal to slice_cross_component_alf_cr_aps_id shall be less than or equal to the TemporalId of the coded slice NAL unit.

slice_cross_component_alf_cb_log 2_control_size_minus4 specifies the value of the square block sizes in number of samples as follows:

$$AlfCCSamplesCbW = AlfCCSamplesCbH = 2^{(slice\_cross\_component\_alf\_cb\_log2\_control\_size\_minus4+4)}$$

slice_cross_component_alf_cb_log 2_control_size_minus4 shall be in the range 0 to 3, inclusive.

slice_cross_component_alf_cr_log 2_control_size_minus4 specifies the value of the square block sizes in number of samples as follows:

$$AlfCCSamplesCrW = AlfCCSamplesCrH = 2^{(slice\_cross\_component\_alf\_cr\_log2\_control\_size\_minus4+4)}$$

slice_cross_component_alf_cr_log 2_control_sizeminus4 shall be in the range 0 to 3, inclusive.

alf_luma_filter_signal_flag equal to 1 specifies that a luma filter set is signalled. alf_luma_filter_signal_flag equal to 0 specifies that a luma filter set is not signalled. When alf_luma_filter_signal_flag is not present, it is inferred to be equal 0.

alf_chroma_filter_signal_flag equal to 1 specifies that a chroma filter is signalled. alf_chroma_filter_signal_flag equal to 0 specifies that a chroma filter is not signalled. When alf_chroma_filter_signal_flag is not present, it is inferred to be equal 0.

alf_cross_component_cb_filter_signal_flag equal to 1 specifies that a cross-component cross-component Cb filter set is signalled. alf_cross_component_cb_filter_signal_flag equal to 0 specifies that a cross-component Cb filter set is not signalled. When alf_cross_component_cb_filter_signal_flag is not present, it is inferred to be equal 0.

alf_cross_component_cr_filter_signal_flag equal to 1 specifies that a cross-component cross-component Cr filter set is signalled. alf_cross_component_cb_filter_signal_flag equal to 0 specifies that a cross-component Cr filter set is not signalled. When alf_cross_component_cr_filter_signal_flag is not present, it is inferred to be equal 0.

alf_cross_component_cb_min_eg_order_minus1 plus 1 specifies the minimum order of the exp-Golomb code for cross-component Cb filter coefficient signalling. The value of alf_cross_component_cb_min_eg_order_minus1 shall be in the range of 0 to 9, inclusive. It should be noted, that in some examples, this range may be changed.

alf_cross_component_cr_min_eg_order_minus1 plus 1 specifies the minimum order of the exp-Golomb code for cross-component Cr filter coefficient signalling. The value of alf_cross_component_cb_min_eg_order_minus1 shall be in the range of 0 to 9, inclusive. It should be noted, that in some examples, this range may be changed.

alf_cross_component_cb_eg_order_increase_flag[i] equal to 1 specifies that the minimum order of the exp-Golomb code for cross-component Cb filter coefficient signalling is incremented by 1. alf_cross_component_cb_eg_order_increase_flag[i] equal to 0 specifies that the minimum order of the exp-Golomb code for cross-component Cb filter coefficient signalling is not incremented by 1.

The order expGoOrderCb[i] of the exp-Golomb code used to decode the values of alf_cross_component_cb_coeff_delta_abs[j] is derived as follows:

expGoOrderCb[i]=
  ($i$==0alf_cross_component_cb_min_eg_order_minus1+
  1: expGoOrderCb[i−1])+alf_cross_component_cb_eg_order_increase_flag$i$ alf_cross_component_cr_eg_order_increase_flag[i] equal to 1 specifies that the minimum order of the exp-Golomb code for cross-component Cr filter coefficient signalling is incremented by 1. alf_cross_component_cr_eg_order_increase_flag[i] equal to 0 specifies that the minimum order of the exp-Golomb code for cross-component Cr filter coefficient signalling is not incremented by 1. The order expGoOrderCr[i] of the exp-Golomb code used to decode the values of alf_cross_component_cb_coeff delta_abs[j] is derived as follows:

expGoOrderCr[i]=(i==0 alf_cross_component_cr_min_eg_order_minus1+1: expGoOrderCr[i−1])+alf_cross_component_creg_order_increase_flag[i]

alf_cross_component_cb_coeff_delta_abs[j] specifies the absolute value of the j-th coefficient delta of the signalled cross-component Cb filter. When alf_luma_cross_component_cb_coeff delta_abs[j] is not present, it is inferred to be equal 0.

The order k of the exp-Golomb binarization uek(v) is derived as follows:

golombOrderIdxCb[ ]={0,2,2,2,1,2,2,2,2,2,2,1,2,1} [these may be Categorize coefficient into 3 categories, each category uses the same order k exp-Golomb code]

k=expGoOrderCb[golombOrderIdxCb[j] ]

alf_cross_component_cr_coeff delta_abs[j] specifies the absolute value of the j-th coefficient delta of the signalled cross-component Cr filter. When alf_luma_cross_component_cr_coeff_delta_abs[j] is not present, it is inferred to be equal 0.

The order k of the exp-Golomb binarization uek(v) is derived as follows:

golombOrderIdxCr[ ]={0,1,2,1,0,1,2,2,2,2,2,1,2,1}[these may be Categorize coefficient into 3 categories, each category uses the same order k exp-Golomb code]

k=expGoOrderCr[golombOrderIdxCr[j] ]

alf_cross_component_cb_coeff sign[j] specifies the sign of the j-th cross-component Cb filter coefficient as follows:

If alf_cross_component_cb_coeff sign[j] is equal to 0, the corresponding cross-component Cb filter coefficient has a positive value.

Otherwise (alf_cross_component_cb_coeff sign[j] is equal to 1), the corresponding cross-component Cb filter coefficient has a negative value.

When alf_cross_component_cb_coeff sign[j] is not present, it is inferred to be equal to 0. The cross-component Cb filter coefficients AlfCCCoeff$_{Cb}$[adaptation_parameter_set_id] with elements AlfCCCoeff$_{Cb}$[adaptation_parameter_set_id][j], with j=0 . . . 13 are derived as follows:

AlfCC Coeff$_{Cb}$[adaptation_parameter_set_id][j]
=alf_cross_component_cb_coeff_abs[j]*(1−
2*alf_cross_component_cb_coeff_sign[j])

It is a requirement of bitstream conformance that the values of AlfCCCoeff$_{Cb}$[adaptation_parameterset_id][j] with j=0 . . . 13 shall be in the range of $-2^{10}-1$ to $2^{10}-1$, inclusive.

alf_cross_component_cr_coeff_sign[j] specifies the sign of the j-th cross-component Cr filter coefficient as follows:

If alf_cross_component_cr_coeff_sign[j] is equal to 0, the corresponding cross-component Cr filter coefficient has a positive value.

Otherwise (alf_cross_component_cr_coeff_sign[j] is equal to 1), the corresponding cross-component Cr filter coefficient has a negative value.

When alf_cross_component_cr_coeff_sign[j] is not present, it is inferred to be equal to 0. The cross-component Cr filter coefficients AlfCCCoeff$_{Cr}$[adaptation_parameter_set_id] with elements AlfCCCoeff$_{Cr}$[adaptation_parameter_set_id][j], with j=0 . . . 13 are derived as follows:

AlfCC Coeff$_{Cr}$[adaptation_parameter_set_id][j]=alf_cross_component_cr_coeff_abs[j]
*(1−2*alf_cross_component_cr_coeff_sign[j])

It is a requirement of bitstream conformance that the values of AlfCCCoeff$_{Cr}$[adaptation_parameter_set_id][j] with j=0 . . . 13 shall be in the range of $-2^{10}-1$ to $2^{10}-1$, inclusive.

It should be noted that the range of $-2^{10}-1$ to $2^{10}-1$ may change. It should be noted, that in some examples, this range may depend on bit depth of luma/chroma or subset thereof.

With respect to Table 6, in one example, the alf_data( ) syntax structure provided in Table 8A may be used.

TABLE 8A

| | Descriptor |
|---|---|
| alf_data( adaptation parameter set_id) { | |
| ... | |
| if (sps_cross_component_alf_enabled_flag) { | |
|   alf_cross_component_cb_filter_signal_flag | u(1) |
|   alf_cross_component_cr_filter_signal_flag | u(1) |
| } | |
| if( alf_luma_filter_signal_flag ) { | |
|   ... | |
| } | |
| if( alf_chroma_filter_signal_flag ) { | |
|   ... | |
| } | |
| if( alf_cross_component_cb_filter_signal_flag ) { | |
|   alf_cross_component_cb_min_eg_order_minus1 | ue(v) |
|   for( i = 0; i < 3; i++ ) | |
|     alf_cross_component_cb_eg_order_increase_flag[i ] | u(1) |
|   for ( j = 0; j < 14; j++ ) { | |
|     alf_cross_component_cb_coeff_abs[ j ] | uek(v) |
|     if( alf_cross_component_cb_coeff_abs[ j ] ) | |
|       alf_cross_component_cb_coeff_sign[ j ] | u(1) |
|   } | |
| } | |
| if( alf_cross_component_cr_filter_signal_flag ) { | |
|   alf_cross_component_cr_min_eg_order_minus1 | ue(v) |
|   for( i = 0; i < 3; i++ ) | |
|     alf_cross_component_cr_eg_order_increase_flag[i ] | u(1) |
|   for ( j = 0; j < 14; j++ ) { | |
|     alf_cross_component_cr_coeff_abs[ j ] | uek(v) |
|     if( alf_cross_component_cr_coeff_abs[ j ] ) | |
|       alf_cross_component_cr_coeff_sign[ j ] | u(1) |
|   } | |
| } | |
| } | |

With respect to Table 8A, in one example, the semantics may be based on the following:

alf_luma_filter_signal_flag equal to 1 specifies that a luma filter set is signalled. alf_luma_filter_signal_flag equal to 0 specifies that a luma filter set is not signalled. When alf_luma_filter_signal_flag is not present, it is inferred to be equal 0.

alf_chroma_filter_signal_flag equal to 1 specifies that a chroma filter is signalled. alf_chroma_filter_signal_flag equal to 0 specifies that a chroma filter is not signalled. When alf_chroma_filter_signal_flag is not present, it is inferred to be equal 0.

alf_cross_component_cb_filter_signal_flag equal to 1 specifies that a cross-component Cb filter set is signalled. alf_cross_component_cb_filter_signal_flag equal to 0 specifies that a cross-component Cb filter set is not signalled. When alf_cross_component_cr_filter_signal_flag is not present, it is inferred to be equal 0.

alf_cross_component_cr_filter_signal_flag equal to 1 specifies that a cross-component Cr filter set is signalled. alf_cross_component_cb_filter_signal_flag equal to 0 specifies that a cross-component Cr filter set is not signalled. When alf_cross_component_cr_filter_signal_flag is not present, it is inferred to be equal 0.

alf_cross_component_cb_min_eg_order_minus1 plus 1 specifies the minimum order of the exp-Golomb code for cross-component Cb filter coefficient signalling. The value of alf_cross_component_cb_min_eg_order_minus1 shall be in the range of 0 to 9, inclusive. It should be noted, that in some examples, this range may be changed.

alf_cross_component_cr_min_eg_order_minus1 plus 1 specifies the minimum order of the exp-Golomb code for cross-component Cr filter coefficient signalling. The value of alf_cross_component_cb_min_eg_order_minus1 shall be in the range of 0 to 9, inclusive. It should be noted, that in some examples, this range may be changed.

alf_cross_component_cb_eg_order_increase_flag[i] equal to 1 specifies that the minimum order of the exp-Golomb code for cross-component Cb filter coefficient signalling is incremented by 1. alf_cross_component_cb_eg_order_increase_flag[i] equal to 0 specifies that the minimum order of the exp-Golomb code for cross-component Cb filter coefficient signalling is not incremented by 1.

The order expGoOrderCb[i] of the exp-Golomb code used to decode the values of alf_cross_component_cb_coeff abs[j] is derived as follows:

expGoOrderCb[i]=
(i==0?alf_cross_component_cb_min_eg_order_minus1+
1: expGoOrderCb[i-1])+alf_cross_component_cb_eg_order_increase_flag[i]

In an example, a pre-determined value corresponding to the minimum order of the exp-Golomb code for cross-component Cb filter coefficient signalling may be used.

In an example, a single value corresponding to the minimum order of the exp-Golomb code for cross-component used for all Cb filter coefficient may be signalled in the bitstream.

alf_cross_component_cr_eg_order_increase_flag[i] equal to 1 specifies that the minimum order of the exp-Golomb code for cross-component Cr filter coefficient signalling is incremented by 1. alf_cross_component_cr_eg_order_increase_flag[i] equal to 0 specifies that the minimum order of the exp-Golomb code for cross-component Cr filter coefficient signalling is not incremented by 1. The order expGoOrderCr[i] of the exp-Golomb code used to decode the values of alf_cross_component_cb_coeff abs[j] is derived as follows:

expGoOrderCr[i]=
(i==0?alf_cross_component_cr_min_eg_order_minus1+
1: expGoOrderCr[i-1])+alf_cross_component_cr_eg_order_increase_flag[i]

In an example, a pre-determined value corresponding to the minimum order of the exp-Golomb code for cross-component Cr filter coefficient signalling is used.

In an example, a single value corresponding to the minimum order of the exp-Golomb code for cross-component used for all Cr filter coefficient is signalled in the bitstream.

alf_cross_component_cb_coeff abs[j] specifies the absolute value of the j-th coefficient of the signalled cross-component Cb filter. When alf_cross_component_cb_coeff abs[j] is not present, it is inferred to be equal 0.

The order k of the exp-Golomb binarization uek(v) is derived as follows:
golombOrderIdxCb[ ]={0,2,2,2,1,2,2,2,2,2,2,1,2,1} [these may be Categorize coefficient into 3 categories, each category uses the same order k exp-Golomb code]
k=expGoOrderCb[golombOrderIdxCb[j] ]

In an example ue(v) coding may be used for signaling the value of syntax element alf_cross_component_cb_coeff abs[j]

alf_cross_component_cr_coeff abs[j] specifies the absolute value of the j-th coefficient of the signalled cross-component Cr filter. When alf_cross_component_cr_coeff abs[j] is not present, it is inferred to be equal 0.

The order k of the exp-Golomb binarization uek(v) is derived as follows:
golombOrderIdxCr[ ]={0,1,2,1,0,1,2,2,2,2,2,1,2,1}[these may be Categorize coefficient into 3 categories, each category uses the same order k exp-Golomb code]
k=expGoOrderCr[golombOrderIdxCr[j] ]

In an example, ue(v) coding is used for signaling the value of syntax element alf_cross_component_cr_coeff abs[j]

alf_cross_component_cb_coeff_sign[j] specifies the sign of the j-th cross-component Cb filter coefficient as follows:
If alf_cross_component_cb_coeff_sign[j] is equal to 0, the corresponding cross-component Cb filter coefficient has a positive value.
Otherwise (alf_cross_component_cb_coeff_sign[j] is equal to 1), the corresponding cross-component Cb filter coefficient has a negative value.
When alf_cross_component_cb_coeff_sign[j] is not present, it is inferred to be equal to 0.

The cross-component Cb filter coefficients AlfCCCoeff$_{Cb}$[adaptation_parameterset_id] with elements AlfCCCoeff$_{Cb}$[adaptation_parameterset_id][j], with j=0 . . . 13 are derived as follows:

AlfCC Coeff$_{Cb}$[adaptation_parameter_set_id][j]=alf_cross_component_cb_coeff abs[j]*(1-2*alf_cross_component_cb_coeff_sign[j])

It is a requirement of bitstream conformance that the values of
AlfCCCoeff$_{Cb}$[adaptation_parameter_set_id]L with j=0 . . . 13 shall be in the range of $-2^{10}-1$ to $2^{10}-1$, inclusive.

alf_cross_component_cr_coeff_sign[j] specifies the sign of the j-th cross-component Cr filter coefficient as follows:
If alf_cross_component_cr coeff_sign[j] is equal to 0, the corresponding cross-component Cr filter coefficient has a positive value.
Otherwise (alf_cross_component_cr_coeff_sign[j] is equal to 1), the corresponding cross-component Cr filter coefficient has a negative value.
When alf_cross_component_cr_coeff_sign[j] is not present, it is inferred to be equal to 0.

The cross-component Cr filter coefficients AlfCCCoeff$_{Cr}$[adaptation_parameter_set_id] with elements AlfCCCoeff$_{Cr}$[adaptation_parameter_set_id][j], with j=0 . . . 13 are derived as follows:

AlfCC Coeff$_{CR}$[adaptation_parameter_set_id][j]=alf_cross_component_cr_coeff_abs[j]*(1-2*alf_cross_component_cr_coeff_sign[j])

It is a requirement of bitstream conformance that the values of AlfCCCoeff$_{Cr}$[adaptation_parameter_set_id][j] with j=0 . . . 13 shall be in the range of $-2^{10}-1$ to $2^{10}-1$, inclusive.

In one example, the alf_data( ) syntax structure provided in Table 8B may be used. It should be noted that in Table 8B, when coefficients are signaled in an APS, the number of filters is signaled using minus one coding.

TABLE 8B

| | Descriptor |
|---|---|
| alf_data( adaptation_parameter_set_id ) { | |
| ... | |
|   if (sps_cross_component_alf_enabled_flag) { | |
|     alf_cross_component_cb_filter_signal_flag | u(1) |
|     alf_cross_component_cr_fllter_signal_flag | u(1) |
|   } | |
|   if( alf_luma_filter_signal_flag ) { | |
|     ... | |
|   } | |
|   if( alf_chroma_filter_signal_flag ) { | |
|     ... | |
|   } | |
|   if( alf_cross_component_cb_filter_signal_flag ) { | |
|     alf_cross_component_cb_filters_signalled_minus1 | ue(v) |
|     for( k = 0; k < (alf_cross_component_cb_filters_signalled_minus1+1); k++ ) { | |
|       alf_cross_component_cb_mm_eg_order_minus1 | ue(v) |
|       for( i = 0; i < 3; i++ ) | |
|         alf_cross_component_cb_eg_order_increase_flag[ k ][ i ] | u(1) |
|       for ( j = 0; j < 14; j++ ) { | |
|         alf_cross_component_cb_coeff_abs[ k ][ j ] | uek(v) |
|         if( alf_cross_component_cb_coeff_abs[ k ][ j ] ) | |
|           alf_cross_component_cb_coeff_sign[ k ][ j ] | u(1) |
|       } | |
|     } | |
|   } | |
|   if( alf_cross_component_cr_filter signal flag ) { | |
|     alf_cross_component_cr_filters_signalled_minus1 | ue(v) |
|     for( k = 0; k < (alf_cross_component_cr_filters_signalled minus 1+1); k++ ) { | |
|       alf_cross_component_cr_min_eg_order_minus1 | ue(v) |
|       for( i = 0; i < 3; i++ ) | |
|         alf_cross_component_cr_eg_order_increase_flag[ k ][ i ] | u(1) |
|       for ( j = 0; j < 14; j++ ) { | |
|         alf_cross_component_cr_coeff_abs[ k ][ j ] | uek(v) |
|         if( alf_cross_component_cr_coeff_abs[ k ][ j ] ) | |
|           alf_cross_component_cr_coeff_sign[ k ][ j ] | u(1) |
|       } | |
|     } | |
|   } | |
| } | |

With respect to Table 8B, in one example, the semantics may be based on the following:

alf_cross_component_cb_filter_signal_flag equal to 1 specifies that a cross-component Cb filter set is signalled. alf_cross_component_cb_filter_signal_flag equal to 0 specifies that a cross-component Cb filter set is not signalled. When alf_cross_component_cb_filter_signal_flag is not present, it is inferred to be equal 0.

alf_cross_component_cr_filter_signal_flag equal to 1 specifies that a cross-component Cr filter set is signalled. alf_cross_component_cb_filter_signal_flag equal to 0 specifies that a cross-component Cr filter set is not signalled. When alf_cross_component_cr_filter_signal_flag is not present, it is inferred to be equal 0.

alf_cross_component_cb_filters_signalled_minus1 plus 1 specifies the number of cross-component Cb filter sets for which coefficients are signalled. The value of alf_cross_component_cb_filters_signalled_minus1 shall be in the range of 0 to NumCcAlfCbFilters−1, inclusive.

NumCcAlfCbFilters represents the maximum number of cross-component Cb filter set allowed in a video sequence. In one example, NumCcAlfCbFilters may be set to a predetermined non-negative integer value. In one example, NumCcAlfCbFilters is signaled in a parameter set for e.g. SPS, PPS.

alf_cross_component_cb_min_eg_order_minus1[k] plus 1 specifies the minimum order of the exp-Golomb code for the k-th cross-component Cb filter coefficient set signalling. The value of alf_cross_component_cb_min_eg_order_minus1[k] shall be in the range of 0 to 9, inclusive.

alf_cross_component_cb_eg_order_increase_flag[k][i] equal to 1 specifies that the minimum order of the exp-Golomb code for the k-th cross-component Cb filter coefficient set signalling is incremented by 1. alf_cross_component_cb_eg_order_increase_flag[k][i] equal to 0 specifies that the minimum order of the exp-Golomb code for the k-th cross-component Cb filter coefficient set signalling is not incremented by 1.

The order expGoOrderCb[k][i] of the exp-Golomb code used to decode the values of alf_cross_component_cb_coeff abs[k][j] is derived as follows:

expGoOrder$Cb[k][i]$=
($i$==0?alf_cross_component_$cb$_min_$eg$_order_minus1
[$k$]+1:expGoOrderCb[$k$][$i$−1])+alf_cross_component_$cb$_$eg$_order_increase_flag[$k$][$i$]

alf_cross_component_cb_coeff abs[k][j] specifies the absolute value of the j-th coefficient of the signalled k-th cross-component Cb filter set. When alf_cross_component_cb_coeff abs[k][j] is not present, it is inferred to be equal 0.

The order k of the exp-Golomb binarization uek(v) is derived as follows:
golombOrderIdxCb[ ]={0,2,2,2,1,2,2,2,2,2,2,1,2,1}
[Note, these may categorize coefficient into 3 categories, each category uses the same order 1 exp-Golomb code]
k=expGoOrderCb[golombOrderIdxCb[j] ]

alf_cross_component_cb_coeff_sign[k][j] specifies the sign of the j-th coefficient of k-th cross-component Cb filter coefficient set as follows:

If alf_cross_component_cb_coeff_sign[k][j] is equal to 0, the corresponding cross-component Cb filter coefficient has a positive value.

Otherwise (alf_cross_component_cb_coeff_sign[k][j] is equal to 1), the corresponding cross-component Cb filter coefficient has a negative value.

When alf_cross_component_cb_coeff_sign[k][j] is not present, it is inferred to be equal to 0. The cross-component Cb filter coefficients AlfCCCoeff$_{Cb}$[adaptation_parameter_set_id][k] with elements AlfCCCoeff$_{Cb}$[adaptation_parameter_set_id][k][j], with j=0 . . . 13 are derived as follows:

AlfCC Coeff$_{Cb}$[adaptation_parameter_set_id][k][j]=*alf_cross_component_cb_coeff_abs*[k][j]*(1−2**alf_cross_component_cb_coeff_sign*[k][j])

It is a requirement of bitstream conformance that the values of AlfCCCoeff$_{Cb}$[adaptation_parameter_set_id][k][j] with j=0 . . . 13 shall be in the range of −2$^7$ to 2$^7$−1, inclusive.

alf_cross_component_cr_filters_signalled_minus1 plus 1 specifies the number of cross-component Cr filter sets for which coefficients are signalled. The value of alf_cross_component_cr_filters_signalled_minus1 shall be in the range of 0 to NumCcAlfCrFilters−1, inclusive.

NumCcAlfCrFilters represents the maximum number of cross-component Cr filter set allowed in a video sequence. In one example, NumCcAlfCrFilters may be set to a pre-determined non-negative integer value. In one example, NumCcAlfCrFilters is signaled in a parameter set for e.g. SPS, PPS.

alf_cross_component_cr_min_eg_order_minus1[k] plus 1 specifies the minimum order of the exp-Golomb code for the k-th cross-component Cr filter coefficient set signalling. The value of alf_cross_component_cb_min_eg_order_minus1[k] shall be in the range of 0 to 9, inclusive.

alf_cross_component_cr_eg_order_increase_flag[k][i] equal to 1 specifies that the minimum order of the exp-Golomb code for the k-th cross-component Cr filter coefficient set signalling is incremented by 1. alf_cross_component_cr_eg_order_increase_flag[k][i] equal to 0 specifies that the minimum order of the exp-Golomb code for the k-th cross-component Cr filter coefficient set signalling is not incremented by 1.

The order expGoOrderCr[k][i] of the exp-Golomb code used to decode the values of alf_cross_component_cb_coeff abs[k][j] is derived as follows:

expGoOrderCr[k][i]=
(i==0?*alf_cross_component_cr_min_eg_order_minus1*[k]+1: expGoOrderCr[k][i−1])+*alf_cross_component_cr_eg_order_increase_flag*[k][i]

alf_cross_component_cr_coeff abs[k][j] specifies the absolute value of the j-th coefficient of the signalled k-th cross-component Cr filter set. When alf_cross_component_cr_coeff_abs[k][j] is not present, it is inferred to be equal 0.

The order k of the exp-Golomb binarization uek(v) is derived as follows:
golombOrderIdxCr[ ]={0,1,2,1,0,1,2,2,2,2,2,1,2,1}
[Note, these may categorize coefficient into 3 categories, each category uses the same order k exp-Golomb code]
k=expGoOrderCr[golombOrderIdxCr[j] ]

alf_cross_component_cr_coeff_sign[k][i] specifies the sign of the j-th coefficient of k-th cross-component Cr filter coefficient set as follows:

If alf_cross_component_cr_coeff_sign[k][j] is equal to 0, the corresponding cross-component Cr filter coefficient has a positive value.

Otherwise (alf_cross_component_cr_coeff_sign[k][j] is equal to 1), the corresponding cross-component Cr filter coefficient has a negative value.

When alf_cross_component_cr_coeff_sign[k][j] is not present, it is inferred to be equal to 0. The cross-component Cr filter coefficients AlfCCCoeff$_{Cr}$[adaptation_parameter_set_id][k] with elements AlfCCCoeff$_{Cr}$[adaptation_parameter_set_id][k][j], with j=0 . . . 13 are derived as follows:

AlfCC Coeff$_{Cr}$[adaptation_parameter_set_id][k][j]=*alf_cross_component_cr_coeff_abs*[k][j]*(1−2**alf_cross_component_cr_coeff_sign*[k][j])

It is a requirement of bitstream conformance that the values of AlfCCCoeff$_{Cr}$[adaptation_parameter_set_id][k][j] with j=0 . . . 13 shall be in the range of −2$^7$ to 2$^7$−1, inclusive.

With respect to Table 8B, in one example, for syntax elements
alf_cross_component_cb_coeff abs[k][i] and alf_cross_component_cr_coeff abs[k][i], k of uek(v) that represents k-th order exponential golomb coding, may correspond to a pre-determined value. As a result, "k" does not have to be signaled in the bitstream. In one example, in this case, the alf_data( ) syntax structure provided in Table 8C may be used.

TABLE 8C

| | Descriptor |
|---|---|
| alf_data( adaptation_parameter_set_id ) { | |
| ... | |
| if (sps_cross_component_alf_enabled_flag) { | |
|     alf_cross_component_cb_filter_signal_flag | u(1) |
|     alf_cross_component_cr_filter_signal_flag | u(1) |
| } | |
| if( alf_luma_filter_signal_flag ) { | |
|     ... | |
| } | |
| if( alf_chroma_filter_signal_flag ) { | |
|     ... | |
| } | |
| if( alf_cross_component_cb_filter_signal_flag ) { | |
|     alf_cross_component_cb_filters_signalled_minus1 | ue(v) |
|     for( k = 0; k < (alf_cross_component_cb_filters_signalled_minus1+1); k++ ) | |
|     { | |
|         for ( j = 0; j < 14; j++ ) { | |
|             alf_cross_component_cb_coeff_abs[ k ][ j ] | uek(v) |
|             if( alf_cross_component_cb_coeff_abs[ k ][ j ] ) | |

TABLE 8C-continued

| | Descriptor |
|---|---|
|       alf_cross_component_cb_coeff_sign[ k ][ j ] | u(1) |
|      }<br>    }<br>  }<br>}<br>if( alf_cross_component_cr_filter_signal_flag ) {<br>  alf_cross_component_cr_filters_signalled_minus1 | ue(v) |
|   for( k = 0; k < (alf_cross_component_cr_filters_signalled_minus1+1); k++ )<br>  {<br>    for ( j = 0; j < 14; j++ ) {<br>      alf_cross_component_cr_coeff_abs[ k ][ j ] | uek(v) |
|       if( alf_cross_component_cr_coeff_abs[ k ][ j ] )<br>        alf_cross_component_cr_coeff_sign[ k ][ j ] | u(1) |
|       }<br>    }<br>  }<br>}<br>} | |

With respect to Table 8C, in one example, the semantics may be based on the semantics provided above with respect to Table 8B. For syntax elements for syntax elements alf_cross_component_cb_coeff abs[k][i] and alf_cross_component_cr_coeff abs[k][i], in one example, the semantics may be based on the following:

alf_cross_component_cb_coeff abs[k][j] specifies the absolute value of the j-th coefficient of the signalled k-th cross-component Cb filter set. When alf_cross_component_cb_coeff_abs[k][j] is not present, it is inferred to be equal 0.

The order k of the exp-Golomb binarization uek(v) is set equal to 3.

alf_cross_component_cr_coeff_abs[k][j] specifies the absolute value of the j-th coefficient of the signalled k-th cross-component Cr filter set. When alf_cross_component_cr_coeff_abs[k][j] is not present, it is inferred to be equal 0.

The order k of the exp-Golomb binarization uek(v) is set equal to 3.

Further, with respect to Tables 8A-8C, in one example, the slice_header( ) syntax structure provided in Table 8D may be used. It should be noted that in Table 8D, syntax element slice_cross_component_alf_cb_aps_id specifies the adaptation_parameter_set_id that the Cb colour component of the slice refers, in one example, APS ID's (e.g., for cross-component filter, luma filters, chroma filters) are not received and a value inferred e.g., for a set of slice type (e.g., I slice), for a picture with a set of NALU type(s) (e.g. corresponding to IRAP).

TABLE 8D

| | Descriptor |
|---|---|
| slice_header( ) {<br>  ...<br>  if( sps_cross_component_alf_enabled_flag ) {<br>    slice_cross_component_alf_cb_enabled_flag | u(1) |
|     if( slice_cross_component_alf_cb_enabled_flag ) {<br>      slice_cross_component_alf_cb_reuse_temporal_layer_fliter | u(1) |
|       if<br>(!slice_cross_component_alf_cb_reuse_temporal_layer_filter)<br>        slice_cross_component_alf_cb_aps_id | u(5) |
|       slice_cross_component_alf_cb_log2_control_size_minus4 | ue(v) |
|     }<br>    slice_cross_component_alf_cr_enabled_flag | u(1) |
|     if( slice_cross_component_alf_cr_enabled_flag ) {<br>      slice_cross_component_alf_ct_reuse_temporal_layer_filter | u(1) |
|       if<br>(!slice_cross_component_alf_cr_reuse_temporal_layer_filter)<br>        slice_cross_component_alf_cr_aps_id | u(5) |
|       slice_cross_component_alf_cr_log2_control_size_minus4 | ue(v) |
|     }<br>  }<br>  ...<br>} | |

With respect to Table 8D, in one example, the semantics may be based on the following:

slice_cross_component_alf_cb_enabled_flag equal to 0 specifies that the cross-component Cb filter is not applied to Cb colour component. slice_cross_component_alf_cb_enabled_flag equal to 1 indicates that the cross-component Cb filter is applied to the Cb colour component.

slice_cross_component_alf_cr_enabled_flag equal to 0 specifies that the cross-component Cr filter is not applied to Cr colour component. slice_cross_component_alf_cb_enabled_flag equal to 1 indicates that the cross-component Cr filter is applied to the Cr colour component.

With respect to Table 8A:

slice_cross_component_alf_cb_reuse_temporal_layer_filter equal to 1 specifies that the cross-component Cb filter coefficients, with j=0 . . . 13, inclusive is set equal to AlfCCTemporalCoeff$_{Cb}$[TemporalId][j].

slice_cross_component_alf_cb_reuse_temporal_layer_filter equal to 0 and slice_cross_component_alf_cb_enabled_flag is equal to 1 specifies that the syntax element slice_cross_component_alf_cb_aps_id is present in slice header.

When slice_cross_component_alf_cb_enabled_flag is equal to 1, and slice_cross_component_alf_cb_reuse_temporal_layer_filter is equal to 0, the elements of AlfCCTemporalCoeff$_{Cb}$[TemporalId][j], with j=0 . . . 13 are derived as follows:

$AlfCC\text{TemporalCoeff}_{Cb}[\text{TemporalId}][j] = \text{AlfCCCoeff}_{Cb}[\text{slice\_cross\_component\_alf\_cb\_aps\_id}][j]$ In an example, the cross component Cb coefficients, with j=0 . . . 13, may be set to the coefficients received in the corresponding APS AlfCCCoeff$_{Cb}$[slice_cross_component_alf_cb_aps_id][j].

slice_cross_component_alf_cr_reuse_temporal_layer_filter equal to 1 specifies that the cross-component Cr filter coefficients, with j=0 . . . 13, inclusive is set equal to AlfCCTemporalCoeff$_{Cr}$[TemporalId][j].

slice_cross_component_alf_cr_reuse_temporal_layer_filter equal to 0 and slice_cross_component_alf_cr_enabled_flag is equal to 1 specifies that the syntax element slice_cross_component_alf_cr_aps_id is present in slice header.

When slice_cross_component_alf_cr_enabled_flag is equal to 1, and slice_cross_component_alf_cr_reuse_temporal_layer_filter is equal to 0, the elements of AlfCCTemporalCoeff$_{Cr}$[TemporalId][j], with j=0 . . . 13 are derived as follows:

$AlfCC\text{TemporalCoeff}_{Cr}[\text{TemporalId}][j] = AlfCC \text{Coeff}_{Cr}[\text{slice\_cross\_component\_alf\_cr\_aps\_id}][j]$ In an example, the cross component Cr coefficients, with j=0 . . . 13, may be set to the coefficients received in the corresponding APS AlfCCCoeff$_{Cr}$[slice_cross_component_alf_cr_aps_id][j].

With respect to Table 8B and Table 8C:
slice_cross_component_alf_cb_reuse_temporal_layer_filter equal to 1 specifies that the cross-component Cb filter coefficients, with j=0 . . . 13, k=0 . . . (NumCcAlfCbFilters−1), inclusive is set equal to AlfCCTemporalCoeff$_{Cb}$[TemporalId][k][j]. slice_cross_component_alf_cb_reuse_temporal_layer_filter equal to 0 and slice_cross_component_alf_cb_enabled_flag is equal to 1 specifies that the syntax element slice_cross_component_alf_cb_aps_id is present in slice header.

When slice_cross_component_alf_cb_enabled_flag is equal to 1, and slice_cross_component_alf_cb_reuse_temporal_layer_filter is equal to 0, the elements of AlfCCTemporalCoeff$_{Cb}$[TemporalId][k], with j=0 . . . 13, k=0 . . . (NumCcAlfCbFilters−1) are derived as follows:

$AlfCC\text{TemporalCoeff}_{Cb}[\text{TemporalId}][k][j] = AlfCC \text{Coeff}_{Cb}[\text{slice\_cross\_component\_alf\_cb\_aps\_id}][k][j]$ slice_cross_component_alf_cr_reuse_temporal_layer_filter equal to 1 specifies that the cross-component Cr filter coefficients, with j=0 . . . 13, k=0 . . . (NumCcAlfCrFilters−1), inclusive is set equal to AlfCCTemporalCoeff$_{Cr}$[TemporalId][k][j]. slice_cross_component_alf_cr_reuse_temporal_layer_filter equal to 0 and slice_cross_component_alf_cr_enabled_flag is equal to 1 specifies that the syntax element slice_cross_component_alf_cr_aps_id is present in slice header.

When slice_cross_component_alf_cr_enabled_flag is equal to 1, and slice_cross_component_alf_cr_reuse_temporal_layer_filter is equal to 0, the elements of AlfCCTemporalCoeff$_{Cr}$[TemporalId][k][j], with j=0 . . . 13, k=0 . . . (NumCcAlfCrFilters−1), are derived as follows:

$AlfCC\text{TemporalCoeff}_{Cr}[\text{TemporalId}][k][j] = AlfCC \text{Coeff}_{Cr}[\text{slice\_cross\_component\_alf\_cr\_aps\_id}][k][j]$ It should be noted that when a filter coefficient set from APS is used then the corresponding temporal filter coefficient set buffer is populated using the filter coefficient set from APS.

slice_cross_component_alf_cb_aps_id specifies the adaptation_parameter_set_id that the Cb colour component of the slice refers to for cross-component Cb filter. When slice_cross_component_alf_cb_aps_id is not present, it is inferred to be equal to slice_alf_aps_id_luma[0]. The TemporalId of the ALF APS NAL unit having adaptation_parameter_set_id equal to slice_cross_component_alf_cb_aps_id shall be less than or equal to the TemporalId of the coded slice NAL unit.

In an example, the APS may be reset e.g., for set of NALU types (e.g., corresponding to a random access point such as an IRAP), for set of slice type (say I-slice). For such a picture/slice, slice_cross_component_alf_cb_aps_id is not signalled. In one example, it may be inferred to a pre-determined value. In one example, it may be inferred to a derived value (for e.g. based on slice type, TemporalID, NALU type, QP).

In an example, slice_cross_component_alf_cb_aps_id is not received and a value may be inferred for a set of slice (say first slice) of a picture with a set of NALU type(s) (e.g. corresponding to IRAP).

slice_cross_component_alf_cr_aps_id specifies the adaptation_parameter_set_id that the Cr colour component of the slice refers to for cross-component Cb filter. When slice_cross_component_alf_cr_aps_id is not present, it is inferred to be equal to slice_alf_aps_id_luma[0]. The TemporalId of the ALF APS NAL unit having adaptation_parameterset_id equal to slice_cross_component_alf_cr_aps_id shall be less than or equal to the TemporalId of the coded slice NAL unit.

In an example, the APS may be reset e.g., for set of NALU types (e.g., corresponding to a random access point such as an IRAP), for set of slice type (say I-slice). For such a picture/slice, slice_cross_component_alf_cr_aps_id is not signalled and inferred but inferred to a pre-determined value. In one example, it may be inferred to a pre-determined value. In one example, it may be inferred to a derived value (for e.g. based on slice type, TemporalID, NALU type, QP).

hi an example, slice_cross_component_alf_cr_aps_id is not received and a value inferred for a set of slice (say first slice) of a picture with a set of NALU type(s) (e.g. corresponding to IRAP).

In one example, the APS reset operation may imply a APS coded preceding an access unit (satisfying a pre-determined set of conditions e.g. NALU type indicates IRAP, slice type equal to I slice) may not be available for that access unit and subsequently coded access units slice_cross_component_alf_cb_log 2_control_size_minus4 specifies the value of the square block sizes in number of samples as follows:

$$AlfCC\text{SamplesCbW} = AlfCC\text{SamplesCbH} = 2^{(slice\_cross\_component\_alf\_cb\_log2\_control\_size\_minus4 + 4)}$$

slice_cross_component_alf_cb_log 2_control_size_minus4 shall be in the range 0 to 3, inclusive.

slice_cross_component_alf_cr_log 2_control_size_minus4 specifies the value of the square block sizes in number of samples as follows:

$$AlfCCSamplesCrW = AlfCCSamplesCrH = 2^{(slice\_cross\_component\_alf\_cr\_log2\_control\_size\_minus4+4)}$$

slice_cross_component_alf_cr_log 2_control_sizeminus4 shall be in the range 0 to 3, inclusive.

TemporalId is the temporal identifier of the current NAL unit.

It should be noted that in the examples above, a coefficient value is indicated using a syntax element indicating the sign (e.g., alf_cross_component_cr_coeff_sign) of a coefficient and a syntax element indicating an absolute value (e.g., alf_cross_component_cr_coeff_abs) of the coefficient. In one example, according to the techniques herein, the absolute value of a coefficient may be indicated using one or more flags indicating whether the absolute value of the coefficient is greater than a particular value (e.g., a greater than 1, a great than 2 flag, etc.) and a syntax element that indicates the absolute value of the coefficient based on the value of the one or more flags. For example, in one example, the coding of a particular coefficient value may be based on the following semantics:

alf_cross_component_coeff_abs_greater_than_N_flag[k][j] specifies whether the absolute value of the j-th coefficient of the signalled k-th cross-component filter set is greater than N. In one example, a coefficient shall be in the range of $-2^7$ to $2^{7-1}$, inclusive and N may be 64.

alf_cross_component_coeff_abs[k][j] specifies the absolute value of the j-th coefficient of the signalled k-th cross-component filter set. When alf_cross_component_coeff_abs[k][j] is not present, it is inferred to be equal 0.

alf_cross_component_coeff_sign[k][i] specifies the sign of the j-th coefficient of k-th cross-component filter coefficient set as follows:

If alf_cross_component_coeff_sign[k][j] is equal to 0, the corresponding cross-component filter coefficient has a positive value.

Otherwise (alf_cross_component_coeff_sign[k][j] is equal to 1), the corresponding cross-component filter coefficient has a negative value.

When alf_cross_component_coeff_sign[k][j] is not present, it is inferred to be equal to 0.

The cross-component filter coefficients AlfCCCoeff[adaptation_parameter_set_id][k] with elements AlfCCCoeff[adaptation_parameter_set_id][k][j], are derived as follows:

$$AlfCC\ Coeff[adaptation\_parameter\_set\_id][k][j] = (N*alf\_cross\_component\_coeff\_abs\_greater\_than\_N\_flag[k][j]+alf\_cross\_component\_coeff\_abs[k][j])*(1-2*alf\_cross\_component\_coeff\_sign[k][j])$$

In an example, a set of cross-component filter coefficients may be signaled for a cross-component color (Cb and/or Cr) filter. Each set of cross-component filter coefficients may be assigned a cross-component filter index. In an example, the set of cross-component filter coefficients may be signaled in an APS. In an example, sample values may be partitioned (e.g. determined using techniques similar to partitioning used by control flag signaling or any suitable alternative). A filter index may be signaled for each partition of sample values, where the filter index identifies the cross-component filter to be applied to the samples in the partition. The partitioning may be communicated by use of a parameter such as block size (which may be same as the control block size parameter, or may be independent). The partition region may be derived using the parameter value, picture/slice/tile group/MCTS dimensions. In an example, the set of only one cross-component filter coefficients may be signaled in an APS for each color component. An APS identifier may be signaled for each partition of sample values that identifies the cross-component filter to be applied to the samples in the partition.

In an example the buffers for a subset or all of temporal layers may be reset e.g., for a set of NALU types (e.g., corresponding to a random access point such as an IRAP), for set of slice type (say I-slice). In an example, a reset may imply an emptying operation. In an example, reset may imply setting buffer to a pre-determined set of value (e.g. 0, fixed set of values for each TemporalID). The buffer reset operation may imply values stored in the buffer preceding an access unit (satisfying a pre-determined set of conditions e.g. NALU type indicates IRAP, slice type equal to I slice) may not be available for that access unit and subsequently coded access units. In an example, when the buffers do not contain any coefficients then the syntax elements indicating whether filter coefficients from the buffer are to be used may not be signaled and its value inferred. For example, when the buffer is emptied for an IRAP picture then the first slice in the IRAP picture does not need to signal slice_cross_component_alf_cb_reuse_temporal_layer_filter and/or slice_cross_component_alf_cr_reuse_temporal_layer_filter. In an example, when the buffers do not contain any coefficients, then the syntax elements indicating whether filter coefficients from the buffer are to be used may be signaled restricted to a pre-determined value. For example, when the buffer is emptied for an IRAP picture then the syntax elements slice_cross_component_alf_cb_reuse_temporal_layer_filter, and/or slice_cross_component_alf_cr_reuse_temporal_layer_filter, in the first slice in the IRAP picture are required to be 0.

Further, in one example, filters that are signaled for leading pictures should not be used by trailing pictures of the associated IRAP picture. This is because during random access operation of the bitstream leading pictures may be discarded from the bitstream. As described above, according to the techniques herein, cross component filters may be signaled using: reuse of filter(s) in corresponding temporal sublayer buffer and/or filters in APS(s). It should be noted that in some cases, an APS may be signaled out of band, so in some cases, all that may be required for bitstream conformance is that an APS which is referenced should be available. As such, in one example, a bitstream conformance requirement may be realized using syntax elements slice_cross_component_alf_cb_reuse_temporal_layer_filter and slice_cross_component_alf_cr_reuse_temporal_layer_filter. In one example, syntax elements slice_cross_component_alf_cb_reuse_temporal_layer_filter and slice_cross_component_alf_cr_reuse_temporal_layer_filter may be constrained as follows:

When filter coefficients in temporal sublayer buffer AlfCCTemporalCoeffCb[TemporalId][k][j] with temporal identifier TemporalId were derived for leading pictures of a associated TRAP picture, it is a requirement of bitstream conformance that for trailing pictures of the associated TRAP picture with temporal identifier TemporalId, the value of syntax element slice_cross_component_alf_cb_reuse_temporal_layer_filter shall be 0.

When filter coefficients in temporal sublayer buffer AlfCCTemporalCoeffCr[TemporalId][k][j] with temporal identifier TemporalId were derived for leading pictures of a associated IRAP picture, it is a requirement of bitstream conformance that for trailing pictures of the associated IRAP picture with temporal identifier TemporalId, the value of syntax element slice_cross_component_alf_cr_reuse_temporal_layer_filter shall be 0.

As described above, with respect to FIGS. 9A-9F, filter shapes may be determined based on chroma location type. It should be noted that, filters shapes may include filter shapes for various type of filters. Further, filter shapes can generally be described as representing support and an origin relative to a sample being filtered. In one example, a filter shape may be signaled for each cross-component filter in parameter set: e.g. SPS, PPS, VUI. In one example, the filter shape may also be signaled in APS or slice header for e.g., when the filter shape affects the number of filter coefficients that are coded. In one example, the filter shape may be used to determine number of filter coefficients. In one example, filter coefficients may be reused. That is, in one example, a First In First Out (FIFO) buffer may be maintained for each component Cb/Cr, for each temporal layer. In one example, the size of the FIFO buffer is 1 for each component, each temporal layer. In such an example, a flag may be signaled to indicate if the filter coefficients in the corresponding (temporal layer) FIFO buffer is to be used or a new set of coefficients is to be received. When new set of filter coefficients are received they replace the contents of the corresponding (temporal layer) FIFO buffer. In one example, the size of the FIFO buffer is 1 for each component, each temporal layer. In such an example, filter coefficients in FIFO buffers that belong to same temporal layer or lower temporal layers may be reused. A syntax element (e.g. flag) is received to indicate if the filter coefficient in one of the FIFO buffers is reused, and if it is reused (e.g. the flag value is 1), then an index to the FIFO buffer whose coefficients are to be reused is received. The range of valid values for the index is determined based on the current temporal layer ID (e.g. 0 to Current Temporal Layer ID). A ue(v) coding may be used to signal a value such as—(Temporal Layer of FIFO buffer—Current Temporal Layer). In another example, truncated unary (with maximum value of TU based on Current Temporal Layer ID) may be used.

In one example signaling of local control of a cross component filter may include sending all the cross-component Cb and Cr block-level control flags for the slice in the first CTU of slice. In one example, when a control block size is larger than the CTU size then the control flags may be sent in the first coded CTU of the control block. The remaining CTUs in the control block may infer the same value as in the first coded CTU of the control block. When the first coded CTU in control block does receive a control flag, then the value of the control flag may be inferred to be 0. In one example, a control flag is sent for each CTU. In one example, control flags may be signaled in the first CTU of a slice/tile group. Further, in one example, four control flags may be signaled for each CTU of a tile group/slice. In one example, when four control blocks exist within the CTU, there may be a different number of control block flags for partial CTUs (e.g. at boundaries) compared to complete CTUs. In one example, one control flag may be signaled for each CTU of a tile group/slice. In one example, a control flag may be signaled for a first CTU of a group of CTUs, and for the remaining CTUs in the group the same value of the flag may be inferred.

Table 9 illustrates an example of syntax included in a coding_tree_unit( ) syntax structure for signaling in first CTU of control block and multiple flags if control block is smaller than CTU. It should be noted in Table 9, the function is InSliceCb( ) returns TRUE when the passed Cb chroma position represents a Cb sample that is within slice being coded, Otherwise it returns FALSE and the function is InSliceCr( ) returns TRUE when the passed Cr chroma position represents a Cr sample that is within slice being coded, Otherwise it returns FALSE.

TABLE 9

|  | Descriptor |
|---|---|
| coding_tree_unit( ) { <br> ... <br>   if ( slice_cross_component_alf_cb_enabled_flag ) <br>     if ( ( ( ( xCtb / SubWidthC ) % AlfCCSamplesCbW ) == 0 ) && <br>       ( ( ( yCtb / SubHeightC ) % AlfCCSamplesCbH ) == 0 ) ) <br>       for ( y = 0; y < ( CtbSizeY / SubHeightC ) / AlfCCSamplesCbH; y++) <br>         for (x = 0; x < ( CtbSizeY / SubWidthC ) / AlfCCSamplesCbW; x++ ) <br>           if ( isInSliceCb( xCtb / SubWidthC + x * AlfCCSamplesCbW, <br>             yCtb / SubHeightC + y * AlfCCSamplesCbH ) ) <br>               cross_component_alf_cb_control_flag[ x ][ y ] |  <br> <br> <br> <br> <br> <br> <br> <br> <br> ae(v) |
|   if ( slice_cross_component_alf_cr_enabled_flag ) <br>     if ( ( ( ( xCtb / SubWidthC ) % AlfCCSamplesCbW ) == 0) && <br>       ( ( ( yCtb / SubHeightC) % AlfCCSamplesCbH ) == 0 ) ) <br>       for ( y = 0; y < HeightInNumOfCrControlFlags; y++) <br>         for ( x = 0; x < WidthInNumOfCrControlFlags; x++ ) <br>           if ( isInSliceCr( xCtb / SubWidthC + x * AlfCCSamplesCrW, <br>             yCtb / SubHeightC + y * AlfCCSamplesCrH ) ) <br>               cross_component_alf_cr_control_flag[ x ][ y ] <br> ... <br> } |  <br> <br> <br> <br> <br> <br> <br> ae(v) |

Table 10 illustrates an example of syntax included in a coding_tree_unit( ) syntax structure for signaling in first CTU of control block and multiple flags if control block is smaller than CTU.

TABLE 10

| | Descriptor |
|---|---|
| coding_tree_unit( ) { <br> ... <br>   if ( slice_cross_component_alf_cb_enabled_flag ) <br>     if ( ( ( ( xCtb / SubWidthC ) % AlfCCSamplesCbW ) == 0 ) && <br>       ( ( ( yCtb / SubHeightC ) % AlfCCSamplesCbH ) == 0 ) ) <br>       for ( y = 0; y < ( CtbSizeY / SubHeightC ) / AlfCCSamplesCbH; y++) <br>         for ( x = 0; x < ( CtbSizeY / SubWidthC ) / AlfCCSamplesCbW; x++ ) <br>           if ( isInSliceCb( xCtb / SubWidthC + x * AlfCCSamplesCbW, <br>     yCtb / SubHeightC + y * AlfCCSamplesCbH ) ) <br>             cross_component_alf_cb_control_flag[ x ][ y ] | ae(v) |
|   if ( slice_cross_component_alf_cr_enabled_flag ) <br>     if ( ( ( ( xCtb / SubWidthC ) % AlfCCSamplesCbW ) == 0 ) && <br>       ( ( ( yCtb / SubHeightC ) % AlfCCSamplesCbH ) == 0 ) ) <br>       for ( y = 0; y < HeightInNumOfCrControlFlags; y++) <br>         for ( x = 0; x < WidthInNumOfCrControlFlags; x++ ) <br>           if <br> ( isInSliceCr( xCtb / SubWidthC + x * AlfCCSamplesCrW, <br>        yCtb / SubHeightC + y * AlfCCSamplesCrH ) ) <br>         cross_component_alf_cr_control_flag[ x ][ y ] <br> ... <br> } | ae(v) |

With respect to Tables 9-10, in one example, the semantics may be based on the following:

cross_component_alf_cb_control_flag[x][y] equal to 1 specifies that the cross-component Cb filter is applied to the block of the colour component Cb at chroma location (xCtb/SubWidthC+x*AlfCCSamplesCbW, yCtb/SubHeightC+y*AlfCCSamplesCbH). cross_component_alf_cb_flag[x][y] equal to 0 specifies that the cross-component Cb adaptive loop filter is not applied to the block of the colour component Cb at chroma location (xCtb/SubWidthC+x*AlfCCSamplesCbW, yCtb/SubHeightC+y*AlfCCSamplesCbH). When cross_component_alf_cb_flag[x][y] is not present, it is inferred to be equal to 0.

cross_component_alf_cr_control_flag[x][y] equal to 1 specifies that the cross-component Cr filter is applied to the block of the colour component Cr at chroma location (xCtb/SubWidthC+x*AlfCCSamplesCrW, yCtb/SubHeightC+y*AlfCCSamplesCrH). cross_component_alf_cr_flag[x] [y] equal to 0 specifies that the cross-component Cr adaptive loop filter is not applied to the block of the colour component Cr at chroma location (xCtb/SubWidthC+x*AlfCCSamplesCrW, yCtb/SubHeightC+y*AlfCCSamplesCrH). When cross_component_alf_cr_flag[x][y] is not present, it is inferred to be equal to 0.

In one example, according to the techniques herein, the value of spatially adjacent flags is used to select context used to code the control flags. In one example, there are 3 total contexts for cross_component_alf_cb_control_flag and cross_component_alf_cr_control_flag, which may be determined as follows:

```
int ctxt = 0;
 // left
 if (cross component Cb control flag to left is available ) // One of the
conditions for availability is x>0, others examples may be slice boundary
should not be crossed, picture boundary should not be crossed, MCTS
boundary should not be crossed
 {
   ctxt += cross_component_alf_cb_control_flag(x−1][y] ? 1 : 0;
 }
 // top
 if ( cross component Cb control flag to top is available ) // One of the
conditions for availability is y>0, others examples may be CTU boundary
should not be crossed, slice boundary should not be crossed, picture
boundary should not be crossed, MCTS boundary should not be crossed
 {
   ctxt += cross_component_alf_cb control flag[x][y−1] ? 1 : 0;
 }
 int ctxt = 0;
 // left
 if ( cross component Cr control flag to left is available )
 {
   ctxt += cross_component_alf_cr_control_flag[x−1][y] ? 1 : 0;
 }
 // top
 if ( cross component Cr control flag to top is available )
 {
   ctxt += cross_component_alf_cr_control_flag[x][y−1] ? 1 : 0;
 }
```

In one example, cross-component filter coefficients for cross-component filters is carried its own independent parameter set e.g., APS. In one example cross-component filter coefficients is carried in a parameter set e.g. APS, that is different from the non-cross-component filters (e.g. ALF in JVET-N1001-v8). In one example, instead of the 5×6 filter, an embodiment may use the 7×7 ALF filtering process described in JVET-N1001-v8 clause on "Coding tree block filtering process for luma samples." This would further reduce the number of coefficients that need to be signaled. In the above description, a filtering operation is applied to refine the samples in a color component and/or channel and signaling that could enable/disable the operation on a frame-by-frame and location-by-location basis is provided. In one example, the filtering operation may also be implemented so that at each frame and/or location, multiple filtering operations are available and, the described signaling may be used to transmit the multiple filters and select among the available filters.

In one example, according to the techniques herein, local region control flags may be shared between different chroma channels. That is, for example, syntax elements cross_component_alf_cb_control_flag and cross_component_alf_cr_control_flag may be replaced with a syntax element cross_component_chroma_alf_control_flag where, in one example, the semantics of cross_component_chroma_alf_control_flag are based on the following:

cross_component_chroma_alf_control_flag[x][y] equal to 1 and slice_cross_component_alf_cb_enabled_flag equal to 1 specifies that the cross-component Cb adaptive loop filter is applied to samples within the block of the colour component Cb at chroma location (*xCtb*/SubWidth*C*+*x**AlfCCSamplesCbW*,*yCtb*/SubHeight*C*+*y**AlfCCSamplesCbH*).

cross_component_chroma_alf_flag[x][y] equal to 1 and slice_cross_component_alf_cr_enabled_flag equal to 1 specifies that the cross-component Cr adaptive loop filter is applied to samples within the block of the colour component Cr at chroma location (*xCtb*/SubWidth*C*+*x**AlfCCSamplesCbW*,*yCtb*/SubHeight*C*+*y**AlfCCSamplesCbH*).

cross_component_chroma_alf_flag[x][y] equal to 0 specifies that the cross-component chroma adaptive loop filters are not applied to the sample block of the colour component Cb and Cr at chroma location (*xCtb*/SubWidth*C*+*x**AlfCCSamplesCbW*,*yCtb*/SubHeight*C*+*y**AlfCCSamplesCbH*).

When cross_component_chroma_alf_flag[x][y] is not present, it is inferred to be equal to 0.

Further, in one example, syntax elements slice_cross_component_alf_cb_enabled_flag and slice_cross_component_alf_cr_enabled_flag may be replaced with a syntax element slice_cross_component_chroma_alf_enabled_flag and syntax element cross_component_alf_cb_control_flag and cross_component_alf_cr_control_flag may be replaced with a syntax element cross_component_chroma_alf_control_flag where, in one example, the semantics of slice_cross_component_chroma_alf_enabled_flag and cross_component_chroma_alf_control_flag are based on the following:

cross_component_chroma_alf_control_flag[x][y] equal to 1 and slice_cross_component_alf_chroma_enabled_flag equal to 1 specifies that the cross-component Cb adaptive loop filter is applied to samples within the block of the colour component Cb at chroma location (*xCtb*/SubWidth*C*+*x**AlfCCSamplesCbW*,*yCtb*/SubHeight*C*+*y**AlfCCSamplesCbH*).

cross_component_chroma_alf_flag[x][y] equal to 1 and slice_cross_component_alf_chroma_enabled_flag equal to 1 specifies that the cross-component Cr adaptive loop filter is applied to samples within the block of the colour component Cr at chroma location (*xCtb*/SubWidth*C*+*x**AlfCCSamplesCbW*,*yCtb*/SubHeight*C*+*y**AlfCCSamplesCbH*).

cross_component_chroma_alf_flag[x][y] equal to 0 specifies that the cross-component chroma adaptive loop filters are not applied to the sample block of the colour component Cb and Cr at chroma location (*xCtb*/SubWidth*C*+*x**AlfCCSamplesCbW*,*yCtb*/SubHeight*C*+*y**AlfCCSamplesCbH*).

When cross_component_chroma_alf_flag[x] [y] is not present, it is inferred to be equal to 0.

With respect to these examples, Table 11 illustrates an example of syntax included in a coding_tree_unit( ) syntax structure for the first CTU of a slice and Table 12 illustrates an example of syntax included in a coding_tree_unit( ) syntax structure for respective CTUs.

TABLE 11

| | Descriptor |
|---|---|
| coding tree unit( ) { <br> ... <br> if ( first coding tree unit of slice ) { <br>   if ( slice_cross_component_alf_cb_enabled_flag || slice_cross_component_alf_cr_enabled_flag ) <br> // OR if ( slice_cross_component_alf_chroma enabled flag ) <br>     for ( y = 0; y < HeightInNumOfCbControlFlags; y++) <br>       for ( x = 0; x < WidthInNumOfCbControlFlags; x++ ) <br>         cross_component_chroma_alf_control_flag[ x ][ y ] <br> } <br> ... <br> } | <br><br><br><br><br><br><br><br>ae(v) |

TABLE 12

| | Descriptor |
|---|---|
| coding tree unit( ) { <br> ... <br> if ( slice_cross_component_alf_cb_enabled_flag || slice_cross_component_alf_cr_enabled_flag ) <br> // OR if ( slice_cross_component_alf_chroma_enabled_flag ) <br>   if ( ( ( ( xCtb / SubWidthC ) % AlfCCSamplesCbW ) == 0 ) && ( ( ( yCtb / SubHeightC ) % AlfCCSamplesCbH ) == 0 ) ) <br>     for ( y = 0; y < ( CtbSizeY / SubHeightC ) / AlfCCSamplesCbH; y++) <br>       for ( x = 0; x < ( CtbSizeY / SubWidthC ) / AlfCCSamplesCbW; x++ ) <br>         if ( isInSlice( xCtb / SubWidthC + x * AlfCCSamplesCbW, yCtb / SubHeightC + y * AlfCCSamplesCbH ) ) <br>           cross_component_chroma_alf_control_flag[ x ][ y ] <br> ... <br> } | <br><br><br><br><br><br><br><br><br>ae(v) |

As described above, the application of cross component filtering may be based on the properties of samples included in a filter support region (e.g., variance and/or deviation). In one example, a shared control flag, (e.g., cross_component_chroma_alf_control_flag) and the properties of samples included in a filter support region may be used to determine if cross component filtering is applied for one or both of the chroma channels. For example, in one example, for Cb, the value of cross_component_chroma_alf_control_flag may determine whether cross component filtering is applied and for Cr, the value of cross_component_chroma_alf_control_flag and additionally, the variance of the support, may determine whether cross component filtering is applied.

As described above, in JVET-N1001 and JVET-O2001, CTUs are partitioned according a quadtree plus multi-type tree (QTMT or QT+MTT) structure. In JVET-N1001 and JVET-O2001, for I slices, each CTU may be split into coding units with 64×64 luma samples using an implicit quadtree split and that these coding units may be the root of two separate coding tree syntax structures, i.e., one for the luma channel and one for the chroma channel. In either case, local region control flag values may be signaled/determined within the syntax of partitioning tree signaling. That is, for example, the syntax and semantics used to partition chroma channels into CUs (i.e., a chroma coding tree) may include signaling (implicit and/or explicit) which indicates local region control flag values. For example, JVET-N1001 and JVET-O2001, define a variable cbSubdiv=2*cqtDepth, cqtDepth is the current coding quadtree depth and the depth at the CTU is 0. In one example, according to the techniques herein, a smallest tree node with cbSubdiv lower than or equal to the given threshold may represent parent node control flag signaling group, where all blocks resulting from further splits belong to the same control flag signaling group. That is, a local region control flag at a parent CU may be used to infer the value of a local region control flags at any resulting children CUs. Table 13 and Table 14 illustrate an example of syntax and variable assignment for determining local region control flag values. That is, in Table 13, a smallest tree node with cbSubdiv lower than or equal to the given threshold may represent parent node control flag signaling group. Table 14 provides the corresponding coding unit syntax.

In the example illustrated in Table 13, CC ALF control signaling depth for slice represents the threshold. In one example, this threshold the may be signaled for a slice, sequence, or picture. With respect to Table 13, the luma location (xCtrlBlk, yCtrlBlk), specifies the top-left luma sample of the current chroma control block relative to the top left luma sample of the current picture. The horizontal and vertical positions xCtrlBlk and yCtrlBlk are set equal to CuCcAlfTopLeftX and CuCcAlfTopLeftY, respectively. Further, the current chroma control block is a rectangular region inside a coding tree block that shares the same CC Alf Control Flag Value (shared or independent for chroma components). Its width and height are equal to the width and height of the coding tree node of which the top-left luma sample position is assigned to the variables CuCcAlfTopLeftX and CuAlfCcTopLeftY. It should be noted that in one example, there may be an independent set of variables for each chroma component.

With respect to Table 14, in one example, when cross_component_chroma_alf_control_flag (shared or independent) is not present, it is inferred to be equal to 0 and when cross_component_chroma_alf_control_flag (shared or independent) is present, the variables IsCuCcAlfControlFlagCoded is set to 1. Further, Cu CC Alf Control Flag Val is set to cross_component_chroma_alf_control_flag. As such, in this example, as long as the condition to start a new control flag signaling group is true (that is, CC ALF is enabled for the slice and cuSubdiv is not higher than the limit), an internal flag "IsCuCcAlfControlFlagCoded" is set to 0 and the current tree node origin is saved as control flag signaling group origin in CuCcAlfTopLeftX, CuCcAlfTopLeftY variables. Later, in coding unit syntax, if "IsCuCcAlfControlFlagCoded" is zero, the control signaling group flag is coded and the "IsCuCcAlfControlFlagCoded" flag is set to 1, preventing other control block flags from being coded until a new control flag signaling group is found. Coding units may inherit their control flag value from the last coded tree node origin until a new control flag signaling group is found. In an example, when the local control region syntax element is present in a coding unit then IsCuCcAlfControlFlagCoded is set equal to 1. It should be noted that JVET-N1001 and JVET-O2001 provide quantization parameter groups which indicate the lowest depth at which a QP value is signaled. In one example, CC ALF control signaling may be aligned quantization parameter groups. That is, children nodes within a quantization parameter group share a QP value and a CC ALF control value. Further, in one case, the value of a CC ALF control value may be based on or derived entirely from a QP value (e.g., if a QP value less than a threshold, CC ALF control flag is not signaled for group and inferred to be 0).

As described above, signaling of cross component filtering may include signaling of a particular filter (e.g., a filter shape and/or filter coefficients). In one example, according to the techniques herein, the value of a syntax element may

TABLE 13

```
//At Chroma Coding Tree
    if( CC ALF enabled for slice && cbSubdiv <= CC ALF
control signaling depth for slice ) {
        Cu CC Alf Control Flag Val is set to 0
        IsCuCcAlfControlFlagCoded = 0
        CuCcAlfTopLeftX = x0
        CuCcAlfTopLeftY = y0
    }
```

TABLE 14

| | Descriptor |
|---|---|
| coding_unit( x0, y0, cbWidth, cbHeight, treeType ) { <br> ... <br>   if(CC ALF enabled for slice && !IsCuCcAlfControlFlagCoded ) { <br>     cross_component_chroma_alf_control_flag (shared or independent) <br>   } <br> ... | <br><br><br>ae(v) | indicate whether cross component filtering is applied for a region and when cross component filtering is applied for a region, a particular filter for the region. For example, a value of 0 may indicate cross component filtering is not applied for a region, a value of 1 may indicate a filter having a first filter coefficient set is applied, a value of 2 may indicate a filter having a second filter coefficient set is applied, etc. In one example, the region may be a CTU. Table 15 illustrates an example of syntax included in a coding_tree_unit( ) syntax structure according to the techniques herein. That is, in the example illustrated in Table 15, syntax elements alf_cross_component_cb_idc and alf_cross_component_cr_idc indicate whether cross component filtering is applied and when cross component filtering is applied indicate a filter.

TABLE 15

| | Descriptor |
|---|---|
| coding_tree_unit( ) {<br>  xCtb = ( CtbAddrInRs % PicWidthInCtbsY ) << CtbLog2SizeY<br>  yCtb = ( CtbAddrInRs / PicWidthInCtbsY ) << CtbLog2SizeY<br>  xCtbC = xCtb / SubWidthC<br>  yCtbC = yCtb / SubHeightC<br>  ...<br>  if(slice_cross_component_alf_cb_enabled_flag ){<br>    xStartC = ( xCtbC >> AlfCCSamplesCbLog2W ) << AlfCCSamplesCbLog2W<br>    yStartC = ( yCtbC >> AlfCCSamplesCbLog2H ) << AlfCCSamplesCbLog2H<br>    if (xCtbC == xStartC && yCtbC == yStartC) { // at least one indicator is to be coded<br>in CTU and when local control regions do not span across CTUs then this check may be<br>omitted<br>      xEndC = xStartC + (1 << CtbLog2SizeY ) / SubWidthC<br>      xEndC = ( xEndC >= PicWidthInChromaSamples ) ? PicWidthInChromaSamples :<br>xEndC // do not exceed picture width<br>      yEndC = yStartC + (1 << CtbLog2SizeY ) / SubHeightC<br>      yEndC = ( yEndC >= PicHeightInChromaSamples ) ? PicHeightInChromaSamples :<br>yEndC // do not exceed picture height<br>      for ( yC = yStartC; yC < yEndC; yC += AlfCCSamplesCbLog2H) {<br>        for ( xC = xStartC; xC < xEndC; xC += AlfCCSamplesCbLog2W ) {<br>  alf_cross_component_cb_idc[ xC >> AlfCCSamplesCbLog2W ][ yC >> AlfCCSample<br>sCbLog2H ] | ae(v) |
|         }<br>      }<br>    } else if ( UnavailableCb(xStartC, yStartC) ){ // example out of slice, out of tile<br>  alf_cross_component_cb_idc[ xC >> AlfCCSamplesCbLog2W ][ yC >> AlfCCSample<br>sCbLog2H ] | ae(v) |
|     } // When local control regions do not span across CTUs and slice/tiles/bricks<br>boundaries are aligned with CTU boundaries then this "else if" branch may be omitted<br>  }<br>  if(slice_cross_component_alf_cr_enabled flag ){<br>    xStartC = ( xCtbC >> AlfCCSamplesCrLog2W ) << AlfCCSamplesCrLog2W<br>    yStartC = ( yCtbC >> AlfCCSamplesCrLog2H ) << AlfCCSamplesCrLog2H<br>    if (xCtbC == xStartC && yCtbC == yStartC) { // at least one indicator is to be coded<br>in CTU and When local control regions do not span across CTUs then this check may be<br>omitted<br>      xEndC = xStartC + (1 << CtbLog2SizeY ) / SubWidthC<br>      xEndC = ( xEndC >= PicWidthInChromaSamples ) ? PicWidthInChromaSamples :<br>xEndC // do not exceed picture width<br>      yEndC = yStartC + (1 << CtbLog2SizeY ) / SubHeightC<br>      yEndC = ( yEndC >= PicHeightInChromaSamples ) ? PicHeightInChromaSamples :<br>yEndC // do not exceed picture height<br>      for ( yC = yStartC; yC < yEndC; yC += AlfCCSamplesCrLog2H) {<br>        for ( xC = xStartC; xC < xEndC; xC += AlfCCSamplesCrLog2W ) {<br>  alf_cross_component_cr_idc[ xC >> AlfCCSamplesCrLog2W ][ yC >> AlfCCSamples<br>CrLog2H ] | ae(v) |
|         }<br>      }<br>    } else if ( UnavailableCr(xStartC, yStartC) ){// example out of slice, out of tile<br>  alf_cross_component_cr_idc[ xC >> AlfCCSamplesCrLog2W ][ yC >> AlfCCSamples<br>CrLog2H ] | ae(v) |
|     } // When local control regions do not span across CTUs and slice/tiles/bricks<br>boundaries are aligned with CTU boundaries then this "else if" branch may be omitted<br>  }<br>  ...<br>  if( slice_type == I && qtbtt_dual_tree_intra_flag )<br>    dual_tree_implicit_qt_split ( xCtb, yCtb, CtbSizeY, 0 )<br>  else<br>    coding_tree( xCtb, yCtb, CtbSizeY, CtbSizeY, 1, 1, 0, 0, 0, 0, 0,<br>        SINGLE_TREE, MODE_TYPE_ALL )<br>} | |

With respect to Table 15, in one example, the semantics may be based on the following:

PicWidthInChromaSamples=pic_width_in_luma_samples/ SubWidthC

PicHeightInChromaSamples=pic_height_in_luma_samples/ SubHeightC

AlfCCSamplesCb Log 2W=AlfCCSamplesCb Log 2H=slice_cross_component_alf_cb_log 2_control_sizeminus4+4

AlfCCSamplesCr Log 2W=AlfCCSamplesCr Log 2H=slice_cross_component_alf_cr_log 2_control_sizeminus4+4

Further, it should be noted:

In an example, xStartC corresponds to top edge of CTU. In an example, yStartC corresponds to left edge of CTU.

When local control regions do not span across CTUs, the check (xCtbC==xStartC && yCtbC==yStartC) may be omitted.

In one example, (xEndC>=PicWidthInChromaSamples) and (yEndC>=PicHeightInChromaSamples) the upper bounds provided by PicWidthInChromaSamples and PicHeightInChromaSample may instead respectively correspond to right and bottom slice/tile/brick/CTU boundary.

alf_cross_component_cb_idc [xC>>AlfCCSamplesCbLog 2W] [yC>>AlfCCSamplesCbLog2 H] equal to 0 indicates that the cross-component Cb filter is not applied to block of Cb chroma samples with left top chroma position (xC, yC). alf_cross_component_cb_idc[xC>>AlfCCSamplesCbLog2 W][yC>>AlfCCSamplesCbLog2H] equal to m, where m is greater than 0 indicates that the k=(m−1) th cross-component Cb filter set is applied to the block of Cb chroma samples with left top chroma position (xC, yC)

alf_cross_component_cr_idc [xC>>AlfCCSamplesCrLog2 W][yC>>AlfCCSamplesCrLog2H] equal to 0 indicates that the cross-component Cr filter is not applied to block of Cr chroma samples with left top chroma position (xC, yC). alf_cross_component_cr_idc[xC>>AlfCCSamplesCrLog2 W][yC>>AlfCCSamplesCrLog2H] equal to m, where m is greater than 0 indicates that the k=(m−1) th cross-component Cr filter set is applied to the block of Cr chroma samples with left top chroma position (xC, yC)

Function UnavailableCb(xC,yC) returns TRUE when alf_cross_component_cb_idc[xC>>AlfCCSamplesCbLog2 W][yC>>AlfCCSamplesCbLog2 H] corresponding to chroma sample location (xC,yC) is not available e.g. when (xC,yC) is in a different slice/tile compared to current CTU, Otherwise it returns FALSE Function UnavailableCr(xC,yC) returns TRUE when alf_cross_component_cr_idc[xC>>AlfCCSamplesCrLog2 W][yC>>AlfCCSamplesCrLog2H] corresponding to chroma sample location (xC,yC) is not available e.g. when (xC,yC) is in a different slice/tile compared to current CTU, Otherwise it returns FALSE.

In one example, according to the techniques herein the binarization of alf_cross_component_cb_idc and/or alf_cross_component_cr_idc may be a Truncated Rice, TR, binarization with a maximum value, cMax, depending on number of filter coefficient sets signaled, and cRiceParam is equal to 0. Table 16 illustrates an example of a Truncated Rice binarization for alf_cross_component_cb_idc and/or alf_cross_component_cr_idc.

TABLE 16

| Indication Value | TR Binarization (cRiceParam is equal to 0) |
|---|---|
| 0 | 0 |
| 1 | 10 |
| 2 | 110 |
| 3 | 1110 |
| ... | ... |
| cMax-1 | 1 ... 10 contains (cMax − 1) 1's |
| cMax | 1 ... 11 contains cMax 1's |

Where,

For CC ALF Cb cMax is set to corresponding (alf_cross_component_cb_filters_signalled_minus1 plus 1)

For CC ALF Cr cMax is set to corresponding (alf_cross_component_cr_filters_signalled_minus1 plus 1)

In one example, for alf_cross_component_cb_idc and/or alf_cross_component_cr_idc only the first bin may be context coded (i.e., the other bins may be bypass coded). In one example, the derivation of the context for the first bin may be as follows:

Input to this process is the luma location (x0, y0) specifying the top-left luma sample of the current luma block relative to the top-left sample of the current picture, the colour component cIdx, the current coding quadtree depth cqtDepth, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics.

Output of this process is ctxInc.

The location (xNbL, yNbL) is set equal to (x0−1, y0) and the derivation process for neighbouring block availability as specified is invoked with the location (xCurr, yCurr) set equal to (x0, y0), the neighbouring location (xNbY, yNbY) set equal to (xNbL, yNbL), checkPredModeY set equal to FALSE, and cIdx as inputs, and the output is assigned to availableL. The location (xNbA, yNbA) is set equal to (x0, y0−1) and the derivation process for neighbouring block availability as specified is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA. The assignment of ctxInc is specified as follows with condL and condA specified in Table 17: For the syntax elements alf_cross_component_cb_idc[x0][y0] and alf_cross_component_cr_idc[x0][y0]:

ctxInc=(condL && availableL)+(condA && availableA)+ctxSetIdx*3

TABLE 17

| Syntax element | condL | condA | ctxSetIdx |
|---|---|---|---|
| alf_cross_component_cb_idc [ x0 ][ y0 ] | alf_cross_component_cb_idc [ xNbL ][ yNbL ] == 0 | alf_cross_component_cb_idc [ xNbA ][ yNbA ] == 0 | 0 |
| alf_cross_component_cr_idc [ x0 ][ y0 ] | alf_cross_component_cr_idc [ xNbL ][ yNbL ] == 0 | alf_cross_component_cr_idc [ xNbA ][ yNbA ] == 0 | 0 |

In one example, for alf_cross_component_cb_idc and/or alf_cross_component_cr_idc all bins may be context coded and each bin may use a separate context set as indicated in Table 18.

TABLE 18

| Syntax element | binIdx | | | | | |
|---|---|---|---|---|---|---|
| | 0 | 1 | 2 | 3 | 4 | >=5 |
| alf_cross_component_cb_idc[ ][ ] | 0...2 | 3...5 | 6...8 | 9...12 | 13...15 | 3*binIdx ... (4*binIdx − 1) |
| alf_cross_component_cr_idc[ ][ ] | 0...2 | 3...5 | 6...8 | 9...12 | 13...15 | 3*binIdx ... (4*binIdx − 1) |

With respect to Table 18, in one example, the derivation of a context may be as follows:

Input to this process is the luma location (x0, y0) specifying the top-left luma sample of the current luma block relative to the top-left sample of the current picture, the colour component cIdx, the current coding quadtree depth cqtDepth, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics.

Output of this process is ctxInc.

The location (xNbL, yNbL) is set equal to (x0−1, y0) and the derivation process for neighbouring block availability as specified is invoked with the location (xCurr, yCurr) set equal to (x0, y0), the neighbouring location (xNbY, yNbY) set equal to (xNbL, yNbL), checkPredModeY set equal to FALSE, and cIdx as inputs, and the output is assigned to availableL. The location (xNbA, yNbA) is set equal to (x0, y0−1) and the derivation process for neighbouring block availability as specified is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA. The assignment of ctxInc is specified as follows with condL and condA specified in Table 19: For the syntax elements alf_cross_component_cb_idc[x0][y0] and alf_cross_component_cr_idc[x0][y0]:

ctxInc=(condL && availableL)+(condA && availableA)+ctxSetIdx*3

TABLE 19

| Syntax element | condL | condA | ctxSetIdx |
|---|---|---|---|
| alf_cross_component_cb_idc [ x0 ][ y0 ] bin index binIdx | (alf_cross_component_cb_idc[ xNbL ][ yNbL ] & (1 << binIdx) ) == 0 | (alf_cross_component_cb_idc[ xNbA ][ yNbA ] & (1 << binIdx) ) == 0 | binIdx |
| alf_cross_component_cb_idc [ x0 ][ y0 ] bin index binIdx | (alf_cross_component_cr_idc[ xNbL ][ yNbL ] == & (1 << binIdx) ) == 0 | (alf_cross_component_cr_idc[ xNbA ][ yNbA ] & (1 << binIdx) ) == 0 | binIdx | and all bins use same context, i.e., the same context for each binIdx. In some cases a subset of binIdx is not applicable e.g. NumCcAlfCbFilters is 3, binIdx>3 is not applicable for alf_cross_component_cb_idc[ ][ ], NumCcAlfCrFilters is 3, binIdx>3 is not applicable for alf_cross_component_cr_idc[ ][ ].

In one example, for alf_cross_component_cb_idc and/or alf_cross_component_cr_idc all bins may be context coded and each bin may use the same context set as indicated in Table 20. With respect to Table 20, it should be noted that in some cases a subset of binIdx is not applicable e.g., NumCcAlfCbFilters is 3, binIdx>3 is not applicable for alf_cross_component_cb_idc[ ][ ], NumCcAlfCrFilters is 3, binIdx>3 is not applicable for alf_cross_component_cr_idc[ ][ ].

TABLE 20

| Syntax element | binIdx | | | | | |
|---|---|---|---|---|---|---|
| | 0 | 1 | 2 | 3 | 4 | >=5 |
| alf_cross_component_cb_idc[ ][ ] | 0...2 | 0...2 | 0...2 | 0...2 | 0...2 | 0...2 |
| alf_cross_component_cr_idc[ ][ ] | 0...2 | 0...2 | 0...2 | 0...2 | 0...2 | 0...2 |

With respect to Table 20, in one example, the derivation of a context may be as follows:

Input to this process is the luma location (x0, y0) specifying the top-left luma sample of the current luma block relative to the top-left sample of the current picture, the colour component cIdx, the current coding quadtree depth cqtDepth, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics.

Output of this process is ctxInc.

The location (xNbL, yNbL) is set equal to (x0−1, y0) and the derivation process for neighbouring block availability as specified is invoked with the location (xCurr, yCurr) set equal to (x0, y0), the neighbouring location (xNbY, yNbY) set equal to (xNbL, yNbL), checkPredModeY set equal to FALSE, and cIdx as inputs, and the output is assigned to availableL. The location (xNbA, yNbA) is set equal to (x0, y0−1) and the derivation process for neighbouring block availability as specified is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA. The assignment of ctxInc is specified as follows with condL and condA specified in Table 21: For the syntax elements alf_cross_component_cb_idc[x0][y0] and alf_cross_component_cr_idc[x0][y0]:

ctxInc=(condL && availableL)+(condA && availableA)+ctxSetIdx*3

TABLE 21

| Syntax element | condL | condA | ctxSetIdx |
|---|---|---|---|
| alf_cross_component_cb_idc [ x0 ][ y0 ] bin index binIdx | (alf_cross_component_cb_idc[ xNbL ][ yNbL ] & (1 << binIdx) ) == 0 | (alf_cross_component_cb_id c[ xNbA ][ yNbA ] & (1 << binIdx) ) = 0 | 0 |
| alf_cross_component_cr_idc [ x0 ][ y0 ] bin index binIdx | (alf_cross_component_cr_id c[ xNbL ][ yNbL ] == & (1 << binIdx) ) = 0 | (alf_cross_component_cr_id c[ xNbA ][ yNbA ] & (1 << binIdx) ) == 0 | 0 |

In this manner, video encoder represents an example of a device configured to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

Figure 17:
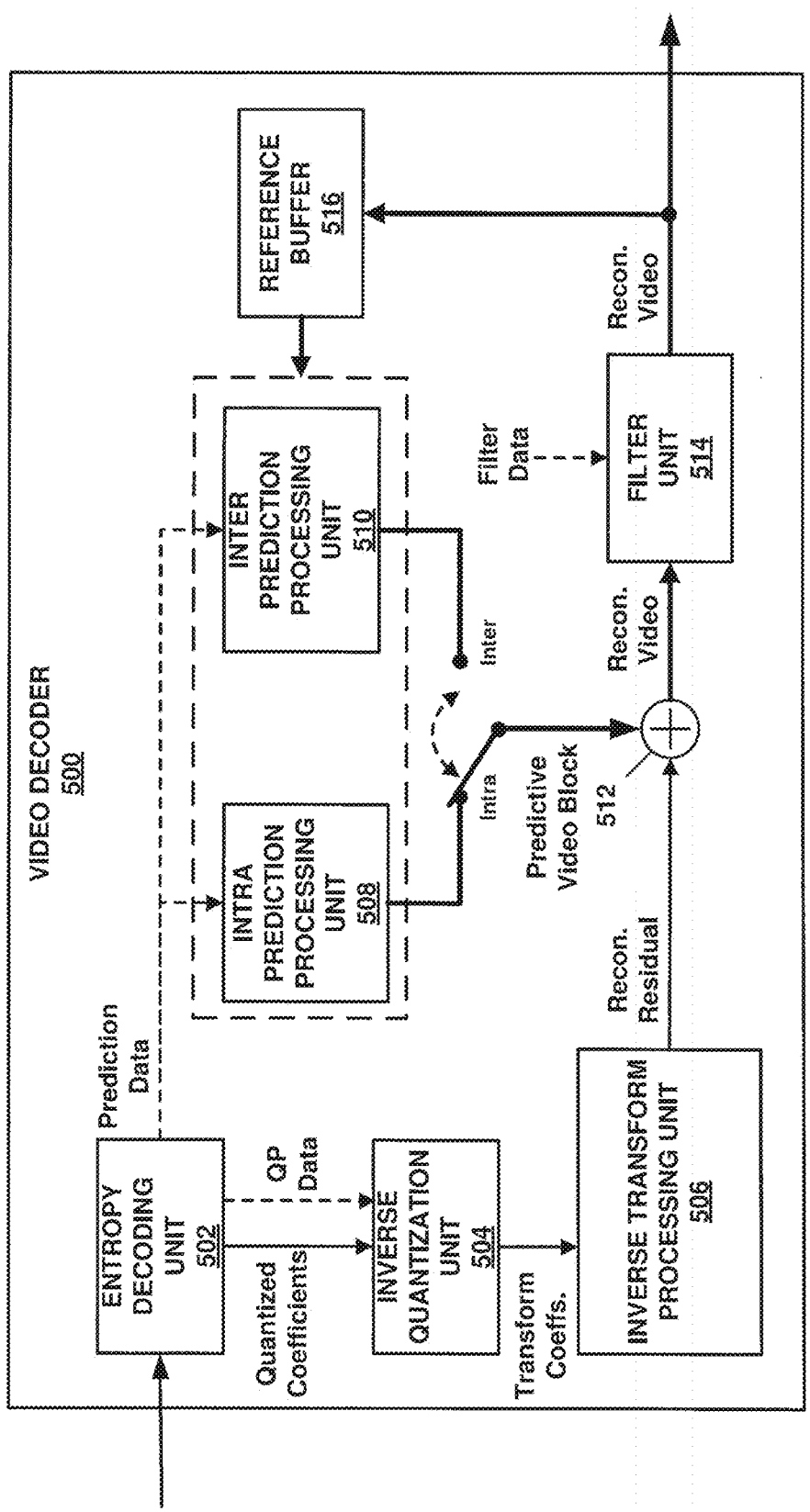
FIG. 17 is a block diagram illustrating an example of a video decoder that may be configured to decode video data according to one or more techniques of this disclosure.

FIG. 17 is a block diagram illustrating an example of a video decoder that may be configured to decode video data according to one or more techniques of this disclosure. In one example, video decoder 500 may be configured to reconstruct video data based on one or more of the techniques described above. That is, video decoder 500 may operate in a reciprocal manner to video encoder 200 described above. Video decoder 500 may be configured to perform intra prediction decoding and inter prediction decoding and, as such, may be referred to as a hybrid decoder. In the example illustrated in FIG. 18 video decoder 500 includes an entropy decoding unit 502, inverse quantization unit 504, inverse transformation processing unit 506, intra prediction processing unit 508, inter prediction processing unit 510, summer 512, filter unit 514, and reference buffer 516. Video decoder 500 may be configured to decode video data in a manner consistent with a video encoding system, which may implement one or more aspects of a video coding standard. It should be noted that although example video decoder 500 is illustrated as having distinct functional blocks, such an illustration is for descriptive purposes and does not limit video decoder 500 and/or sub-components thereof to a particular hardware or software architecture. Functions of video decoder 500 may be realized using any combination of hardware, firmware, and/or software implementations.

As illustrated in FIG. 17, entropy decoding unit 502 receives an entropy encoded bitstream. Entropy decoding unit 502 may be configured to decode quantized syntax elements and quantized coefficients from the bitstream according to a process reciprocal to an entropy encoding process. Entropy decoding unit 502 may be configured to perform entropy decoding according to any of the entropy coding techniques described above. Entropy decoding unit 502 may parse an encoded bitstream in a manner consistent with a video coding standard. Video decoder 500 may be configured to parse an encoded bitstream where the encoded bitstream is generated based on the techniques described above.

Referring again to FIG. 17, inverse quantization unit 504 receives quantized transform coefficients (i.e., level values) and quantization parameter data from entropy decoding unit 502. Quantization parameter data may include any and all combinations of delta QP values and/or quantization group size values and the like described above. Video decoder 500 and/or inverse quantization unit 504 may be configured to determine QP values used for inverse quantization based on values signaled by a video encoder and/or through video properties and/or coding parameters. That is, inverse quantization unit 504 may operate in a reciprocal manner to coefficient quantization unit 206 described above. For example, inverse quantization unit 504 may be configured to infer predetermined values), allowed quantization group sizes, and the like, according to the techniques described above. Inverse quantization unit 504 may be configured to apply an inverse quantization. Inverse transform processing unit 506 may be configured to perform an inverse transformation to generate reconstructed residual data. The techniques respectively performed by inverse quantization unit 504 and inverse transform processing unit 506 may be similar to techniques performed by inverse quantization/transform processing unit 208 described above. Inverse transform processing unit 506 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 17, reconstructed residual data may be provided to summer 512. Summer 512 may add reconstructed residual data to a predictive video block and generate reconstructed video data. A predictive video block may be determined according to a predictive video technique (i.e., intra prediction and inter frame prediction).

Intra prediction processing unit 508 may be configured to receive intra prediction syntax elements and retrieve a predictive video block from reference buffer 516. Reference buffer 516 may include a memory device configured to store one or more frames of video data. Intra prediction syntax elements may identify an intra prediction mode, such as the intra prediction modes described above. In one example, intra prediction processing unit 508 may reconstruct a video block using according to one or more of the intra prediction coding techniques described herein. Inter prediction processing unit 510 may receive inter prediction syntax elements and generate motion vectors to identify a prediction block in one or more reference frames stored in reference buffer 516. Inter prediction processing unit 510 may produce motion com-pensated blocks, possibly performing interpolation based on interpolation filters. Identifiers for interpolation filters to be used for motion estimation with sub-pixel precision may be included in the syntax elements. Inter prediction processing unit 510 may use interpolation filters to calculate interpolated values for sub-integer pixels of a reference block.

Filter unit 514 may be configured to perform filtering on reconstructed video data. For example, filter unit 514 may be configured to perform deblocking and/or SAO filtering, as described above with respect to filter unit 216. In example filter unit 514 may include cross component filter unit 600 described below. Further, it should be noted that in some examples, filter unit 514 may be configured to perform proprietary discretionary filter (e.g., visual enhancements). As illustrated in FIG. 17, a reconstructed video block may be output by video decoder 500.

Figure 18:
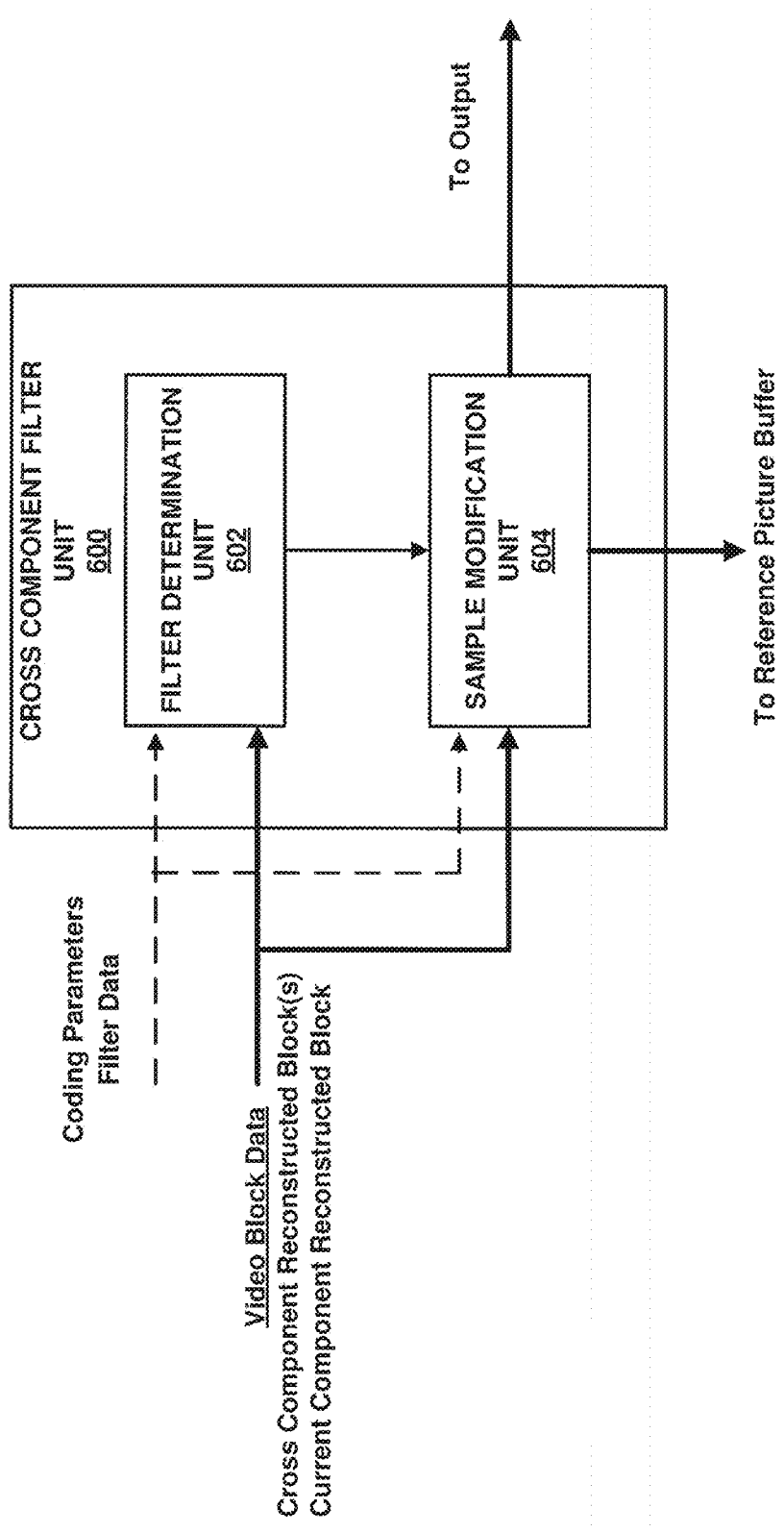
FIG. 18 is a block diagram illustrating an example of cross component filter unit that may be configured to encode video data according to one or more techniques of this disclosure.

As described above, FIG. 7 illustrates an example of a cross component filter unit that may be configured to encode video data according to one or more techniques of this disclosure. FIG. 18 illustrates an example of a cross component filter unit that may be configured to decode video data according to one or more techniques of this disclosure. That it, cross component filter unit 600 may operation in a reciprocal manner to cross component filter unit 300. As illustrated in FIG. 18, component filter unit 600 includes filter determination unit 602 and sample modification unit 604. Sample modification unit 604 may operate in a manner similar to sample modification unit 304. That is, sample modification unit 604 may perform filtering according to derived filter, include one or more of the filters describe herein. As illustrated in FIG. 18, sample modification unit 604 may output the modified reconstructed block to the reference picture buffer (i.e., as an in-loop filter) and output the modified reconstructed block to an output (e.g., a display). Filter determination unit 602 may receive coding parameter information (e.g., an intra prediction) available at the time a current block is decoded and available video block data which, as illustrated in FIG. 18, at a video decoder, may include: Cross Component Reconstructed Block(s) and Current Component Reconstructed Block. However, as illustrated in FIG. 18 filter determination unit 602 may receive filter data. That is, filter data specifying a derived filter may be signaled to the filter determination unit 602. Examples of such signaling are described above. As such, filter determination unit 302 may derive a filter to be used on the chroma reconstructed block based on the video data, coding parameters and/or filter data.

Figure 19A:
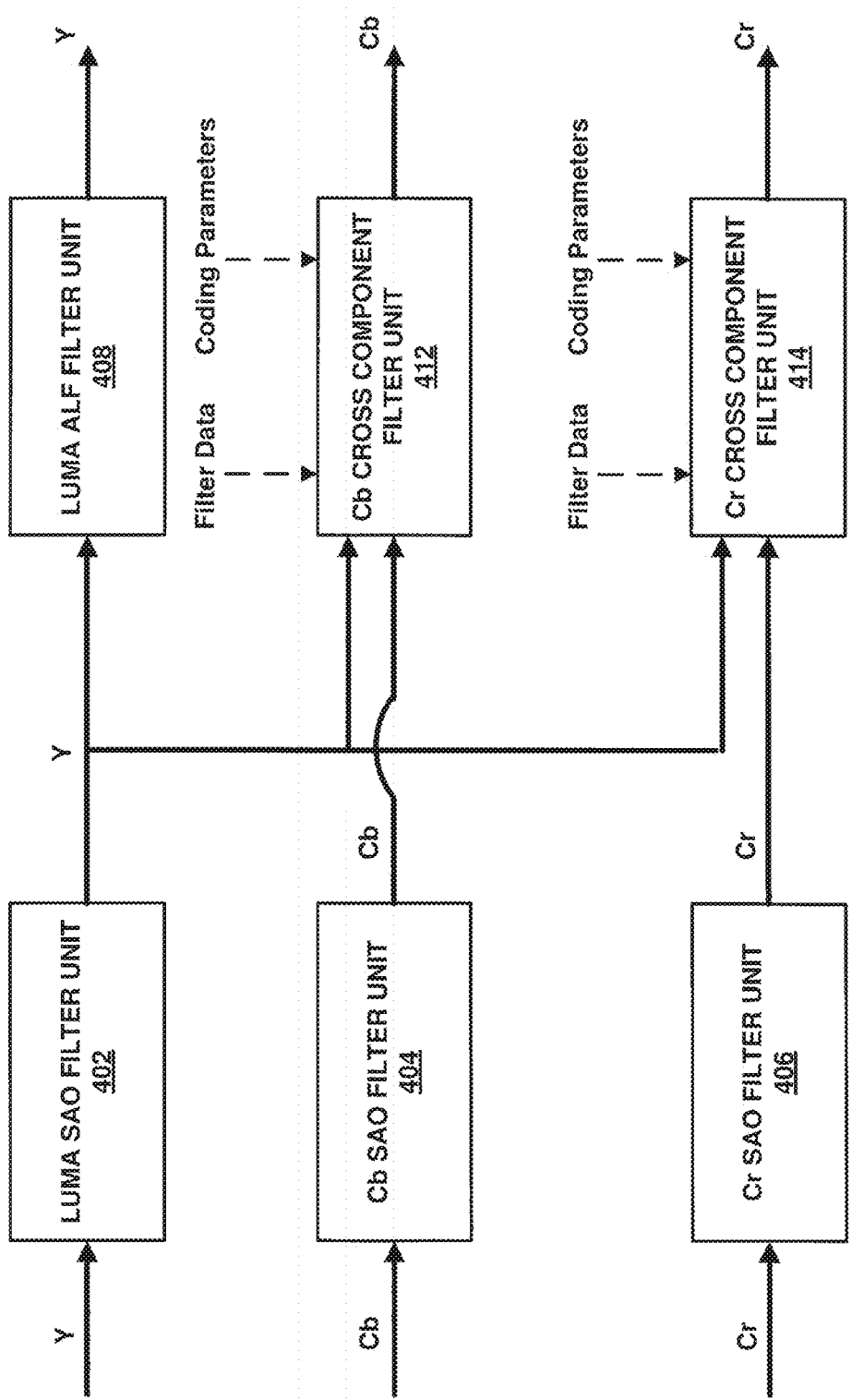
FIG. 19A is a block diagram illustrating example of cross component filter units that may be configured to reduce a reconstruction error according to one or more techniques of this disclosure.
Figure 19B:
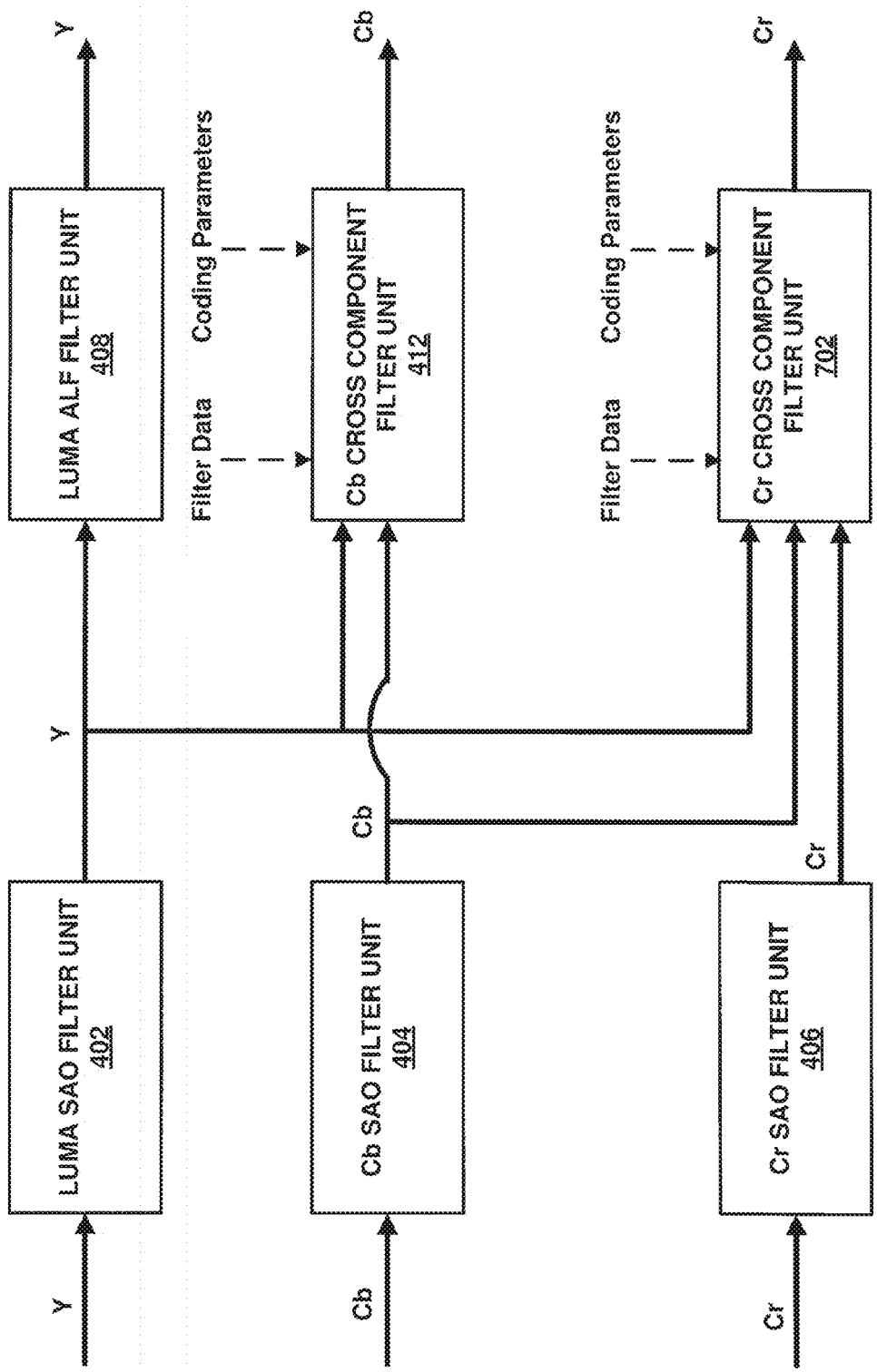
FIG. 19B is a block diagram illustrating example of cross component filter units that may be configured to reduce a reconstruction error according to one or more techniques of this disclosure.
Figure 19C:
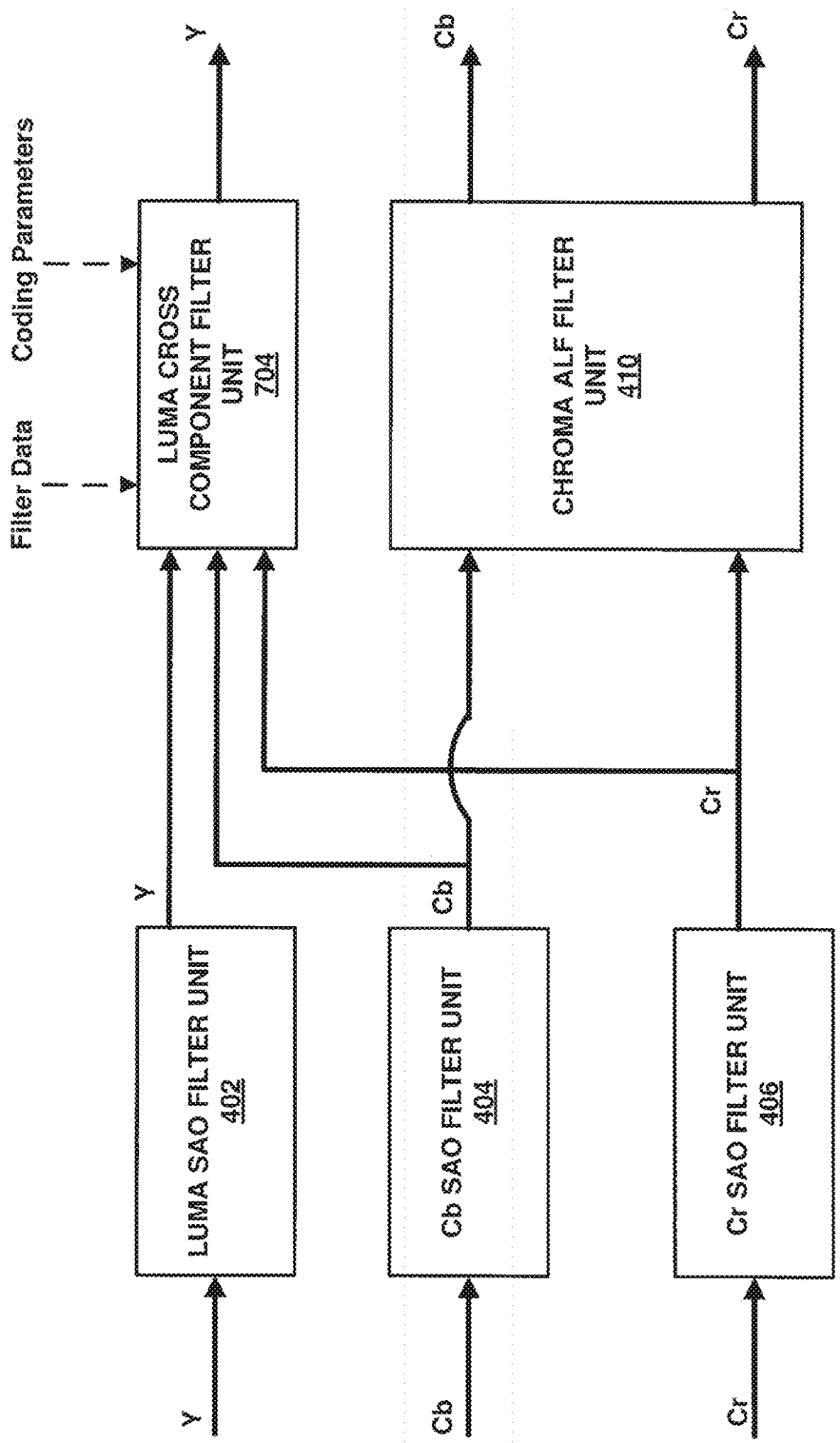
FIG. 19C is a block diagram illustrating example of cross component filter units that may be configured to reduce a reconstruction error according to one or more techniques of this disclosure.

As described above, the cross component filtering techniques describe herein may be generally applied to each component of video data. As such, one or more combinations of components of video data may be used to reduce a reconstruction error for one or more other components of video data. FIGS. 19A-19C are block diagrams illustrating examples of cross component filter units that may be configured to reduce a reconstruction error according to one or more techniques of this disclosure. That is, FIGS. 19A-19C illustrate examples of loop filters that may be included in filtering unit 514. In FIGS. 19A-19C, commonly number elements are described above. Cr Cross Component filter unit 702 is an example of a filter unit configured to filter a Cr component based on a luma component, a Cb component, filter data, and coding parameters. Luma Cross Component filter unit 704 is an example of a filter unit configured to filter a luma component based on a luma component, a Cb component, a Cr component, filter data, and coding parameters. Thus, video decoder 500 represents an example of a device configure to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Summary>

In one example, a method of reducing a reconstruction error in video data, the method comprising: receiving reconstructed sample data for a current component of video data; receiving reconstructed sample data for one or more additional components of video data; deriving a cross component filter based on data associated with one or more additional components of video data; and applying a filter to the reconstructed sample data for a current component of video data based on the derived cross component filter and the reconstructed sample data for one or more additional components of video data.

In one example, the method, further comprising signaling information associated with the derived cross component filter.

In one example, the method, wherein deriving a cross component filter includes parsing signaling to determine cross component filter parameters.

In one example, the method, wherein deriving a cross component filter based on data associated with one or more additional components of video data includes deriving a cross component filter based on a known reconstruction error.

In one example, the method, a cross component filter is specified according to filter coefficients.

In one example, a device for coding video data, the device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of filtering reconstructed video data, the method comprising: inputting reconstructed luma component sample values; deriving a filtered sample value by using cross component filter coefficients and the reconstructed luma component sample values prior to an adaptive loop filtering process; deriving a refinement value for chroma components by using the filtered sample value; and deriving a refined chroma sample value by using a sum of a sample value of chroma components and the refinement value for chroma components.

In one example, the method, further comprising: performing a clipping function by using the sum and a bit depth.

In one example, the method, further comprising: decoding a first filter coefficients syntax element specifying an absolute value of the cross component filter coefficients for a Cb component in an adaptive loop filter data syntax structure, and decoding a second filter coefficients syntax element specifying a sign of the cross component filter coefficients for the Cb component in the adaptive loop filter data syntax structure.

In one example, the method, further comprising: decoding a first cross component syntax element specifying whether a cross component filter is applied for a Cb colour component, and decoding a second cross component syntax element specifying whether a cross component filter is applied for a Cr colour component.

In one example, a decoder of decoding coded data, the decoder comprising: a processor, and a memory associated with the processor; wherein the processor is configured to perform the following steps: inputting reconstructed luma component sample values; deriving a filtered sample value by using cross component filter coefficients and the reconstructed luma component sample values prior to an adaptive loop filtering process; deriving a refinement value for chroma components by using the filtered sample value; and deriving a refined chroma sample value by using a sum of a sample value of chroma components and the refinement value for chroma components.

In one example, an encoder of encoding video data, the encoder comprising: a processor, and a memory associated with the processor; wherein the processor is configured to perform the following steps: inputting reconstructed luma component sample values; deriving a filtered sample value by using cross component filter coefficients and the reconstructed luma component sample values prior to an adaptive loop filtering process; deriving a refinement value for chroma components by using the filtered sample value; and deriving a refined chroma sample value by using a sum of a sample value of chroma components and the refinement value for chroma components.

CROSS REFERENCE

This Nonprovisional application claims priority under 35 U.S.C. § 119 on provisional Application No. 62/865,933 on Jun. 24, 2019, No. 62/870,752 on Jul. 4, 2019, No. 62/886,891 on Aug. 14, 2019, the entire contents of which are hereby incorporated by reference.

The invention claimed is:

1. A method of filtering reconstructed video data, the method comprising:
   inputting reconstructed luma component sample values prior to a luma adaptive loop filtering process in a filter chain into a cross component filtering process;
   deriving cross component filter coefficients from a first syntax element in a slice header and coefficient syntax elements in an alf data syntax structure, wherein the first syntax element specifies an adaptation parameter set id and the alf data syntax structure is specified by the adaptation parameter set id;
   deriving a refinement value by using the cross component filter coefficients and the reconstructed luma component sample values; and
   modifying a reconstructed chroma component sample value by adding the refinement value, wherein
   the reconstructed chroma component sample values have been filtered according to a chroma adaptive loop filtering process.

2. The method of claim 1, further comprising clipping a sum of the reconstructed chroma component sample value and the refinement value based on a bit depth.

3. The method of claim 1, wherein:
   the coefficient syntax elements include second syntax elements specifying an absolute value of the cross component filter coefficients for a chroma component and third syntax elements specifying a sign of the cross component filter coefficients for the chroma component.

4. A decoder of decoding coded data, the decoder comprising:
   a processor, and
   a memory associated with the processor; wherein the processor is configured to perform the following steps:
   inputting reconstructed luma component sample values prior to a luma adaptive loop filtering process in a filter chain into a cross component filtering process;
   deriving cross component filter coefficients from a first syntax element in a slice header and coefficient syntax elements in an alf data syntax structure, wherein the first syntax element specifies an adaptation parameter set id and the alf data syntax structure is specified by the adaptation parameter set id;
   deriving a refinement value by using the cross component filter coefficients and the reconstructed luma component sample values; and
   modifying a reconstructed chroma component sample value by adding the refinement value, wherein
   the reconstructed chroma component sample values have been filtered according to a chroma adaptive loop filtering process.

5. An encoder of encoding video data, the encoder comprising:
   a processor, and
   a memory associated with the processor; wherein the processor is configured to perform the following steps:
   inputting reconstructed luma component sample values prior to a luma adaptive loop filtering process in a filter chain into a cross component filtering process;
   deriving cross component filter coefficients from a first syntax element in a slice header and coefficient syntax elements in an alf data syntax structure, wherein the first syntax element specifies an adaptation parameter set id and the alf data syntax structure is specified by the adaptation parameter set id;
   deriving a refinement value by using the cross component filter coefficients and the reconstructed luma component sample values; and
   modifying a reconstructed chroma component sample value by adding the refinement value, wherein
   the reconstructed chroma component sample values have been filtered according to a chroma adaptive loop filtering process.

* * * * *